United States Patent
Guix et al.

(10) Patent No.: US 11,631,131 B2
(45) Date of Patent: Apr. 18, 2023

(54) AUTOMATED HEDGE MANAGEMENT SYSTEMS AND METHODS

(71) Applicant: Kantox Limited, London (GB)

(72) Inventors: Antonio Rami Guix, Barcelona (ES); Simon Chevoleau, Barcelona (ES); Álvaro Vilanova Vidal, Barcelona (ES); Guillaume Allain, Barcelona (ES); Philippe Gelis, London (GB); John Carbajal, Barcelona (ES)

(73) Assignee: Kantox Limited, London (GB)

( * ) Notice: Subject to any disclaimer, the term of this patent is extended or adjusted under 35 U.S.C. 154(b) by 0 days.

(21) Appl. No.: 17/186,413

(22) Filed: Feb. 26, 2021

(65) Prior Publication Data
US 2022/0277391 A1 Sep. 1, 2022

(51) Int. Cl.
*G06Q 40/04* (2012.01)
*G06F 9/46* (2006.01)
*G06F 9/54* (2006.01)

(52) U.S. Cl.
CPC .............. *G06Q 40/04* (2013.01); *G06F 9/466* (2013.01); *G06F 9/542* (2013.01)

(58) Field of Classification Search
CPC ......... G06Q 40/04; G06F 9/466; G06F 9/542; G06F 9/46; G06F 9/54
See application file for complete search history.

(56) References Cited

U.S. PATENT DOCUMENTS

| | | | |
|---|---|---|---|
| 6,938,010 B1 * | 8/2005 | Everson ................. | G06Q 40/00 705/35 |
| 8,078,511 B2 | 12/2011 | Feilbogen et al. | |
| 8,407,128 B2 * | 3/2013 | Tunney ................. | G06Q 40/04 705/37 |

(Continued)

FOREIGN PATENT DOCUMENTS

| | | | | |
|---|---|---|---|---|
| AU | 2011381553 A1 * | 9/2013 | ............. | G06Q 40/04 |
| CN | 108346099 A * | 7/2018 | | |

(Continued)

OTHER PUBLICATIONS

API (Kantox Blog, "Kantox API: currency management automation to improve efficiency," Apr. 24, 2017, Kantox, pp. 1-4) (Year: 2017).*

(Continued)

*Primary Examiner* — Kenneth Bartley
(74) *Attorney, Agent, or Firm* — Nutter McClennen & Fish LLP

(57) ABSTRACT

Exemplary embodiments provide hedge management systems and methods for implementation of automated hedging programs. The automated hedge management system manages various types of hedging programs on behalf of various clients based on currency exchange information received from any of various market data providers. The automated hedge management system also interfaces with various hedge service providers (e.g., banks or other asset market makers) such as for implementing a hedge decision, e.g., to purchase or sell a forward contract. Exemplary embodi- (Continued)

ments are implemented using parameterized programs and parameterized program engines, thereby allowing a single program engine to implement multiple hedging program instances including combinations of instances.

20 Claims, 45 Drawing Sheets

(56) References Cited

U.S. PATENT DOCUMENTS

| | | | |
|---|---|---|---|
| 11,487,530 | B2 | 11/2022 | Suarez et al. |
| 11,488,442 | B1 | 11/2022 | Furia |
| 11,494,849 | B1 | 11/2022 | Sardegna |
| 2001/0056398 | A1 | 12/2001 | Scheirer |
| 2002/0016762 | A1* | 2/2002 | Feilbogen ............ C07K 14/495 705/39 |
| 2003/0236738 | A1* | 12/2003 | Lange .................... G06Q 30/08 705/37 |
| 2005/0033672 | A1* | 2/2005 | Lasry ...................... G06Q 40/00 705/35 |
| 2009/0313175 | A1* | 12/2009 | Mueller .................. G06Q 40/06 705/36 R |
| 2013/0006835 | A1 | 1/2013 | Gershon |
| 2013/0110741 | A1 | 5/2013 | Duzoglou |
| 2019/0213677 | A1* | 7/2019 | Wise ....................... G06Q 40/04 |
| 2021/0142241 | A1* | 5/2021 | Thompson ......... G06Q 10/0633 |

FOREIGN PATENT DOCUMENTS

| | | | | |
|---|---|---|---|---|
| KR | 20100019121 | A | * | 2/2010 |
| KR | 20100058101 | A | * | 6/2010 |
| KR | 101514868 | B1 | * | 4/2015 |
| WO | WO-2019059839 | A1 | * | 3/2019 ............. G06Q 20/10 |

OTHER PUBLICATIONS

FX Gains and Losses (Kantox Blog, "FX Gains and Losses: the timing is key," Oct. 17, 2017, Kantox, pp. 1-5) (Year: 2017).*
FX Capabilities (Kantos, "FX Capabilities" May 7, 2019, https://web.archive.org/web/20190507023131/https://www.kantox.com/en/products/fx-risk-management/fx-capabilities/ pp. 1-6) (Year: 2019).*
[Alcala, et al. ] Kantox Tomorrow's FX Today, Currency Risk Hedging Checklist, 2018, 17 pages.
[Author Unknown] Currency Management Automation in Travel Distribution, 2021, 20 pages.
[Author Unknown] Dynamic Hedging named Best FX Risk Management Solution 2020 by TMI, 2020, 23 pages.
[Author Unknown] Kantox Currency Management Automation, FX as a Disruptive Force in Travel Distribution, (undated), 17 pages Date: 2021.
[Author Unknown] Kantox Currency Management Automation, Hedging the Budget, 2021, 7 pages.
[Author Unknown] Kantox Currency Management Automation, Protecting Profit Margins in Stormy Seas, (undated), 7 pages Date: 2021.
[Author Unknown] Kantox Currency Management Automation, The Right Formula for Enhanced Competitiveness, 2021, 7 pages.
[Author Unknown] Kantox Currency Management Automation, The Role of Foreign Currencies in Retail Ecommerce, 2021, 16 pages.
[Descout, L.] Kantox Tomorrow's FX Today, Forward Guide for CFO's, 2015, (undated), 23 pages.
[Author Unknown] Automate Your Layered Hedging Program, retrieved from the internet at https://www.kantox.com/en/layered-hedging/, Mar. 13, 2021 at 15:23, 2 pages.
[Author Unknown] Automate Your Micro-Hedging Program, retrieved from the internet at https://www.kantox.com/en/micro-hedging/, Mar. 13, 2021 at 15:38, 2 pages.
[Author Unknown] Automate Your Static FX Hedging Program, retrieved from the internet at https://www.kantox.com/en/static-hedging/, Feb. 12, 2021 at 08:43, 2 pages.
[Author Unknown] Combinations of Hedging Programs, retrieved from the internet at https://www.kantox.com/en/combinations-of-hedging-programs/, Jun. 1, 2021 at 16:05, 2 pages.
[Author Unknown] Currency Management Automation, retrieved from the internet at https://www.kantox.com/en/what-is-currency-management-automation/, Feb. 12, 2021 at 08:45, 2 pages.
[Author Unknown] Dynamic Pricing, retrieved from the internet at https://www.kantox.com/en/dynamic-pricing/, Mar. 13, 2021 at 15:15, 3 pages.
[Author Unknown] Glossary, retrieved from the internet at https://www.kantox.com/en/glossary/, Jun. 1, 2016 at 10:56 am, 90 pages.
[Author Unknown] Kantox Currency Management Automation, The Role of Foreign Currencies in Digital Advertising, Mar. 26, 2019, 18 pages.
[Author Unknown] Kantox Dynamic Hedging, retrieved from the internet at https://www.kantox.com/en/kantox-dynamic-hedging/, Feb. 2, 2021 at 16:24, 5 pages.
[Author Unknown] Kantox Tomorrow's FX Today, Hedge Accounting under IFRS 9, Glossary IFRS 9 Mar. 28, 2018 at 16:29, 10 pages.
[Author Unknown] Payments and Collection Factory,retrieved from the internet at https://www.kantox.com/en/payments-collections/, Feb. 9, 2021 at 15:21, 3 pages.
Rami, T, et al., Kantox Tomorrow's FX Today, Automation: The Cure for Manual Overload in the Treasury, Mar. 9, 2017, 12 pages.
International Search Report and Written Opinion for International Application No. PCT/US2022/017655, dated Jun. 16, 2022 (10 pages).

* cited by examiner

Static Hedging Program
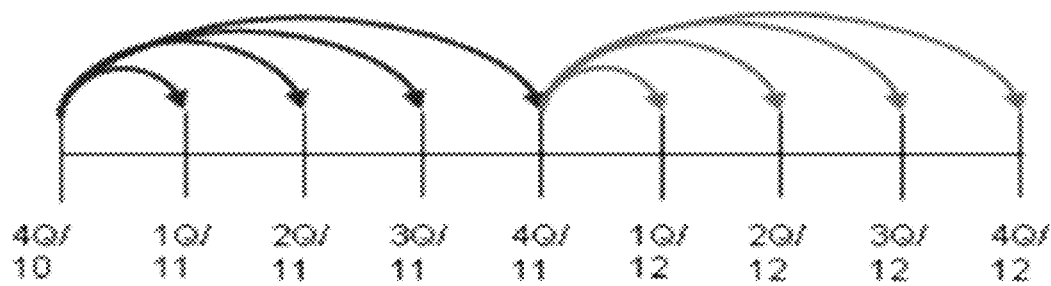
Rolling Hedging Program
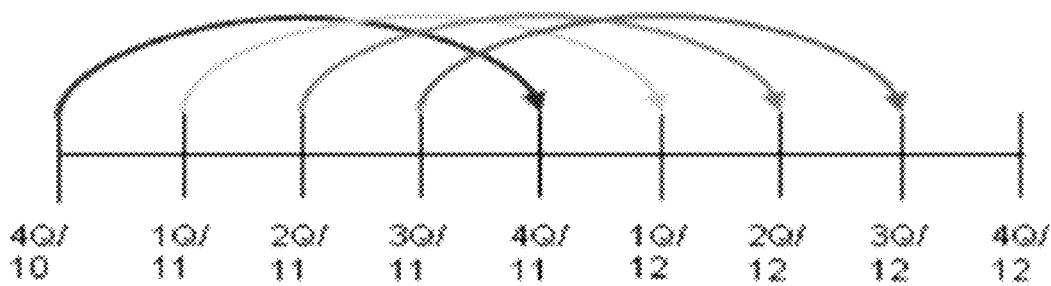
Layered Hedging Program
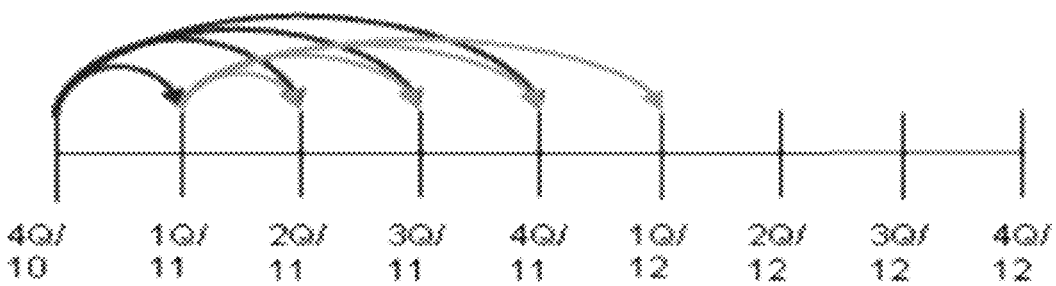
Microhedging Program
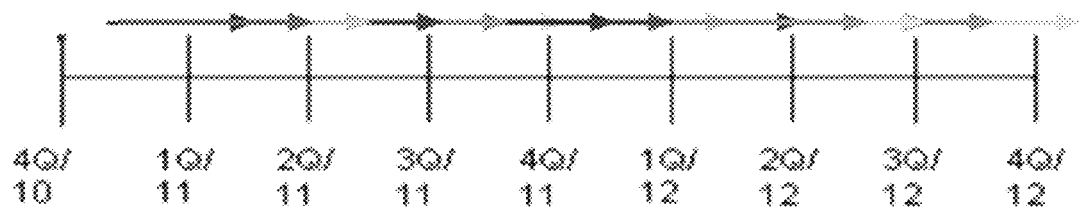
FIG. 7

FIG. 19

| Step | Amount | Currency Pair | Buy/Sell | Value date | Entry Rate | Type |
|---|---|---|---|---|---|---|
| Sending forecast exposure entries on 01/12/2020 | 100 | EURUSD | Sell | 30/06/2021 | | Forecast |
| | 300 | EURUSD | Sell | 31/07/2021 | | Forecast |
| | 200 | EURCNY | Sell | 30/06/2021 | | Forecast |
| | 600 | EURCNY | Sell | 31/07/2021 | | Forecast |

FIG. 24

PAIR / DIRECTION = EURCNY-SELL
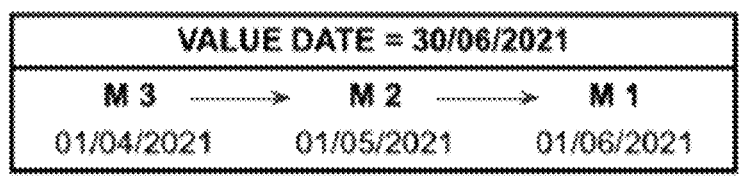
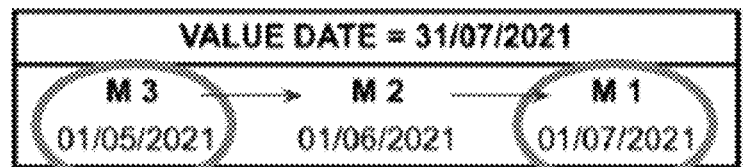
FIG. 27

| Step | Amount | Currency Pair | Buy/Sell | Value date | Entry Rate | Type |
|---|---|---|---|---|---|---|
| Sending FirmCo exposure entries on 20/05/2021 | 30 | EURUSD | Sell | 30/06/2021 | | FirmCo |
| | 40 | EURUSD | Sell | 30/06/2021 | | FirmCo |
| | 150 | EURUSD | Sell | 31/07/2021 | | FirmCo |
| | 210 | EURCNY | Sell | 30/06/2021 | | FirmCo |
| | 500 | EURCNY | Sell | 31/07/2021 | | FirmCo |

All entries (Forecast + Firm Commitments) in order by value date at 20/05/2021

| Step | Amount | Currency Pair | Buy/Sell | Value date | Entry Rate | Type |
|---|---|---|---|---|---|---|
| All exposure entries in order by Value date | 100 | EURUSD | Sell | 30/06/2021 | | Forecast |
| | 30 | EURUSD | Sell | 30/06/2021 | | FirmCo |
| | 40 | EURUSD | Sell | 30/06/2021 | | FirmCo |
| | 300 | EURUSD | Sell | 31/07/2021 | | Forecast |
| | 150 | EURUSD | Sell | 31/07/2021 | | FirmCo |
| | 200 | EURCNY | Sell | 30/06/2021 | | Forecast |
| | 210 | EURCNY | Sell | 30/06/2021 | | FirmCo |
| | 600 | EURCNY | Sell | 31/07/2021 | | Forecast |
| | 500 | EURCNY | Sell | 31/07/2021 | | FirmCo |

- TODAY = 20/05/2021 (M 2)
- VALUE DATE: 30/06/2021
- FORECAST AMOUNT: 200
- FIRM COM AMOUNT: 210

| Type: FORECAST | | EUAM | Positions | M 2 |
|---|---|---|---|---|
| | Partition 1 | Partition Need | 160 | 80% |
| 200 | | | 160 | <0% / 40% |

| Type: FIRM COMMITMENTS | | EUAM | Position | M 2 |
|---|---|---|---|---|
| | Partition 1 | Partition Need | 210 | 100% |
| 210 | | | 210 | <0% / 40% |

Total program need 210
Already hedged 160
New Hedge 50
Total hedged 210
(M 2 on 01/05/2021)

FIG. 38

| ID | EXP TYPE | LABEL | COMPUTATION |
|---|---|---|---|
| 1 | FORECAST | BARCELONA | |
| ID | EXP TYPE | LABEL | COMPUTATION |
| 2 | FORECAST | BARCELONA | MAX |
|   | FIRMCO | BARCELONA | |
| ID | EXP TYPE | LABEL | COMPUTATION |
| 3 | FORECAST | BARCELONA | SUM |
|   | FORECAST | MADRID | |
| ID | EXP TYPE | LABEL | COMPUTATION |
| 4 | FORECAST | BARCELONA | SUM |
|   | FORECAST | MADRID | |
|   | DS | MADRID | MAX |
| ID | EXP TYPE | LABEL | COMPUTATION |
| 5 | FORECAST | BARCELONA | SUM |
|   | FORECAST | MADRID | SUM |
|   | FIRMCO | BARCELONA | |
|   | FIRMCO | MADRID | MAX |

FIG. 40

AUTOMATED HEDGE MANAGEMENT SYSTEMS AND METHODS

FIELD OF THE INVENTION

The invention generally relates to a computerized platform for foreign exchange (FX) hedging.

BACKGROUND OF THE INVENTION

A foreign exchange (FX) hedge is a type of financial derivative that gives companies a means of mitigating, or "hedging," their cash flows against foreign exchange risk. The most popular hedging products include forward contracts, future contracts, and options.

There are many different types of forward contract, though the most basic offers a company the opportunity to "lock in" the exchange rate of the day for settlement on an agreed future date. This safeguards the company against a fall in the exchange rate, although it also means that any favorable change will not be applied. It is a simple, yet highly effective, method employed widely to hedge against foreign exchange volatility risk.

A hedging "option," or foreign exchange option, allows a company to set an exchange rate price that it may wish to activate to conclude a transaction at a pre-agreed future date. However, if the exchange rate is better than this pre-agreed rate, the company is not obliged to exercise the set rate chosen under the foreign exchange option. Essentially, options are a fall-back function, ensuring that the company will get a guaranteed minimum exchange rate.

Hedging forms a vital component of FX risk strategy, and if a company has operations across borders, failure to effectively hedge can result in huge losses in currency exchange. There are many hedging strategies, e.g., static, rolling, layered, etc. There is no one-size-fits-all hedging program for companies. Rather, a combination of circumstances informs the optimal program for a given company, taking into consideration the pricing dynamics of each company. Thus, it can be difficult to select and implement hedging programs across multiple companies. For this reason, many companies consider their currency hedging programs as being inadequate, for example, due to overhedging, underhedging, high financial costs, or high operational costs.

A typical cause for inadequate hedging programs is that companies often start by assessing the available Treasury resources and then set up the company's hedging programs. A better approach is to start by assessing the FX needs of the business, paying special attention to the company's pricing parameters, and only then design the hedging program.

SUMMARY OF VARIOUS EMBODIMENTS

In accordance with one embodiment of the invention, an automated hedge management system for currency hedging comprises a database and at least one processor coupled to a tangible non-transitory memory containing instructions executable by the at least one processor to perform computer processes comprising at least one market monitor system configured to provide market information from one or more market data providers; at least one order management system configured to execute hedge requests; and an automated hedge manager configured to implement a plurality of hedging programs. Each hedging program is associated with a given client, currency pair, and market direction and includes a hedging program combination consisting of one or more hedging program instances, each hedging program combination implementing a distinct client hedging strategy based on user-specified parameters and market information from at least one market monitor system. The automated hedge manager comprises a strategies router that directs client exposure data from each client to a corresponding client hedging program combination and a combinator that aggregates client exposure data per value date in the database and manages how the at least one hedging program instance of each hedging program combination implements the distinct client hedging strategy for the corresponding currency pair and market direction to trigger automated hedge requests to at least one order management system.

In various alternative embodiments, the automated hedge manager further comprises at least one client exposure data preprocessor that transforms client exposure data for use by at least one client hedging program combination, a hedging engine that implements a plurality of hedging program combinations, and/or a parameterized hedging engine that implements a plurality of hedging program instances, each hedging program instance associated with a distinct parameterized program. In the case of a parameterized hedging engine, the automated hedge manager may generate the distinct parameterized programs based on client hedging program specifications. In any case, such parameterized programs may be based on various program dimensions (e.g., up to six dimensions in various exemplary embodiments). Each parameterized program generally includes a separate set of parameters for each of a number of maturity windows such that different maturity windows can have different hedging decision parameters. Each set of parameters may include exposure under management, stop-loss, and take-profit parameters. In certain exemplary embodiments, each parameterized program can be configured to include one or more partitions. In order to support multiple hedging engines, the automated hedge manager may include a hedging engine interface allowing pluggable hedging engines to be added to and removed from the system. The automated hedge management system generally includes an electronic interface through which clients post programs and exposure entries to the automated hedge manager.

In accordance with one embodiment of the invention, a computerized method for automated currency exchange hedging comprises executing, by at least one processor, an automated hedge manager configured to implement a plurality of hedging programs, each hedging program associated with a given client, currency pair, and market direction and including a hedging program combination consisting of one or more hedging program instances, each hedging program combination implementing a distinct client hedging strategy based on user-specified parameters and market information from at least one market monitor system. The method further comprises directing, by a strategies router, client exposure data from each client to a corresponding client hedging program combination; aggregating, by a combinator, client exposure data by value date in a database; and managing, by the combinator, how the at least one hedging program instance of each hedging program combination implements the distinct client hedging strategy for the corresponding currency pair and market direction to trigger automated hedge requests to at least one order management system.

In various alternative embodiments, the method further comprises executing, by the automated hedge manager, at least one client exposure data preprocessor that transforms client exposure data for use by at least one client hedging program combination. Executing the automated hedge manager may include executing a hedging engine that implements a plurality of hedging program combinations and/or executing a parameterized hedging engine that implements a plurality of hedging program instances, each hedging program instance associated with a distinct parameterized program. In the case of a parameterized hedging engine, the automated hedge manager may generate the distinct parameterized programs based on client hedging program specifications. In any case, such parameterized programs may be based on various program dimensions (e.g., up to six dimensions in various exemplary embodiments). Each parameterized program generally includes a separate set of parameters for each of a number of maturity windows such that different maturity windows can have different hedging decision parameters. Each set of parameters may include exposure under management, stop-loss, and take-profit parameters. In certain exemplary embodiments, each parameterized program can be configured to include one or more partitions. In order to support multiple hedging engines, the automated hedge manager may implement a hedging engine interface allowing pluggable hedging engines to be added to and removed from the system. The automated hedge management system generally includes an electronic interface through which clients post programs and exposure entries to the automated hedge manager.

Additional embodiments may be disclosed and claimed.

BRIEF DESCRIPTION OF THE DRAWINGS

Those skilled in the art should more fully appreciate advantages of various embodiments of the invention from the following "Description of Illustrative Embodiments," discussed with reference to the drawings summarized immediately below.

FIG. 7 depicts four hedging program families conceptually.

FIG. 19 is a sample table showing the dimension values for the hedging program for three partitions.

FIG. 24 shows representations of some forecast exposure entries as might be sent on Dec. 1, 2020 for two hedging program instances.

FIG. 27 shows the MW dates for each value date for EURCNY-SELL hedging program instances.

FIG. 29 shows the partition needs for the example of FIG. 28.

FIG. 31 shows the partition needs for the example of FIG. 30.

FIG. 34 shows representations of some sample firm commitment ("FirmCo") entries as might be made on May 20, 2021 individually and along with the forecast entries from Dec. 1, 2020 ordered by value date at May 20, 2021.

FIG. 36 shows the partition needs from the example of FIG. 35.

FIG. 38 shows the partition needs from the example of FIG. 36.

FIG. 40 shows some examples of hedging program combinations, in accordance with certain exemplary embodiments.

Figure 1:
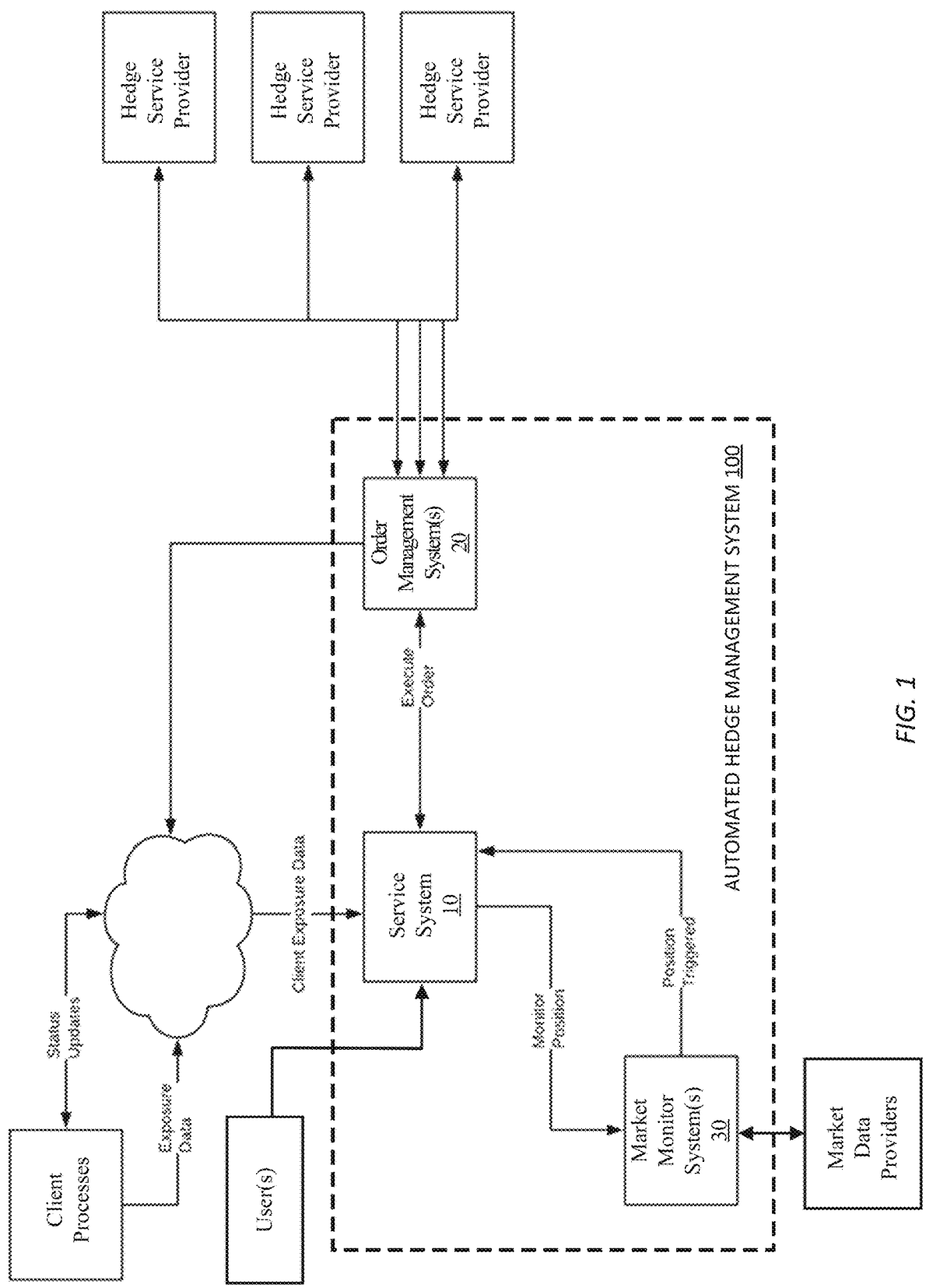
FIG. 1 is a schematic diagram showing an automated hedge management system 100 in accordance with certain exemplary embodiments.

It should be noted that the foregoing figures and the elements depicted therein are not necessarily drawn to consistent scale or to any scale. Unless the context otherwise suggests, like elements are indicated by like numerals. The drawings are primarily for illustrative purposes and are not intended to limit the scope of the inventive subject matter described herein.

DESCRIPTION OF ILLUSTRATIVE EMBODIMENTS

Definitions and Acronyms

As used in this description and the accompanying claims, the following terms shall have the meanings indicated, unless the context otherwise requires.

A "client" is an entity that utilizes hedge management systems and methods of the types described herein. A client can be an individual, company, or other entity.

A "set" includes one or more members.

A "combination" can include one or more members.

"BSI" means "Balance Sheet Item" and can include accounts receivable and accounts payable items.

"EUM" means "Exposure Under Management" and sometimes may be referred to alternatively as "EUAM" or "Exposure Under Active Management."

"FX" means "Foreign Exchange." The term "Currency Exchange" is used herein synonymously with the term "Foreign Exchange."

"SL" means "Stop Loss."

"TP" means "Take Profit."

Firm Commitments (or FirmCo) can include sales orders and purchase orders.

"MW" means "Maturity Window" and sometimes may be referred to alternatively as "TtMW" or "Time to Maturity Window." In certain exemplary embodiments, MW can be characterized by a MW unit (e.g., daily, weekly, monthly, etc.) and time period (e.g., start date and end date, by start date and duration, etc.). The various hedging program examples presented below generally use a monthly MW unit and therefore MW is often referred to by month, e.g., M1 for Month 1 of the hedging program, M2 for Month 2 of the hedging program, etc. It should be noted that MW in the hedging examples presented below, MW is generally relative to the value date of a transaction entry, e.g., for a transaction entry having a value date of Jun. 30, 2021, M1 would be Jun. 1, 2021; M2 would be May 1, 2021, etc., and for a transaction entry having a value date of Jul. 31, 2021, M1 would be Jul. 1, 2021, M2 would be Jun. 1, 2021, etc. Dates are often represented in DD/MM/YYYY format, i.e., day followed by month followed by year (e.g., 01/06/2021 would represent Jun. 1, 2021 rather than Jan. 6, 2021).

"WAER" means "Weighted Average Entry Rate."

The term "program" is used herein in different contexts and therefore does not always mean the same thing throughout the description and claims. One use of the term "program" is to describe various types of hedging programs that may be implemented in various exemplary embodiments. Another use of the term "program" is to describe a computer program that implements one or more hedging programs. Yet another use of the term "program" is to describe program parameters that can be used in various exemplary embodiments to implement parameterized computer program hedging modules. Thus, the meaning of a given use of the term "program" will depend on its context.

The term "procedure" is used herein to refer to a computer program or portion of a computer program that implements a hedging-related function as part of a hedging program.

The term "engine" is used herein to refer to a computer program or portion of a computer program. With regard to hedging engines described below, the term "engine" is used as a way to help distinguish between different types of hedging programs (e.g., static, rolling, layered, microhedging, etc.) and the computer programs that implement those hedging programs (e.g., the patent application refers to hedging engines that implement hedging programs as opposed to, say, referring to hedging computer programs that implement hedging programs, where multiple uses of the word "program" can get confusing).

Hedge Management Systems and Methods

Exemplary embodiments provide hedge management systems and methods for implementation of automated hedging programs. FIG. 1 is a schematic diagram showing an automated hedge management system 100 in accordance with certain exemplary embodiments. The automated hedge management system 100 manages various types of hedging programs on behalf of various clients based on currency exchange information received from any of various market data providers under the oversight of one or more administrators who provide support to the clients, as discussed in more detail below. The automated hedge management system 100 also interfaces with various hedge service providers (e.g., banks or other asset market makers) such as for implementing a hedge decision, e.g., to purchase or sell a forward contract.

Among other things, the automated hedge management system 100 includes a service system 10 that implements various hedge programs as discussed further below, one or more order management (OM) systems 20 through which the service system 10 interfaces with the hedge service providers (e.g., can have a separate order management system for each liquidity provider), and one or more market monitoring (MM) systems 30 through which the service system 10 obtains real-time market information (e.g., different rate monitoring systems for different market information sources). For convenience, the order management system(s) 20 and the market monitor system(s) 30 may be referred to herein as "effects" processors. In certain exemplary embodiments, one or more market monitoring systems 30 can be configured to generate a trigger based on market information, e.g., to generate a trigger when a currency exchange rate has changed up or down by a predetermined percentage or reached a predetermined rate. Such triggering mechanisms can offload substantial processing from the service system 10 by providing an event-driven rather than data-driven mechanism for responding to market information changes. The service system 10 typically provides various user interfaces (e.g., graphical user interfaces) such as an administrator interface through which an administrator can control and monitor the system and a client interface through which clients can control and monitor its hedging programs.

Figure 2:
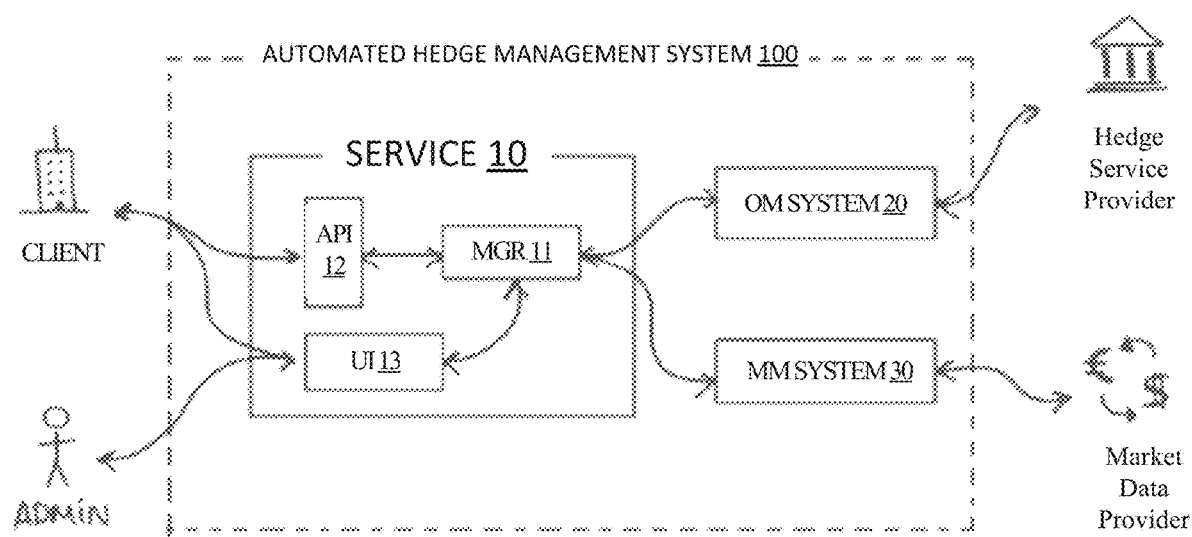
FIG. 2 is a schematic diagram showing components of the service system 10 in accordance with certain exemplary embodiments.

FIG. 2 is a schematic diagram showing components of the service system 10 in accordance with certain exemplary embodiments. Among other things, the service system 10 includes an automated hedge manager (MGR) 11 that implements the various hedge programs as discussed further below using real-time market data from one or more market monitor systems 30, which can include making hedge service requests to one or more order management systems 20. The service system 10 also includes user interfaces (UI) 13 including an administrator interface through which one or more administrators can manage and monitor the behavior of the automated hedge manager 11 and also can include an application program interface (API) 12 through which clients can interface directly with the automated hedge manager 11.

Figure 3:
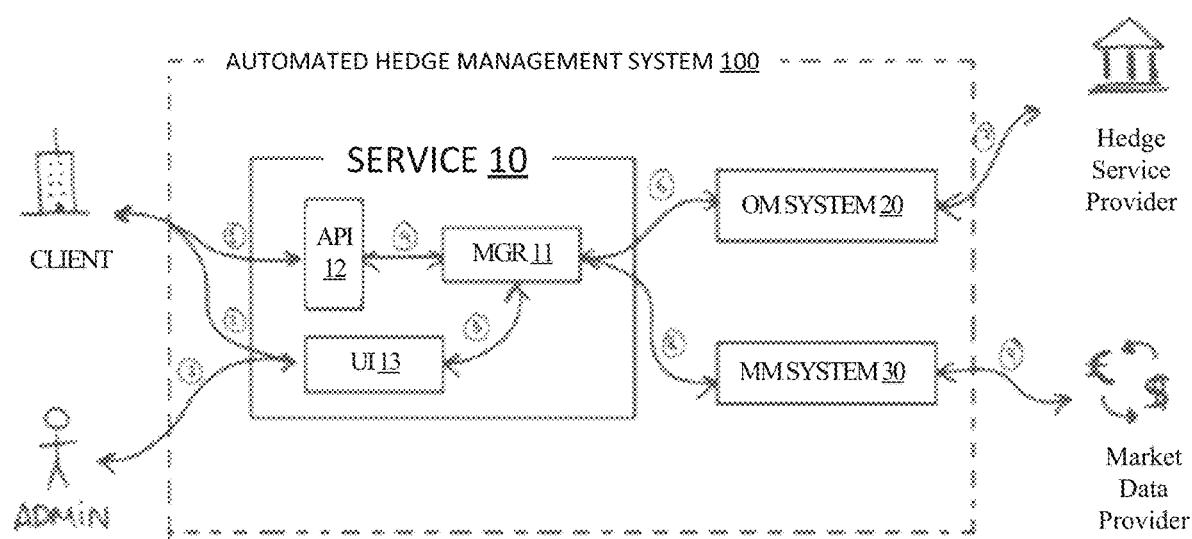
FIG. 3 is a schematic diagram showing a typical process flow in accordance with various exemplary embodiments.

FIG. 3 is a schematic diagram showing a typical process flow in accordance with various exemplary embodiments. Clients provide data to the automated hedge manager 11 directly through the API 12 (step 1) and/or indirectly through the administrator interface 13 (step 2) such as for configuring various hedge programs and providing client data in support for such hedge programs (e.g., accounts receivable/accounts payable information). In step 3, the administrator uses the administrator interface 13 to monitor the operation of the automated hedge manager 11 and support the clients, e.g., to help with selection of appropriate hedge programs. The automated hedge manager 11 receives client data and commands from the API 12 (step 4) and/or from the administrator interface 13 (step 5) through which the automated hedge management manager 11 and uses this information to establish and implement the hedge programs, using information from the market monitor system 30 (steps 8 and 9) to make automated hedge management decisions. In certain exemplary embodiments, the automated hedge manager 11 can establish rate alarms in the market monitor system 30 such as to be notified when a currency conversion rate meets a specified value. When a hedge program being run by the automated hedge manager 11 determines that a hedge action is needed, the automated hedge manager 11 triggers a hedge transaction, which, in certain exemplary embodiments can be performed completely by the platform (e.g., by sending hedge requests to the order management system 20 (step 6), which in turn performs appropriate hedge transactions with one or more of the liquidity providers (step 7)) or alternatively can facilitate execution of transactions between the client and a chosen liquidity provider, e.g., through a Multi-Dealer Platform (e.g., 360T) or through a direct connection offered by the platform to a liquidity provider internal system (e.g., Cortex for BNPP). In the former case, the platform essentially acts as a hub that can negotiate better prices with the liquidity providers than clients could obtain on their own, while in the latter two cases, the platform essentially acts as a facilitator that is not involved in the monetary flow between the client and the liquidity provider. In certain exemplary embodiments, these options can be selectable by the client.

Figure 4:
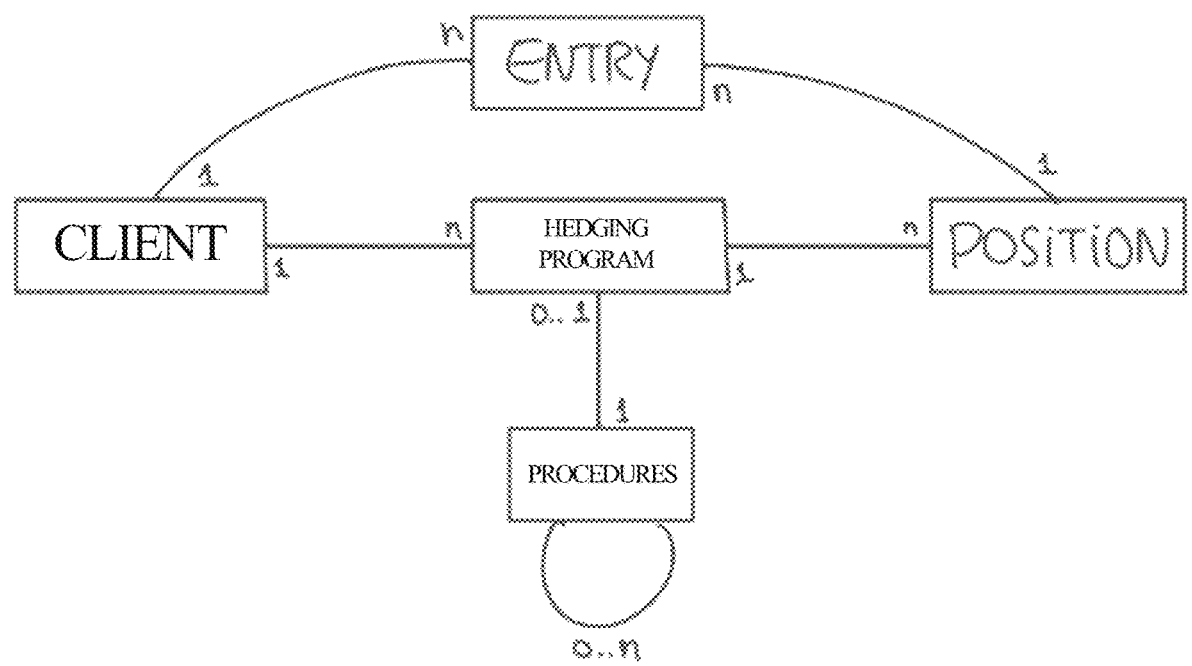
FIG. 4 is a schematic diagram showing the concept of a hedging program, in accordance with various exemplary embodiments.

FIG. 4 is a schematic diagram showing the concept of a hedging program, in accordance with various exemplary embodiments. Typically, each client will be identified by a client identifier and will have one or more active hedging programs, e.g., at least one hedging program per currency pair and direction requiring hedging (e.g., Dollars/Euros, Dollars/Yen, etc.). A hedging program is essentially the correlation between a particular currency pair/direction of a client and a set of hedging procedures that are applied to the currency pair/direction. A hedging program typically includes one or more Maturity Windows (MWs), where each MW is characterized by a MW unit (e.g., daily, weekly, monthly, etc.) and a start/end day or length. A hedging program has a position for each MW, where each position includes a state of current exposure (or Exposure Under Management, which can be the EUM) and a hedging need. Each position in turn is based on client data (entry), which, for example, can convey an exposure or a change of exposure, or an amount, rate (optional), value date, and label that identifies a part of exposure involved in the position (e.g., forecast, firm commitment, etc.). A program can be characterized by a sequence or hierarchy of hedging procedures, e.g., one hedging procedure can have one or more other hedging procedures as "children" such as in a tree structure). Each hedging procedure can be defined by various hedging parameters as discussed in greater detail below. The hedging need is computed using the program hedging procedures. A program can provide any kind of hedging strategy given a particular set of procedures. Furthermore, two or more programs can be combined (e.g., implemented together for a particular client) as part of a single program. Thus, in certain exemplary embodiments, the automated hedge manager 11 permits programs to be implemented hierarchically.

Figure 5:
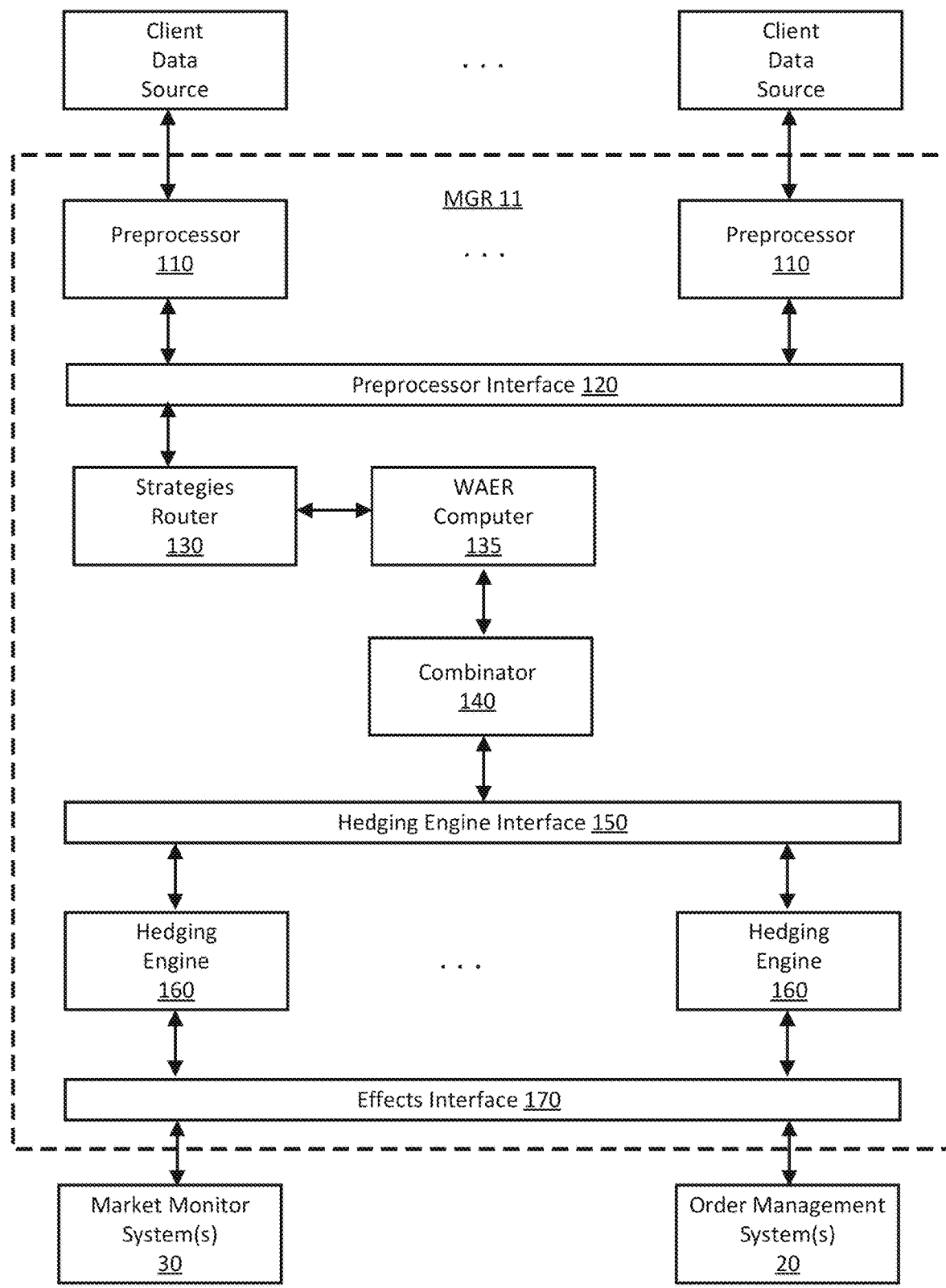
FIG. 5 is a schematic diagram showing components of the automated hedge management engine, in accordance with certain exemplary embodiments.

FIG. 5 is a schematic diagram showing components of the automated hedge manager 11, in accordance with certain exemplary embodiments. The automated hedge manager 11 here includes three types of interfaces, specifically a preprocessor interface 120, a hedging engine interface 150, and an effects interface 170.

The preprocessor interface 120 provides an interface for various types of preprocessors 110 that preprocess client exposure data for use by other components, such as, for example, data aggregator modules that receive client exposure data and transform the client exposure data into a "normalized" format and data blender modules that can enrich the normalized client exposure data such as by substituting or triangulating currencies. The output of one data blender module can be processed by another data blender module. A terminating blender module provides an outgoing data feed to a strategies router 130 (discussed below).

The hedging engine interface 150 provides an interface to a number of hedging engines 160. In the context of the hedging program concepts discussed above with reference to FIG. 4, a hedging engine 160 implements a set of hedging procedures and can be specific to one or more types of hedging programs (e.g., different hedging engines 160 can implement different types of hedging programs) and/or to a specific client (e.g., a particular hedging engine 160 can implement one or more hedging programs that are specific to a client). Thus, for example, a particular hedging engine 160 may be configured to implement one or more hedging program instances that in various alternative embodiments can be of one or more hedging program types (e.g., static, rolling, layering, microhedging, etc.) and/or can be for one or more clients The effects interface 170 provides interfaces to the various market monitor systems 30 and order management systems 20.

In certain exemplary embodiments, preprocessor interface 120, hedging engine interface 150, and/or effects interface 170 can be configured for "plug-and-play" software modules that can be added to or removed from the system. Thus, for example, the preprocessors 110 may be "pluggable," the hedging engines 160 may be "pluggable," and/or the effects systems 20/30 may utilize "pluggable" interfaces. A particular interface may be optional or omitted from certain exemplary embodiments, e.g., if "plug-and-play" modules are not needed or supported. Thus, for example, various alternative embodiments can be implemented without preprocessor interface 120 and preprocessors 110 (e.g., any preprocessing may be done directly in a hedging engine 160), without a hedging engine interface (e.g., if hedging engines 160 are hard-coded within the automated hedge manager 11), and/or without an effects interface 170 (e.g., hedging engines 160 may interface directly with one or more market monitor systems 30 and/or one or more order management systems 20).

In this exemplary embodiment, the automated hedge manager 11 includes a strategies router 130 that accepts client exposure data (e.g., from a preprocessor 110 or directly from a client) and directs the client exposure data to a hedging program combination consisting of one or more hedging program instances implemented by one or more hedging engines 160. A WAER computer 135 computes a weighted average entry rate for the client exposure data (e.g., an average of the exchange rates associated with client exposure data entries weighted by the corresponding entry amounts) to set a baseline for making stop-loss, take-profit, and other hedging decisions as discussed below. A combinator 140 manages how combined program instances interact to implement an overall hedging strategy for a particular hedging program. Each hedging engine 160 interfaces with one or more market monitor systems 30 to receive and process market data and also sends hedge requests to one or more order management systems 20 to perform appropriate hedge transactions with one or more of the liquidity providers, as discussed above.

Parameterized Dynamic Hedging Programs

Figure 6:
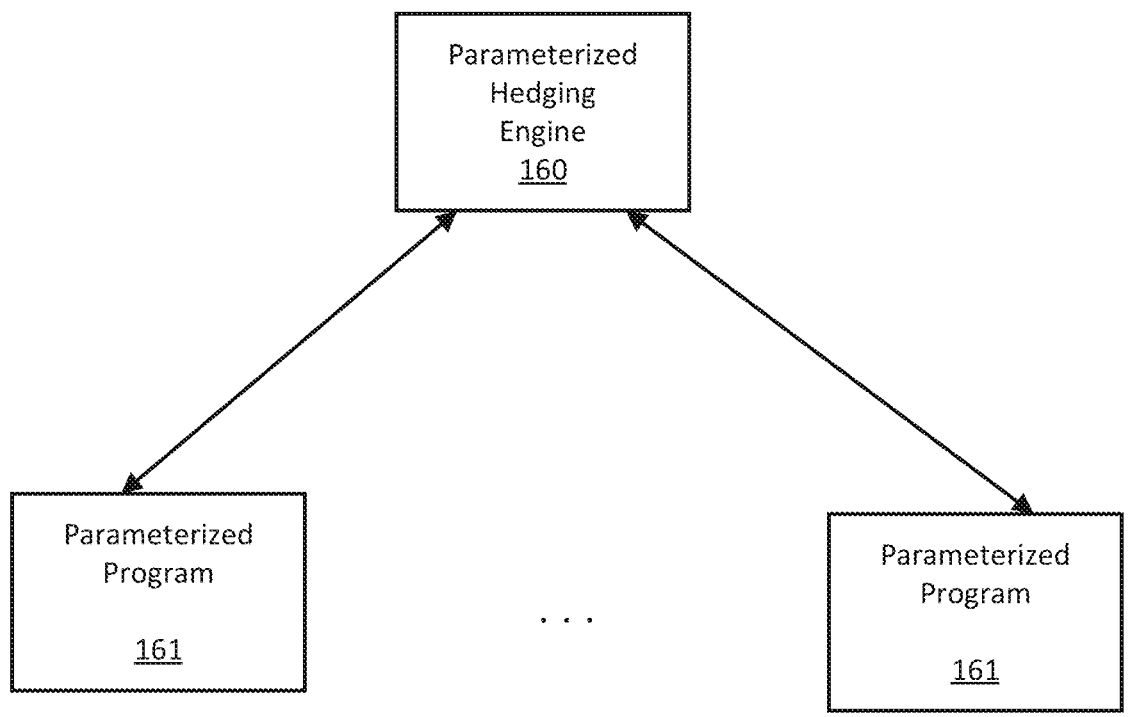
FIG. 6 is a schematic diagram showing the concept of a parameterized hedging module that can implement multiple hedging program instances as directed by multiple parameterized programs, in accordance with certain exemplary embodiments.

In certain exemplary embodiments, a hedging engine 160 can be implemented using parameterized programming techniques such that a single hedging engine 160 can implement multiple hedging program instances (e.g., for multiple clients and/or multiple types of hedging programs), where each hedging program instance is directed by a parameterized program. FIG. 6 is a schematic diagram showing the concept of a parameterized hedging engine 160 that can implement multiple hedging program instances as directed by multiple parameterized programs 161, in accordance with certain exemplary embodiments.

The following are some examples of hedging programs and the use of parameterized programming techniques to implement such hedging programs. Certain exemplary embodiments can be used to implement four general types (families) of hedging programs, namely static programs, rolling programs, layered programs, and microhedging programs. FIG. 7 depicts the four hedging program families conceptually.

Generally speaking, a static hedging program is where an entire forecast amount is hedged at the start of a given time period. A new hedge can be started when the previous one is over, i.e., when the previous hedge is at maturity.

Generally speaking, a rolling hedging program is a risk minimization strategy that involves hedging on a rolling/continuous basis, e.g., receive and hedge a forecast at 12 months every month.

Generally speaking, a layered hedging program is a risk management strategy designed to increase flexibility when hedging a company's future currency exposure. It involves using products with different maturity dates over a given time period instead of a one-off hedging product that covers that entire time period. Layered hedging is a more flexible strategy than pre-hedging.

Generally speaking, a micro-hedge program is a currency management strategy that consists of hedging each transaction as it occurs. Unlike other strategies in which users take protective action after reaching a certain nominal threshold, micro-hedging executes hedges to protect against individual exposures immediately. This strategy can benefit companies with significant foreign exchange transaction volumes in low amounts, e.g., as is the case of e-commerce firms, travel agencies, tour operators, "adtech" companies, etc. Instead of waiting for a certain nominal number of payables/receivables to come in before hedging, a company may choose to hedge each transaction. This way, companies can protect their profit margins, revenue, and obligations from the FX market at the very start of the exposure.

The inventors have recognized that these four types of hedging programs in many cases can be implemented by a common hedging engine through the use of parameterized programs. Specifically, the four types of hedging programs can be characterized using two program dimensions, namely an "Exposure Type Trigger" dimension (1st dimension) and an "EUM Type" dimension (2nd dimension). The Exposure Type Trigger dimension can be characterized by options of Fixed Period Forecast, Continuous Forecast, Firm Commitments, and Balance Sheet (BS) Items. The EUM Type dimension can be characterized by options of Constant (i.e., the same EUM percentage for each MW) and Variable (different EUM values across MWs).

Static programs are characterized by a Fixed Period Forecast and a Constant EUM (i.e., the same EUM value percentage across all MW). The client sends an entry for a given value date (VD) and a hedge is requested with the total exposed amount.

Rolling programs are characterized by a Continuous Forecast and a Constant EUM percentage (i.e., the same EUM value across all MWs). From an implementational position, a rolling program is similar to a static program but the client continuously sends entries with different value dates that are aggregated to the related position.

Layered programs are characterized by a Continuous Forecast and a Variable EUM (i.e., different EUM percentages for different MWs).

Microhedging programs are characterized by Firm Commitments and Balance Sheet (BS) Items and a Constant EUM (i.e., the same EUM value percentage across all MW).

Certain exemplary embodiments also allow hedging program instances to be implemented with various options that can be characterized using additional dimensions in order to add "dynamism" to more traditional hedging programs. For convenience, such "dynamism" is referred to herein as "dynamic hedging." In this context, dynamic hedging is a software-based solution that automates currency management from the capture of exposure data to trade execution and performance analysis. It automatically processes forecasts, firm commitments, and balance sheet items—or combinations of them—according to specified parameters per type of exposure in order to implement hedging programs and hedging program combinations. Whereas "tradition" hedging programs would address only one objective at a time, often generating undesired collateral effects (e.g., in the case of microhedging, executing each individual exposure straight-away would generate massive financial inefficiencies; in the case of layering, focusing only on smoothing the rates period-over-period risks under/over-hedging; and in the case of static hedging, guaranteeing the price for a given period would risk forecast inaccuracy; etc.), this novel dynamic hedging uses automation to not only mitigate the risk of seeing future cash-flows impacted by FX volatility but also to optimize trading (forward points, size, netting, etc.), minimize the impact of forecast inaccuracy by increasing flexibility and enabling combinations, and eliminate manual input errors and other operational risks.

A "Partitions" dimension characterizes whether the hedging program instance has a single partition or multiple partitions, where each partition can be used to hedge a portion of an exposed amount (sometimes referred to herein as a budget amount for each partition). In certain exemplary embodiments, each partition can be characterized by a set of parameters for each MW including an EUM value defining an amount to be hedged (e.g., specified as a percentage) along with parameters that define the hedging, such as, for example, a stop-loss value ("SL"), a take-profit value ("TP"), a minimum amount to hedge ("MintoHedge"), and/or a maximum amount to hedge ("MaxtoHedge"). In certain exemplary embodiments, in each partition, SL/TP values can be constant or variable across the MWs and can be characterized using either an absolute unit (e.g., a rate) or a relative unit (e.g., a percentage of a predetermined base value, such as a weighted average entry rate or WAER). In certain exemplary embodiments, stop-loss and take-profit values in a given partition may be the same or different for a given MW and may be the same or different for each MW within the partition. Also, in certain exemplary embodiments, stop-loss and take-profit values in a given partition may be the same or different from stop-loss and take-profit values in other partitions. Use of SL/TP dimension in a partition effectively forces FX rates or triggers to be used in the hedging determination. Thus, in various exemplary embodiments, a wide variety of hedging program instances can be characterized using six dimensions (i.e., Exposure Type Trigger, EUM, Partitions, SL/TP Setup, SL/TP Unit on Partition 1, SL/TP Unit on Partition 2) to support up to two partitions to allow for new and flexible forms of dynamic hedging. Additional dimensions can be used to support additional hedging options (e.g., adding MintoHedge and/or MaxtoHedge) and also can be used to support more than two partitions in various alternative embodiments (e.g., there could be additional dimensions such as SL/TP Unit on Partition 3, SL/TP Unit on Partition 4, etc.). MintoHedge is essentially a threshold under which the system will not execute a hedge, e.g., in order to avoid orders where the flat fee of hedging is bigger than the amount to hedge. MaxtoHedge is essentially a ceiling on the amount that can be hedged.

Figure 8:
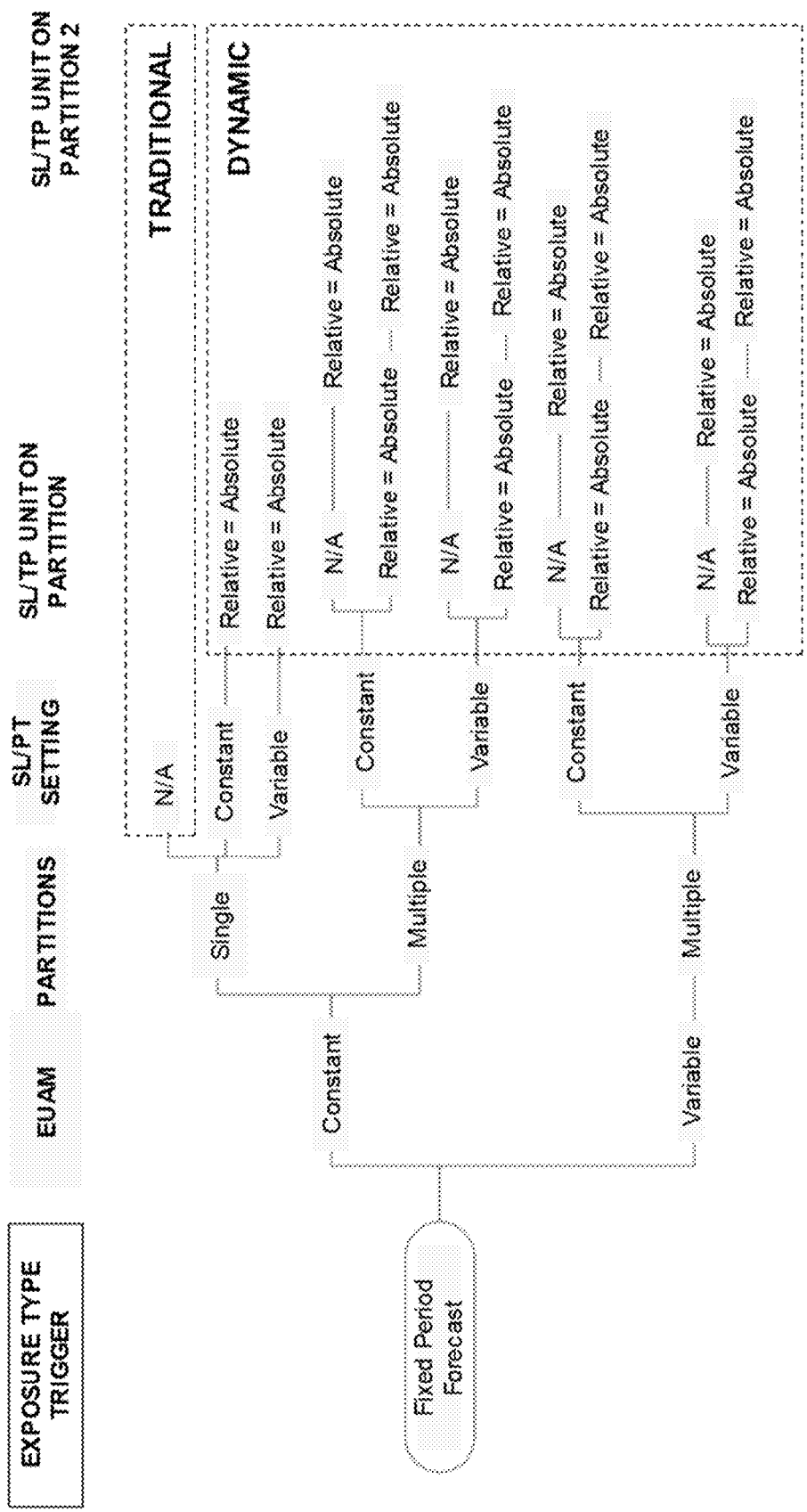
FIG. 8 is a schematic diagram showing various options for adding "dynamism" to a traditional static program using the additional dimensions.

FIG. 8 is a schematic diagram showing various options for adding "dynamism" to a traditional static program using the additional dimensions. Here, a traditional static program is characterized by a Fixed Period Forecast using a constant EUM in a single partition with no SL/TP limits. The six dimensions allows a wide range of static program variations to be implemented.

Figure 9:
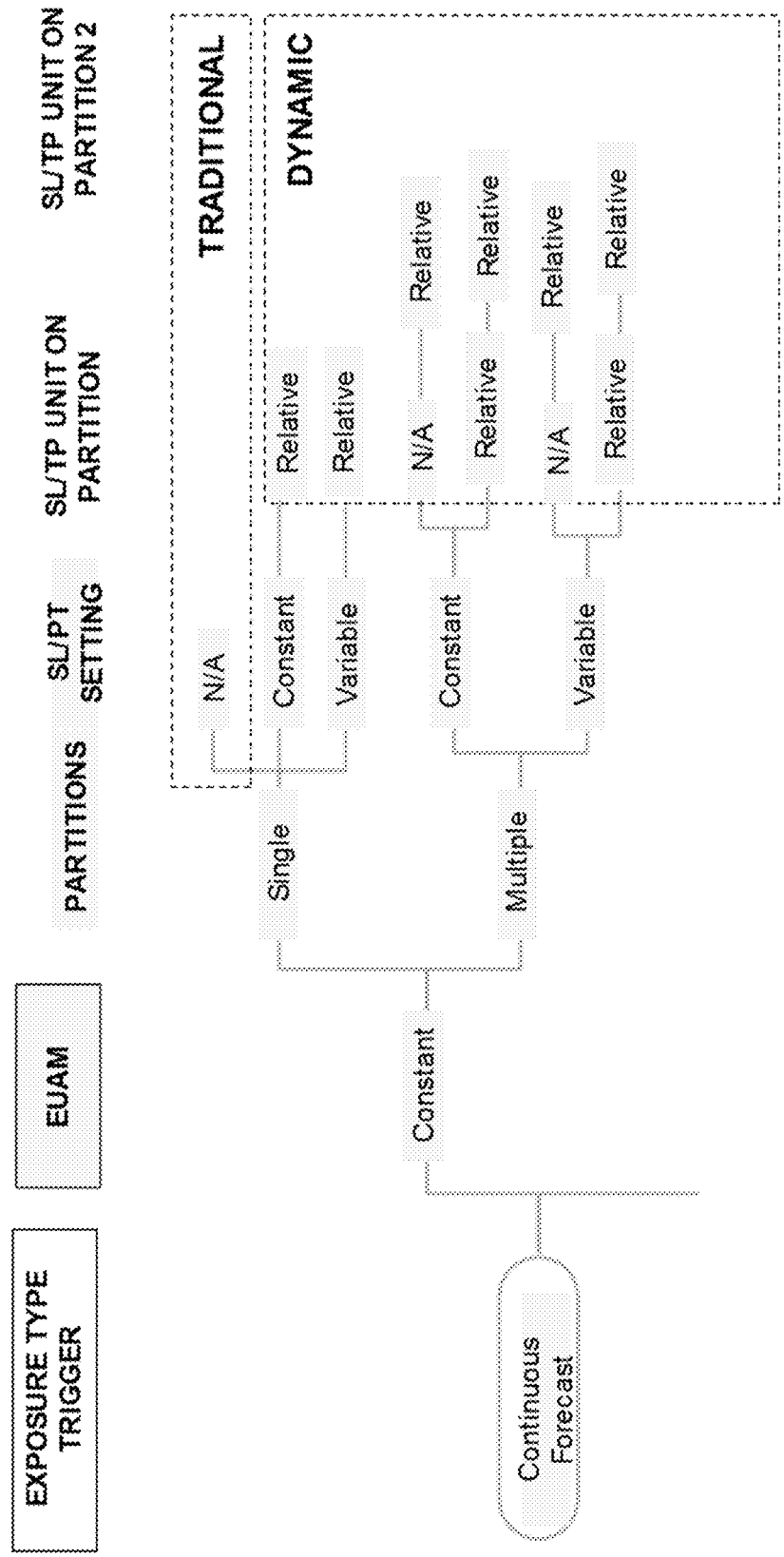
FIG. 9 is a schematic diagram showing various options for adding "dynamism" to a traditional rolling program using the additional dimensions.

FIG. 9 is a schematic diagram showing various options for adding "dynamism" to a traditional rolling program using the additional dimensions. Here, a traditional rolling program is characterized by a Continuous Forecast using a constant EUM in a single partition with no SL/TP limits. The six dimensions allows a wide range of rolling program variations to be implemented.

Figure 10:
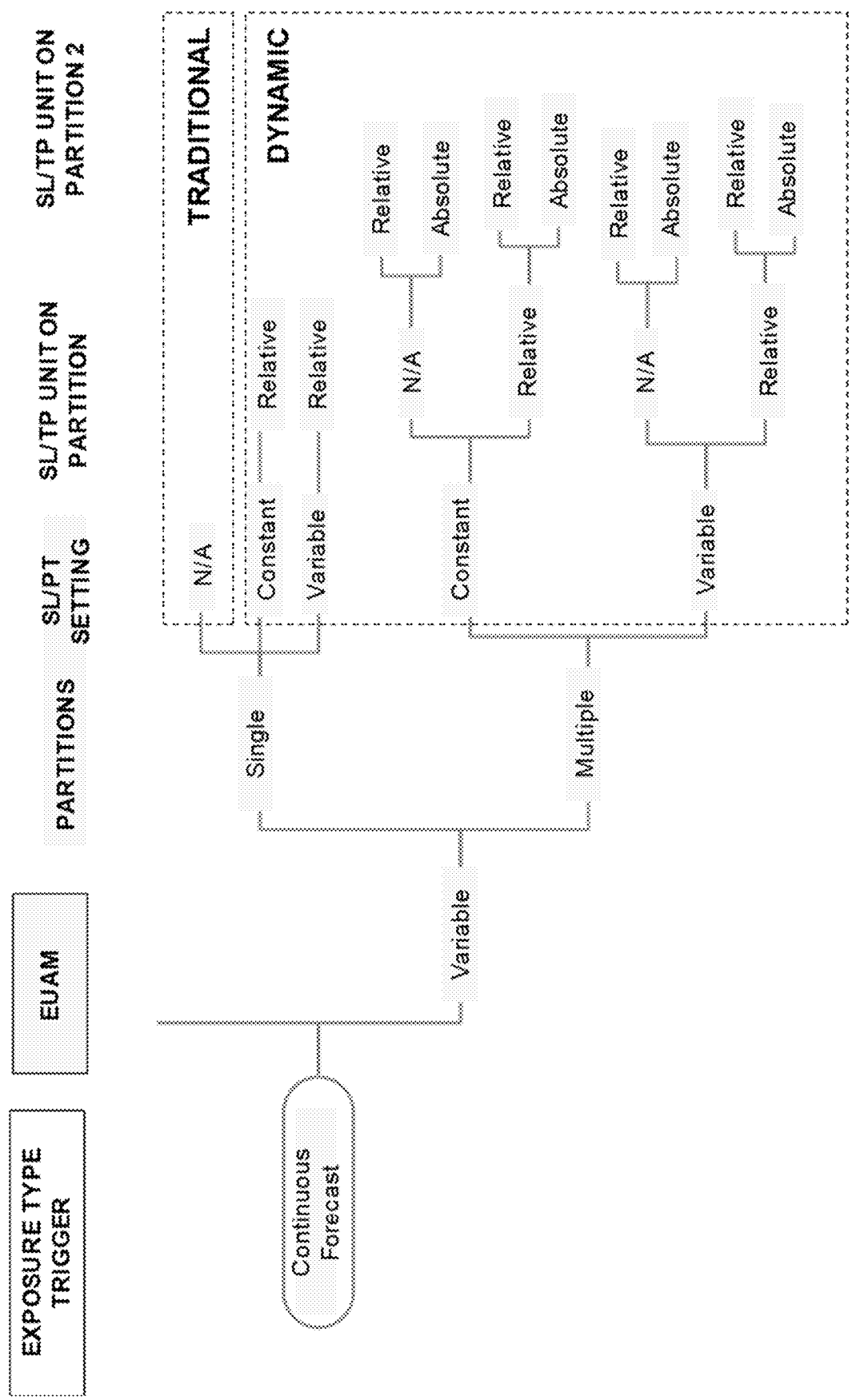
FIG. 10 is a schematic diagram showing various options for adding "dynamism" to a traditional layered program using the additional dimensions.

FIG. 10 is a schematic diagram showing various options for adding "dynamism" to a traditional layered program using the additional dimensions. Here, a traditional layered program is characterized by a Continuous Forecast using a variable EUM in a single partition with no SL/TP limits. The six dimensions allows a wide range of layered program variations to be implemented.

Figure 11:
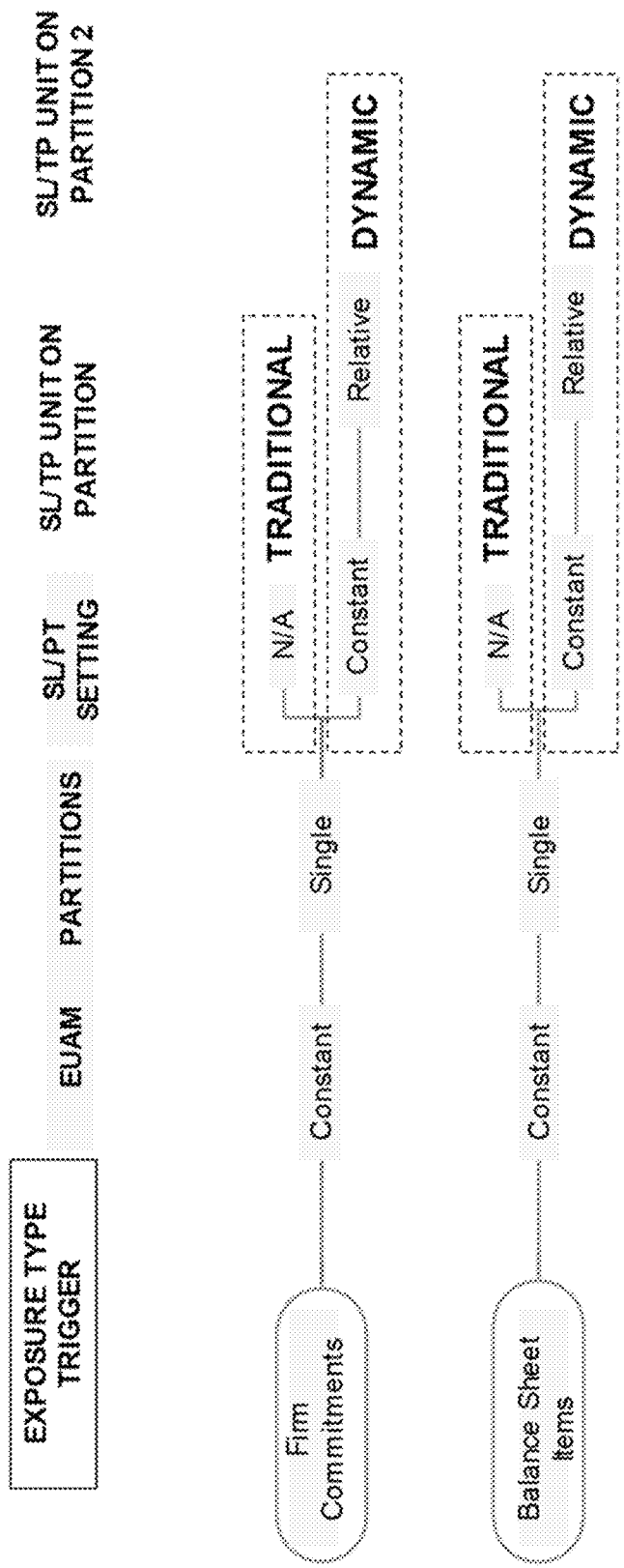
FIG. 11 is a schematic diagram showing various options for adding "dynamism" to a traditional microhedging programs using the additional parameters.

FIG. 11 is a schematic diagram showing various options for adding "dynamism" to a traditional microhedging programs using the additional parameters. Here, traditional microhedging programs are characterized by Firm Commitments and Balance Sheet items using constant EUM in a single partition with no SL/TP limits. The six dimensions allows SL/TP limits to be added to the microhedging decisions.

The following are some examples of how these additional four dimensions can be used in certain exemplary embodiments. In these examples, EUM is specified as a percentage, and SL and TP are specified separately for each MW as either a rate or percentage of WAER in accordance with the SL/TP unit dimension. Among other things, the use of separate SL and TP values per MW allows for the values to be different, e.g., to allow for different stop-loss and take-profit risks (e.g., a particular hedging program instance might stop-loss at a −2% change in exchange rate relative to WAER but might take-profit at, say, +4% change in exchange rate relative to WAER). For convenience, Exposure Type Trigger is not represented in the dimensions although it should be recognized that Exposure Type Trigger generally would be specified for any given hedging program and is an important factor in characterizing the type of hedging program and how it operates.

Example 1

The following is an example of a form of hedging program with a single partition utilizing a constant EUM and constant SL/TP values specified using relative values:

|    | Partition 1 | | |
| --- | --- | --- | --- |
| MW | EUM | SL | TP |
| 0  | 100% | 2% | 2% |
| 1  | 100% | 2% | 2% |
| 2  | 100% | 2% | 2% |
| 3  | 100% | 2% | 2% |
| 4  | 100% | 2% | 2% |
| 5  | 100% | 2% | 2% |
| 6  | 100% | 2% | 2% |
| 7  | 100% | 2% | 2% |
| 8  | 100% | 2% | 2% |
| 9  | 100% | 2% | 2% |
| 10 | 100% | 2% | 2% |
| 11 | 100% | 2% | 2% |
| 12 | 100% | 2% | 2% |

Figure 12:
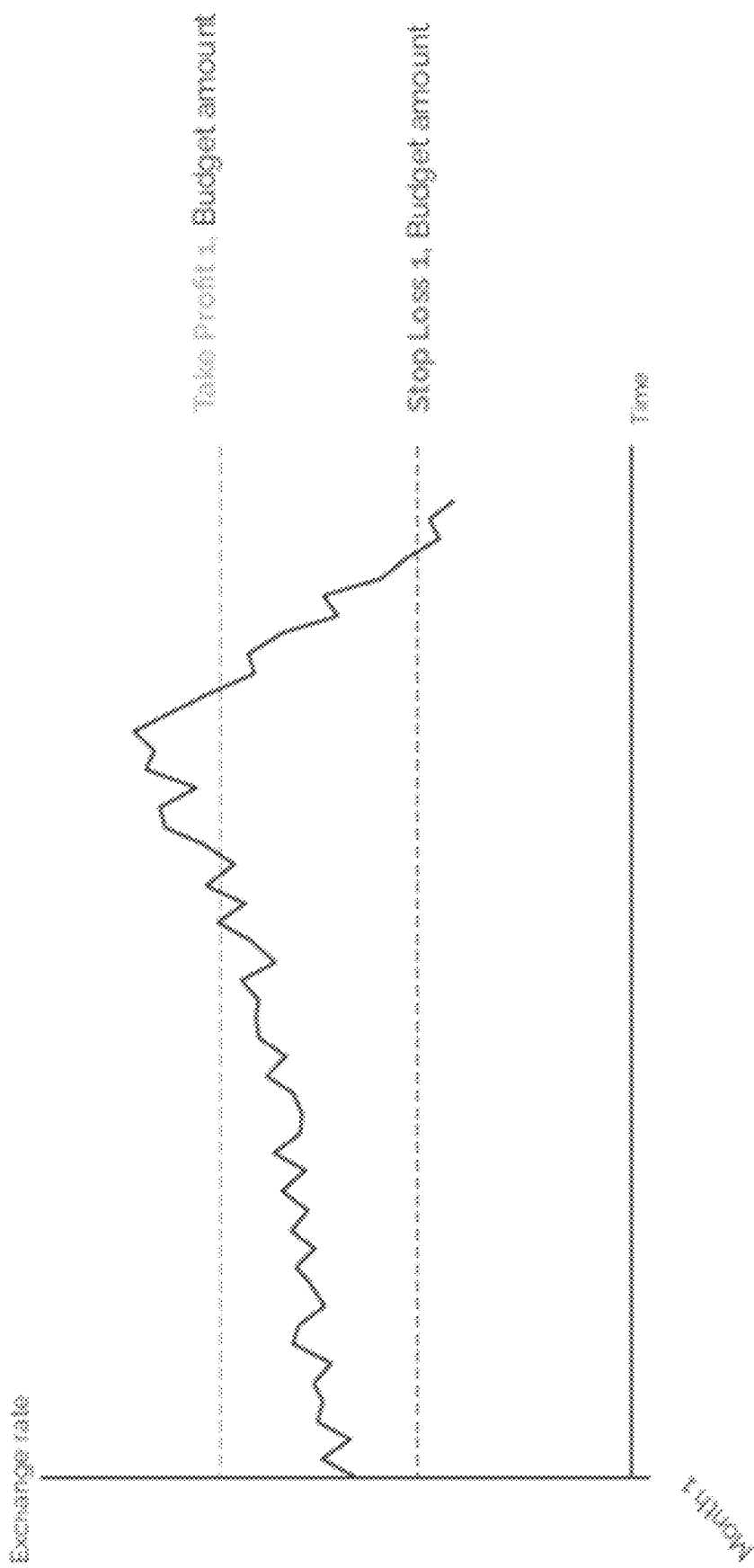
FIG. 12 is a first sample graph showing stop-loss and take-profit limits relative to changes in exchange rate.

FIG. 12 is a sample graph showing stop-loss and take-profit limits relative to changes in exchange rate (e.g., Euros to Dollars) in accordance with the SL/TP values above. It should be noted that in this sample graph, the timeline is in reverse and runs from right to left, i.e., month 1 is one month before the value date of a hedging entry, month 2 is two months before the value date of the hedging entry, etc.

Example 2

The following is an example of a form of hedging program with a single partition utilizing a constant EUM and variable SL/TP values specified using relative values:

|    | Partition 1 | | |
|----|------|------|------|
| MW | EUM  | SL   | TP   |
| 0  | 100% | 0%   | 0%   |
| 1  | 100% | 1%   | 1%   |
| 2  | 100% | 2%   | 2%   |
| 3  | 100% | 3%   | 3%   |
| 4  | 100% | 4%   | 4%   |
| 5  | 100% | 5%   | 5%   |
| 6  | 100% | 6%   | 6%   |

Figure 13:
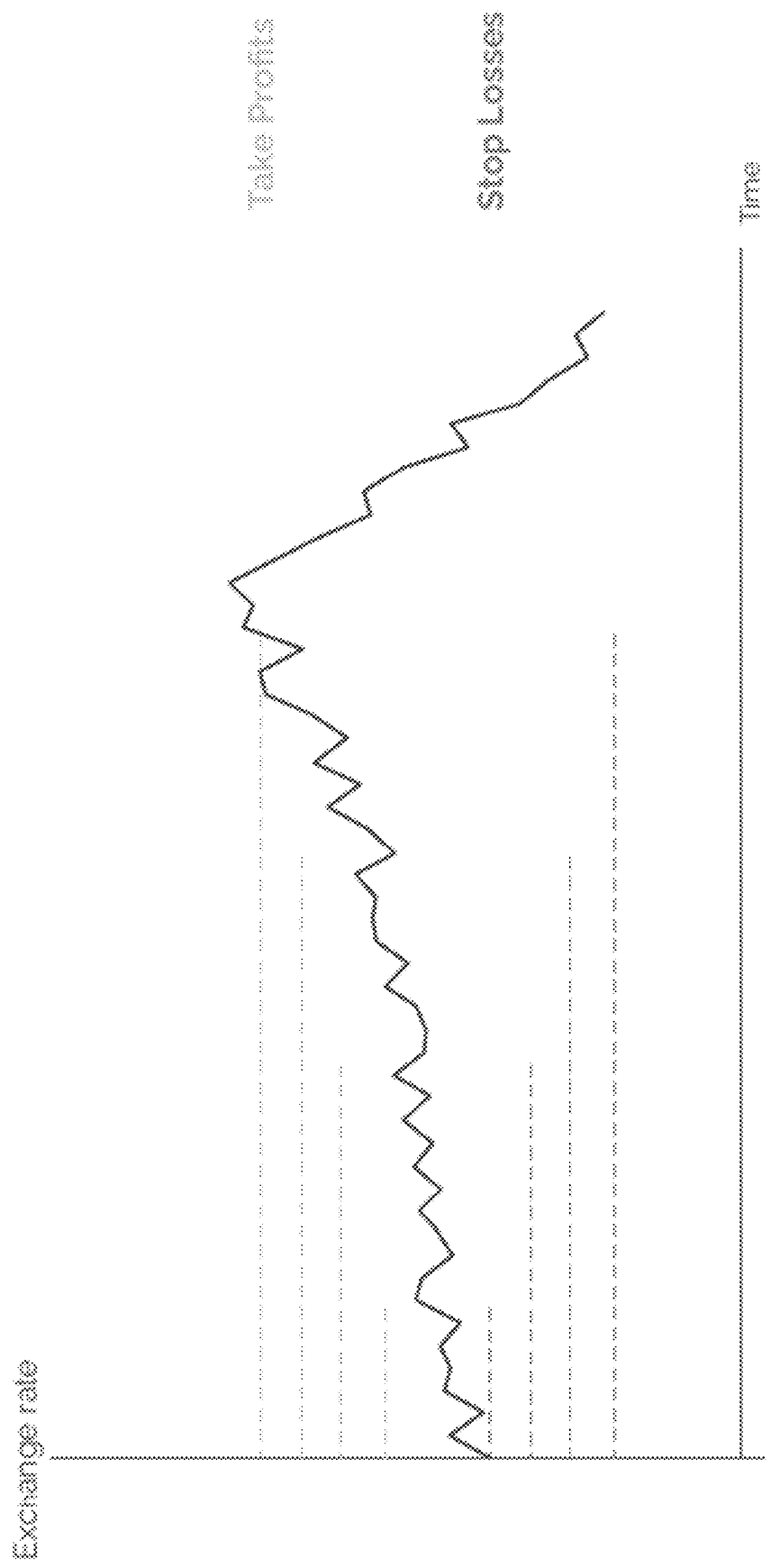
FIG. 13 is a first sample graph showing stop-loss and take-profit limits relative to changes in exchange rate.

FIG. 13 is a sample graph showing stop-loss and take-profit limits relative to changes in exchange rate (e.g., Euros to Dollars) in accordance with SL/TP values above. It should be noted that in this sample graph, the timeline is in reverse and runs from right to left, i.e., month 1 is one month before the value date of a hedging entry, month 2 is two months before the value date of the hedging entry, etc. In this example, 100% of the exposure is hedged at SL/TP values that get more stringent from month to month, i.e., from ±6% in month 6 (i.e., six months before the value date) to ±1% in month 1 (i.e., 1 month before the value date).

Example 3

The following is an example of a form of layered hedging program with a single partition utilizing variable EUMs (SL/TP is N/A and SL/TP values are shown here as zero):

|    | Partition 1 | | |
|----|------|------|------|
| MW | EUM  | SL   | TP   |
| 0  | 72   | 0    | 0    |
| 1  | 72   | 0    | 0    |
| 2  | 66   | 0    | 0    |
| 3  | 60   | 0    | 0    |
| 4  | 54   | 0    | 0    |
| 5  | 48   | 0    | 0    |
| 6  | 42   | 0    | 0    |
| 7  | 36   | 0    | 0    |
| 8  | 30   | 0    | 0    |
| 9  | 24   | 0    | 0    |
| 10 | 18   | 0    | 0    |
| 11 | 12   | 0    | 0    |
| 12 | 6    | 0    | 0    |

Figure 14:
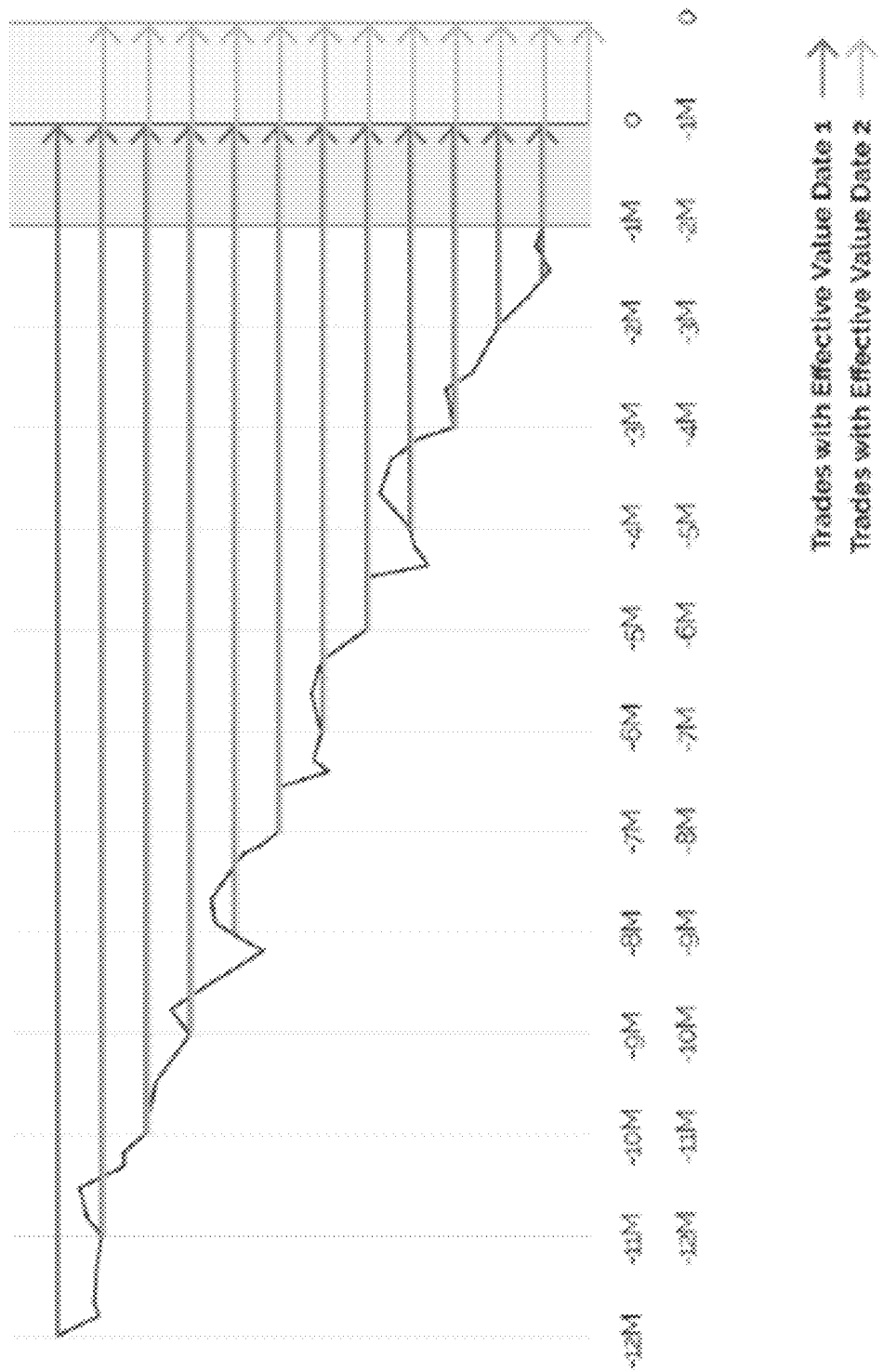
FIG. 14 is a first sample graph showing how trades with two effective value dates are layered for hedging based on a Continuous Forecast using variable EUM and no SL/TP.

FIG. 14 is a sample graph showing how trades with two effective value dates are layered for hedging based on a Continuous Forecast using variable EUM and no SL/TP. This example shows one single exposure, received 12 months in advance on a "rolling" basis, that is layered, as opposed to, say, receiving new entries every month for the same VD.

Example 4

The following is an example of a hedging program with a two partitions utilizing a constant EUM values and constant SL/TP values specified using relative values:

|    | Partition 1 | | | Partition 2 | | |
|----|-----|----|----|-----|----|----|
| MW | EUM | SL | TP | EUM | SL | TP |
| 0  | 50% | 2% | 2% | 50% | 4% | 4% |
| 1  | 50% | 2% | 2% | 50% | 4% | 4% |
| 2  | 50% | 2% | 2% | 50% | 4% | 4% |
| 3  | 50% | 2% | 2% | 50% | 4% | 4% |
| 4  | 50% | 2% | 2% | 50% | 4% | 4% |
| 5  | 50% | 2% | 2% | 50% | 4% | 4% |
| 6  | 50% | 2% | 2% | 50% | 4% | 4% |
| 7  | 50% | 2% | 2% | 50% | 4% | 4% |
| 8  | 50% | 2% | 2% | 50% | 4% | 4% |
| 9  | 50% | 2% | 2% | 50% | 4% | 4% |
| 10 | 50% | 2% | 2% | 50% | 4% | 4% |
| 11 | 50% | 2% | 2% | 50% | 4% | 4% |
| 12 | 50% | 2% | 2% | 50% | 4% | 4% |

Figure 15:
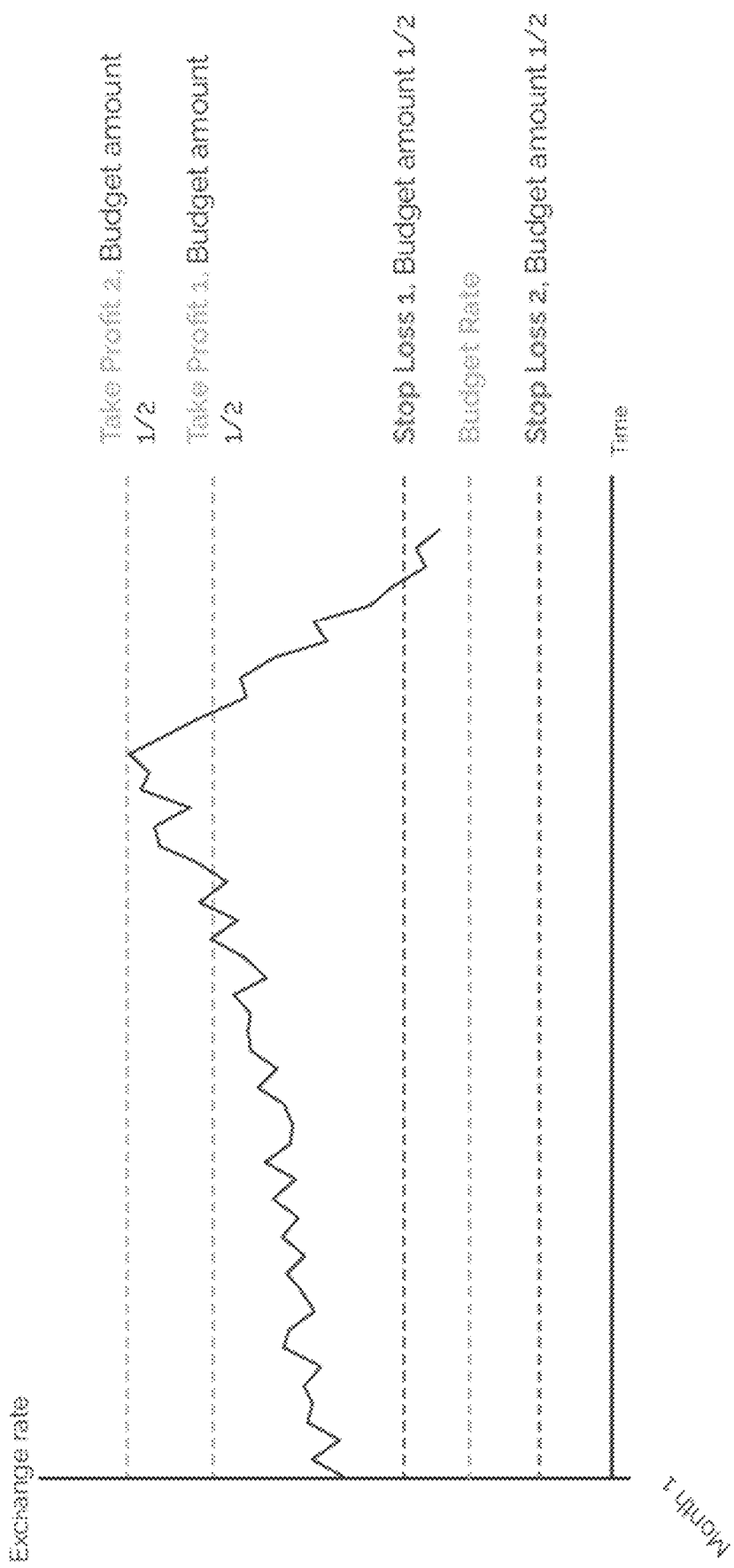
FIG. 15 is a first sample graph showing stop-loss and take-profit limits relative to changes in exchange rate.

In this example, 50% of the exposed amount would be hedged at ±2% and 50% of the exposed amount would be hedged at ±4%. Thus, for example, in a situation where exchange rates are rising or dropping, two SL events or two TP events might be triggered in the same MW, one at the Partition 1 SL/TP value and the other at the Partition 2 SL/TP value. It is also conceivable that in a situation where exchange rates are varying widely, one type of event might be triggered based on the Partition 1 SL/TP values (e.g., a stop-loss event at −2%) and a different type of event might be triggered based on the Partition 2 SL/TP values (e.g., a take-profit event at +4%). FIG. 15 is a sample graph showing stop-loss and take-profit limits relative to changes in exchange rate (e.g., Euros to Dollars) in accordance with SL/TP values above. It should be noted that in this sample graph, the timeline is in reverse and runs from right to left, i.e., month 1 is one month before the value date of a hedging entry, month 2 is two months before the value date of the hedging entry, etc.

Example 5

The following is an example of a hedging program with two partitions utilizing constant EUM values and different SL/TP values both within a partition and across partitions for a given MW. In this example, the SL/TP values in Partition 1 are specified using absolute values while the SL/TP values in Partition 2 are specified using relative values. This example is very similar to Example 4 but demonstrates how different SL and TP values can be used in a single partition and also demonstrates how different SL and TP units can be used in a single hedging program.

|    | Partition 1 | | | Partition 2 | | |
|----|-----|------|------|-----|----|----|
| MW | EUM | SL   | TP   | EUM | SL | TP |
| 0  | 50  | 1.20 | 1.26 | 50  | 6% | 6% |
| 1  | 50  | 1.20 | 1.26 | 50  | 6% | 6% |
| 2  | 50  | 1.20 | 1.26 | 50  | 6% | 6% |
| 3  | 50  | 1.20 | 1.26 | 50  | 6% | 6% |
| 4  | 50  | 1.20 | 1.26 | 50  | 6% | 6% |
| 5  | 50  | 1.20 | 1.26 | 50  | 6% | 6% |
| 6  | 50  | 1.20 | 1.26 | 50  | 6% | 6% |
| 7  | 50  | 1.20 | 1.26 | 50  | 6% | 6% |

-continued

| | Partition 1 | | | Partition 2 | | |
|---|---|---|---|---|---|---|
| MW | EUM | SL | TP | EUM | SL | TP |
| 8 | 50 | 1.20 | 1.26 | 50 | 6% | 6% |
| 9 | 50 | 1.20 | 1.26 | 50 | 6% | 6% |
| 10 | 50 | 1.20 | 1.26 | 50 | 6% | 6% |
| 11 | 50 | 1.20 | 1.26 | 50 | 6% | 6% |
| 12 | 50 | 1.20 | 1.26 | 50 | 6% | 6% |

Figure 16:
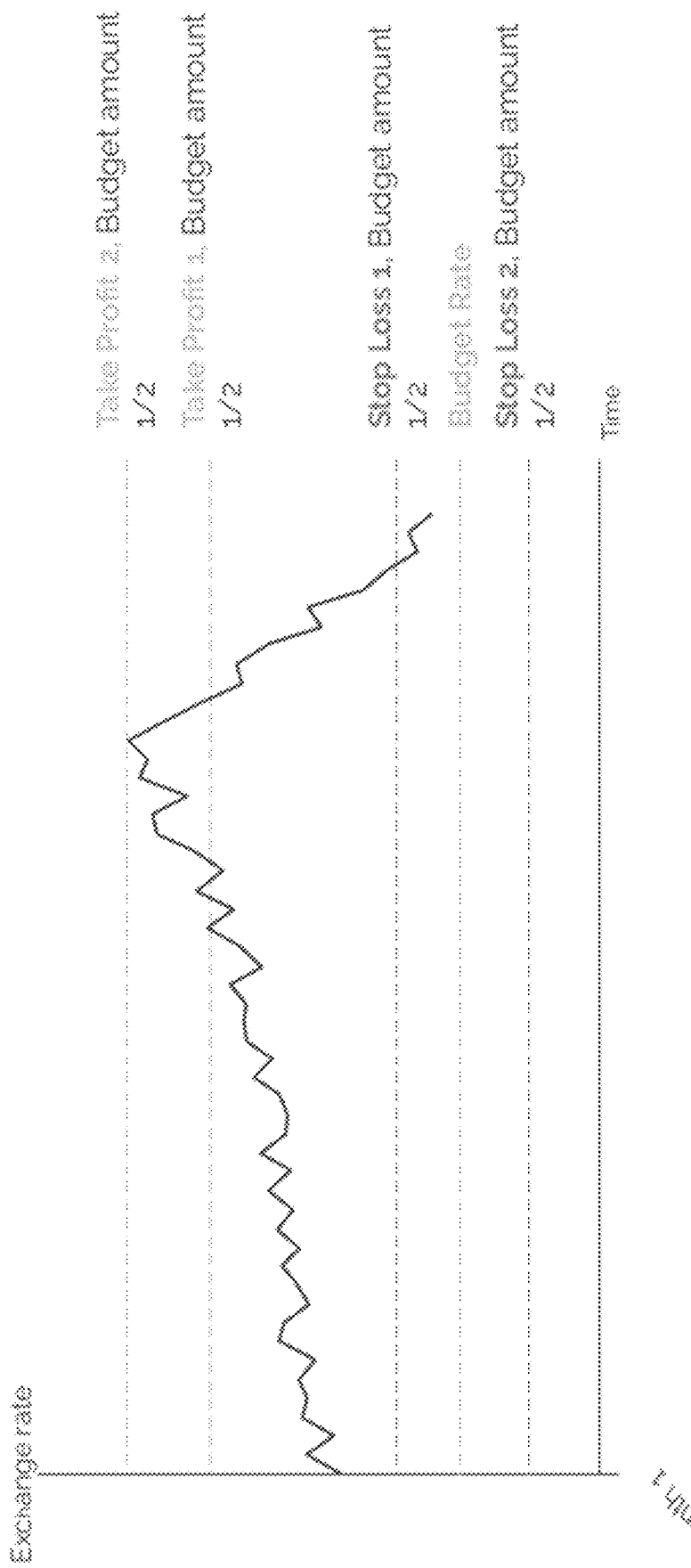
FIG. 16 is a first sample graph showing stop-loss and take-profit limits relative to changes in exchange rate.

Similar to Example 4, 50% of the exposed amount would be hedged using the Partition 1 SL/TP values and 50% of the exposed amount would be hedged using the Partition 2 SL/TP values. FIG. 16 is a sample graph showing stop-loss and take-profit limits relative to changes in exchange rate (e.g., Euros to Dollars) in accordance with SL/TP values above. It should be noted that in this sample graph, the timeline is in reverse and runs from right to left, i.e., month 1 is one month before the value date of a hedging entry, month 2 is two months before the value date of the hedging entry, etc.

Example 6

The following is an example of a hedging program with two partitions utilizing variable EUM values in each partition and different SL/TP values both within a partition and across partitions for a given MW. In this example, the SL/TP values in Partition 1 are N/A (indicated by zero) while variable SL/TP values in Partition 2 are specified using relative values.

| | Partition 1 | | | Partition 2 | | |
|---|---|---|---|---|---|---|
| MW | EUM | SL | TP | EUM | SL | TP |
| 0 | 25 | 0 | 0 | 72 | 0% | 0% |
| 1 | 25 | 0 | 0 | 72 | 1% | 1% |
| 2 | 20 | 0 | 0 | 66 | 2% | 2% |
| 3 | 15 | 0 | 0 | 60 | 3% | 3% |
| 4 | 10 | 0 | 0 | 54 | 4% | 4% |
| 5 | 5 | 0 | 0 | 48 | 5% | 5% |
| 6 | 1 | 0 | 0 | 42 | 6% | 6% |

Figure 17:
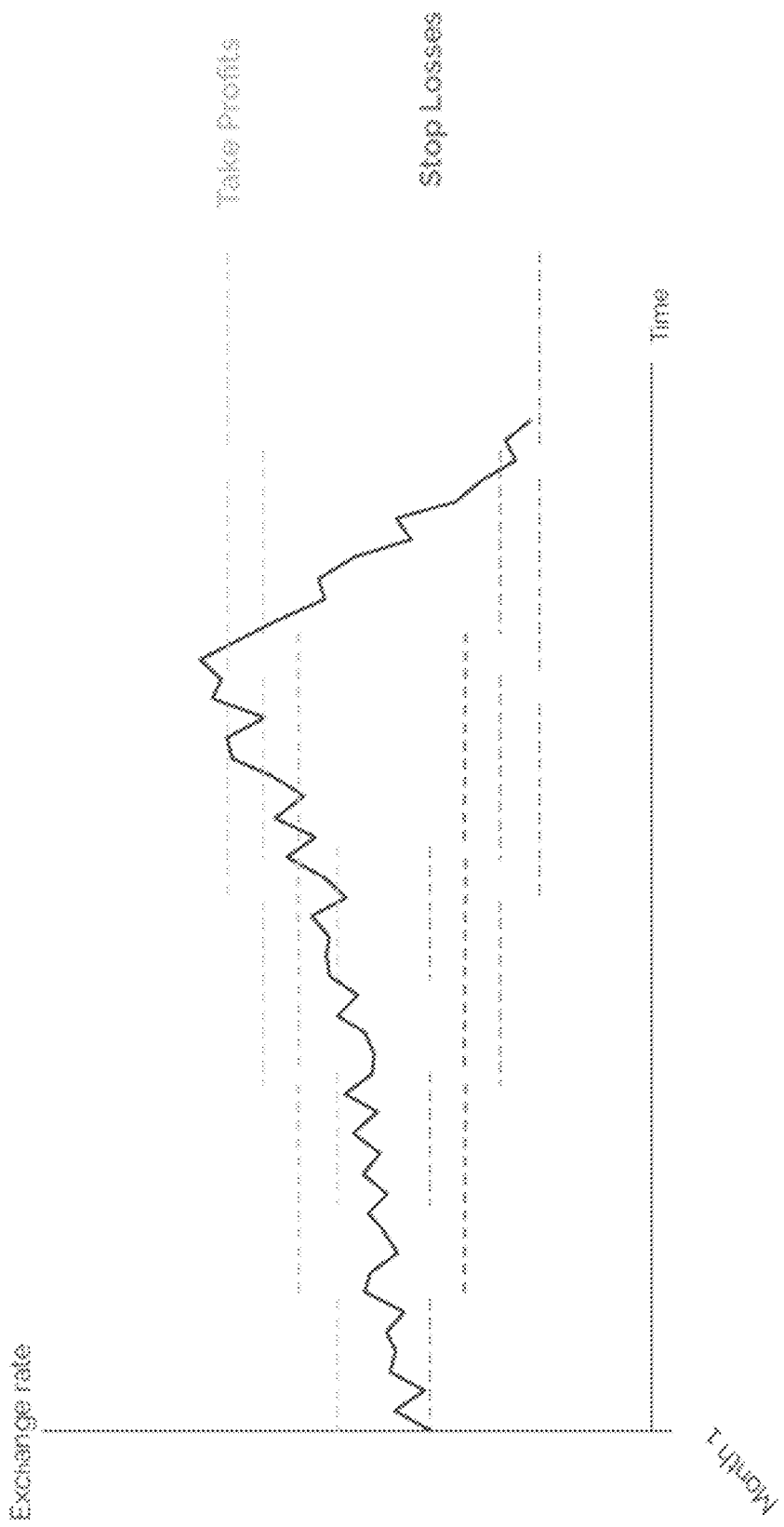
FIG. 17 is a first sample graph showing stop-loss and take-profit limits relative to changes in exchange rate.

FIG. 17 is a sample graph showing stop-loss and take-profit limits relative to changes in exchange rate (e.g., Euros to Dollars) in accordance with SL/TP values above. It should be noted that in this sample graph, the timeline is in reverse and runs from right to left, i.e., month 1 is one month before the value date of a hedging entry, month 2 is two months before the value date of the hedging entry, etc.

Example 7

Figure 18:
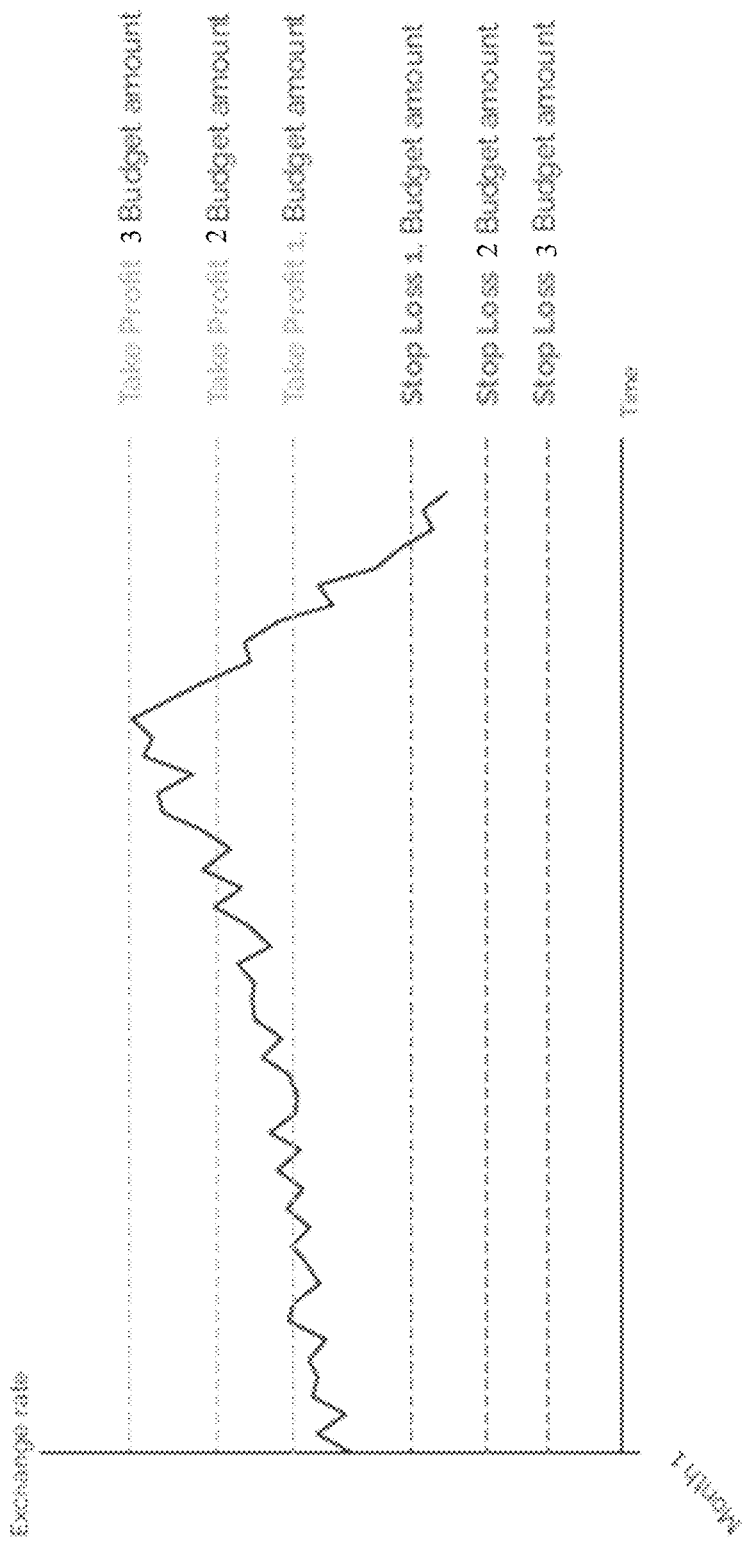
FIG. 18 is a sample graph showing stop-loss and take-profit limits relative to changes in exchange rate for three partitions.

The following is an example of a form of static hedging program with three partitions utilizing a constant EUM and constant SL/TP values in each partition. In this example, the hedging program would be characterized by Fixed Period Forecast, constant EUM, multiple partitions, and constant SL/TP setup. FIG. 18 is a sample graph showing stop-loss and take-profit limits relative to changes in exchange rate (e.g., Euros to Dollars) for three partitions. It should be noted that in this sample graph, the timeline is in reverse and runs from right to left, i.e., month 1 is one month before the value date of a hedging entry, month 2 is two months before the value date of the hedging entry, etc.

Example 8

Figure 19:
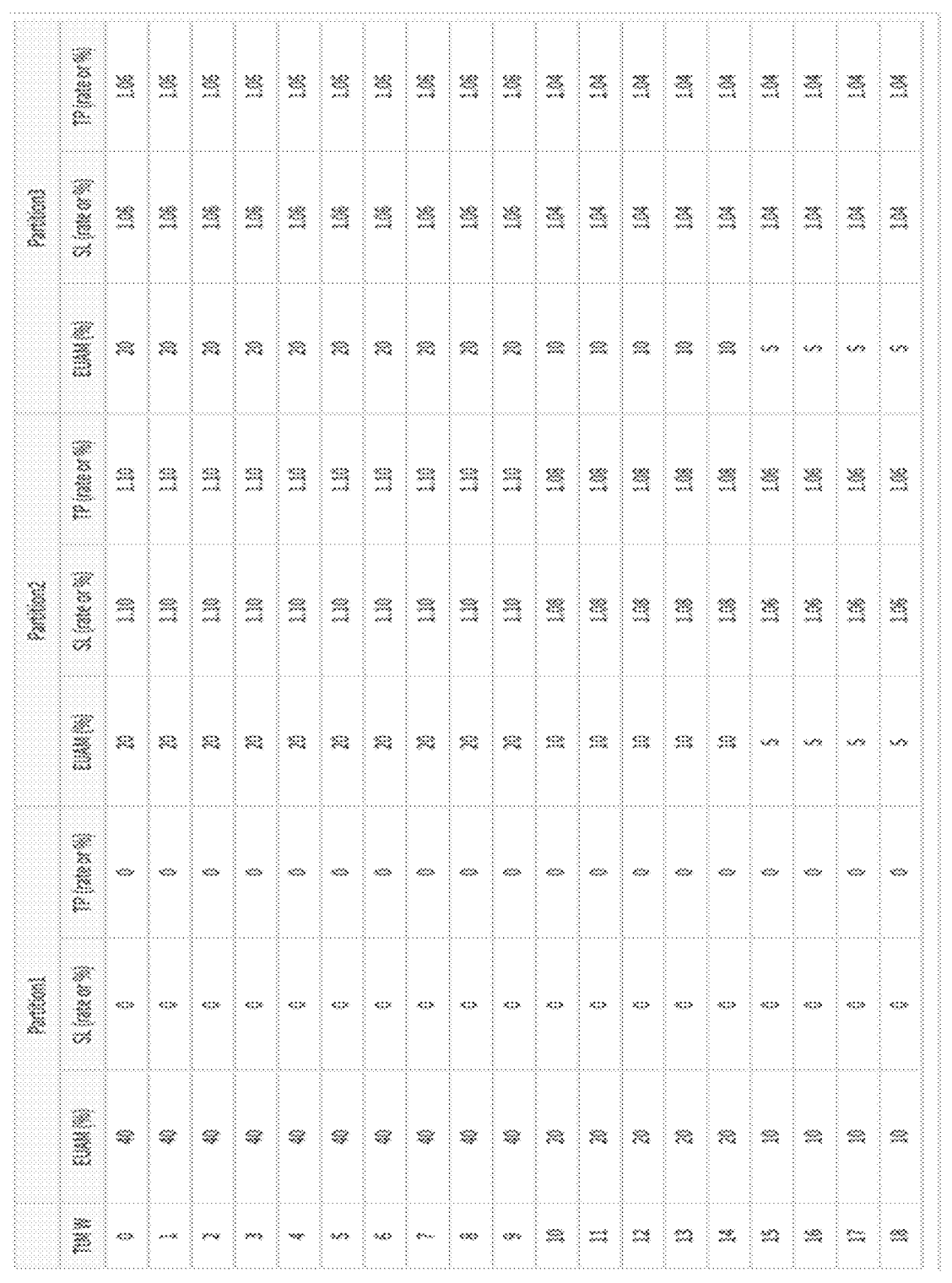

The following is an example of a form of layered hedging program with three partitions utilizing variable EUM and both constant and variable SL/TP values. In this example, the hedging program would be characterized by a Continuous Forecast, variable EUM, multiple partitions, and both constant and variable SL/TP setup. FIG. 19 is a sample table showing the dimension values for the hedging program for three partitions.

Example 9

Figure 20:
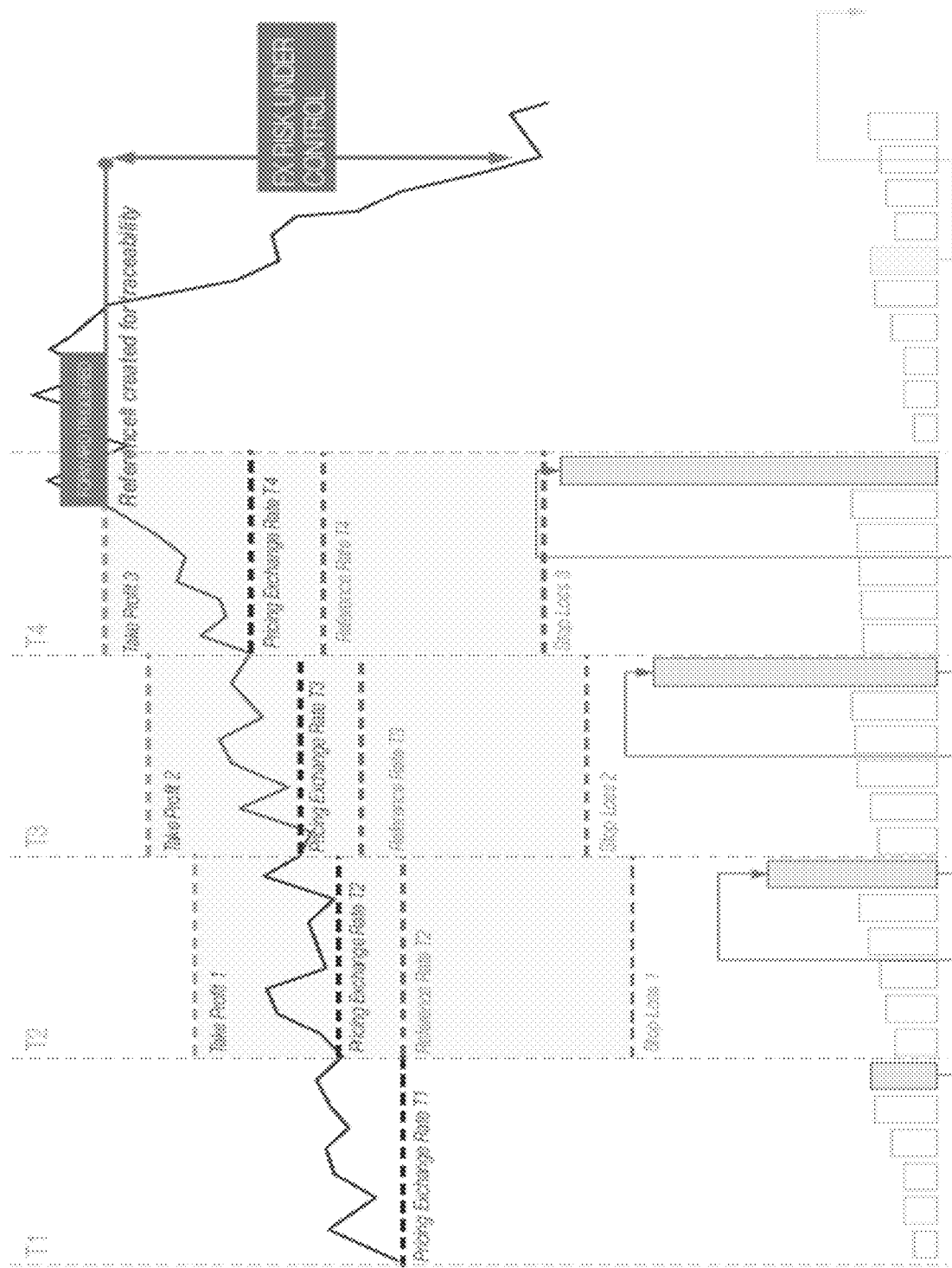
FIG. 20 is a sample graph showing stop-loss and take-profit limits relative to changes in exchange rate for three distinct microhedging time periods (T2-T4).

The following is an example of a form of microhedging program using constant SL/TP values. In this example, the hedging program would be characterized by Firm Commitments and BS Items, constant EUM, and a single partition with constant SL/TP values using relative values. FIG. 20 is a sample graph showing stop-loss and take-profit limits relative to changes in exchange rate (e.g., Euros to Dollars) for three distinct microhedging time periods (T2-T4). Each time period has a reference rate and SL and TP limits relative to that reference rate. Each time period also has a pricing exchange rate. Microhedging events in a given time period would be hedged based on the exchange rates during that time period relative to the SL and TP limits associated with that time period and the pricing exchange rate associated with that time period. In this example, exchange rates do not reach the SL or TP limits in time periods T2 or T3, so microhedging events during those time periods would be hedged at the price exchange rate for the time period.

Parameterized Hedging Programs

It should be noted that dimensional configurations of the types represented in the above examples can be used in any of various forms as parameterized programs for a parameterized hedging engine 160, where each dimensional configuration represents a specific hedging program instance that can be implemented by the parameterized hedging engine 160. Such dimensional configurations may be generated automatically by the system based on express configuration selections made by a user via a graphical user interface (e.g., by providing selectable options of the types shown in FIG. 21, with additional information such as EUM and SL/TP values entered or selected separately through additional GUI screens) and/or by the client or administrator. For convenience, Exposure Type Trigger is not represented in the above dimensional configuration examples although it should be recognized that Exposure Type Trigger generally would be included explicitly or implicitly as part of the parameterized program for each hedging program instance. For example, in some cases, the Exposure Type Trigger for a particular hedging program instance might be explicitly included in the parameterized program, while in other cases, the Exposure Type Trigger for a particular program instance might be inferred from the type and frequency of client exposure data received (e.g., a particular hedging program instance might implement a form of microhedging program if the client exposure data includes firm commitments and balance sheet items with no SL/TP). For convenience, MW values are represented in the above dimensional configuration examples although it should be recognized that the MW values could be excluded and instead inferred, e.g., based on the row number of tabular data.

Figure 21:
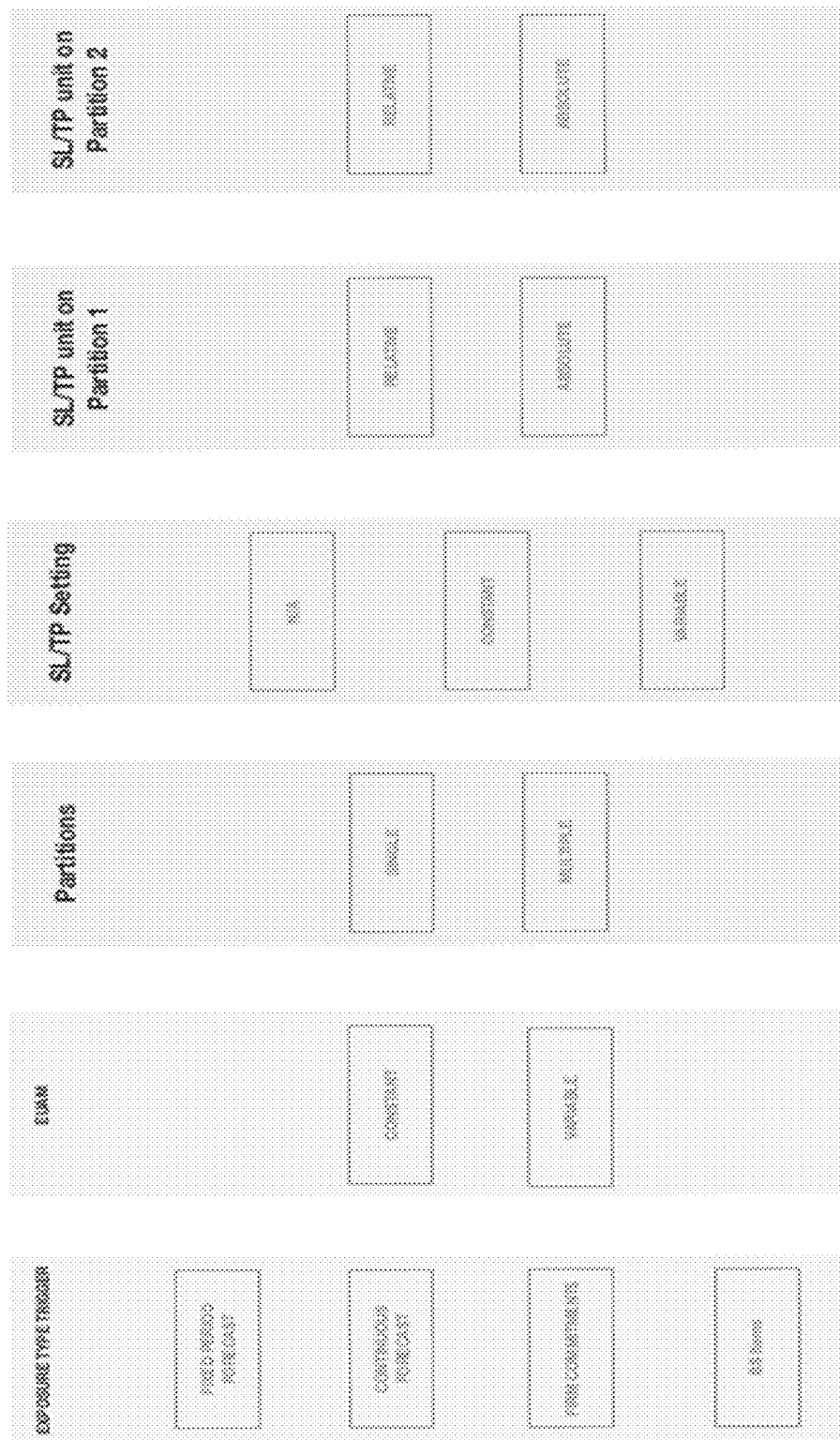
FIG. 21 shows selectable options for automatic generation of dimensional configurations in accordance with certain exemplary embodiments.

Interestingly, such parameterized programs do not necessarily make express distinctions between the different configuration selections (e.g., as shown in FIG. 21) or even between different types of hedging programs (e.g., static, rolling, layered, microhedging, and variations thereof) but instead direct implementation of hedging strategies based on the Exposure Type Trigger, EUM values, number of partitions, and SL/TP settings/units, and/or other parameters associated with the parameterized program. For example, if all of the EUM values in a given partition are the same, then that partition uses constant EUM; otherwise that partition uses variable EUM. Similarly, if EUM/SL/TP is only provided for a single partition, then the hedging program uses a single partition; otherwise the hedging program uses multiple partitions. Similarly, if all of the SL/TP values in a given partition are zero, then SL/TP for that partition is N/A; if all of the SL/TP values in a given partition are the same non-zero value, then SL/TP for that partition is constant; if the SL/TP values in a given partition are different and include non-zero values, then SL/TP for that partition is variable. Similarly, SL/TP units in a given partition are based on whether the SL/TP values are specified using absolute or relative values. In essence, the type of hedging program (e.g., static, rolling, layered, microhedging) and hedging program variation for a given hedging program instance is determined by the dimensional configuration and the type and frequency of client exposure data received from the client.

In certain exemplary embodiments, the parameterized hedging engine 160 is configured to implement multiple hedging program instances for one or more clients based on multiple dimensional configuration parameterized programs, i.e., by applying each parameterized program to client exposure data and market information in accordance with the program dimensions associated with the corresponding hedging program instance. The parameterized hedging engine 160 can be configured to be largely event-driven, e.g., making hedging decisions for a given hedging program instance as exposure data and market information is received. In this regard, time-based hedging decisions (e.g., hedging decisions made at the start or end of a MW) can be considered as being event-driven. The parameterized hedging engine 160 generally maintains a database to store such things as parameterized programs and related information (e.g., budget amounts, budget rates, reference rates, pricing exchange rates, etc.), client exposure data (both as received/preprocessed and aggregated), and market information.

For one example, for hedging program instances that utilize SL/TP, the parameterized hedging engine 160 can be configured to set up SL/TP triggers in one or more market monitor systems 30 or alternatively can be configured to generate its own SL/TP triggers based on market data received from one or more market monitor systems 30. The parameterized hedging engine 160 can be configured to set up SL/TP triggers for all partitions associated with a particular hedging program instance at once or to sequentially set up SL/TP triggers for partitions successively as trigger events occur (e.g., when a trigger event for Partition 1 occurs, set up any SL/TP triggers for Partition 2, etc.). Hedging actions then can be taken based on an SL/TP trigger event in accordance with the appropriate parameterized program, e.g., requesting a SL or TP action be taken based on the EUM value associated with the appropriate MW in an associated partition.

Figure 45:
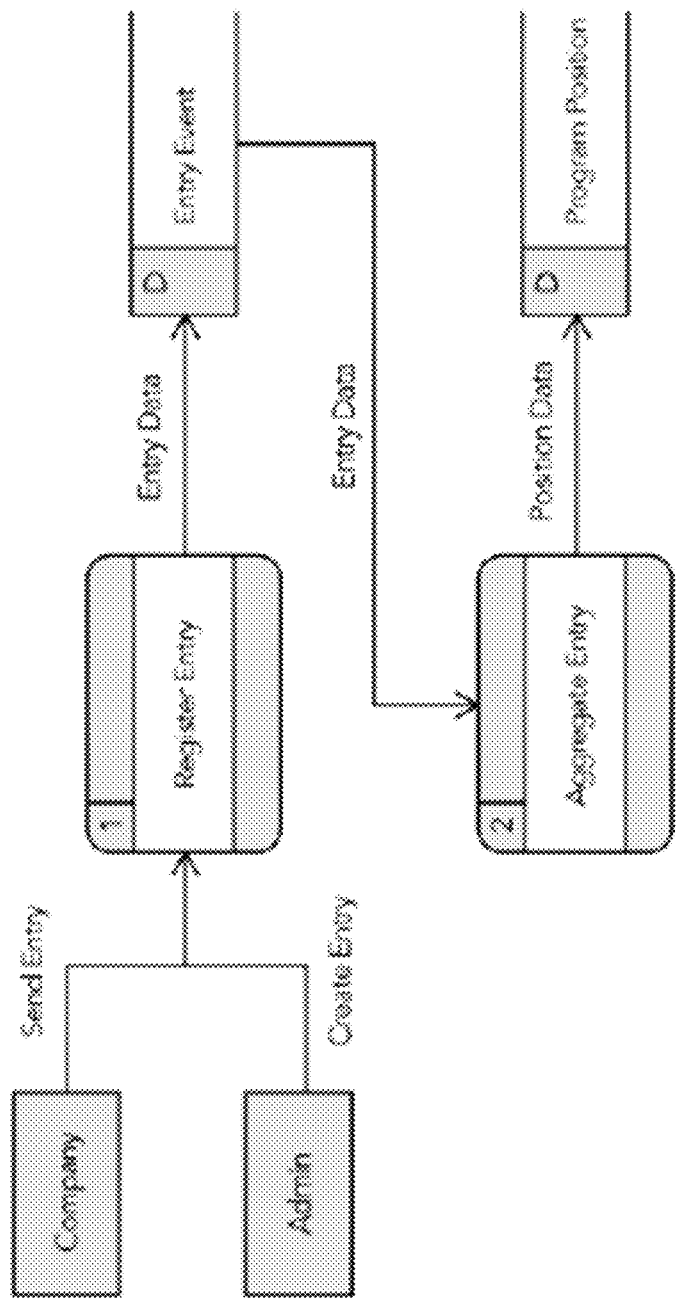
FIG. 45 is a schematic diagram showing how entries are processed, in accordance with certain exemplary embodiments.

Hedging decisions also can be made as client exposure data is received, e.g., deciding whether to immediately request a hedging action or to save/aggregate the exposure data for a possible later hedging action. For example, as demonstrated by example above, multiple transactions during a given MW may be aggregated and hedged together either at the end of the MW or based on an SL/TP event triggered during the MW. FIG. 45 is a schematic diagram showing how entries are aggregated, in accordance with certain exemplary embodiments. Specifically, when an entry is received, it is registered and then converted into an entry event that provides entry data for optional aggregation with other related entries in order to provide position data for a given program position.

Figure 22:
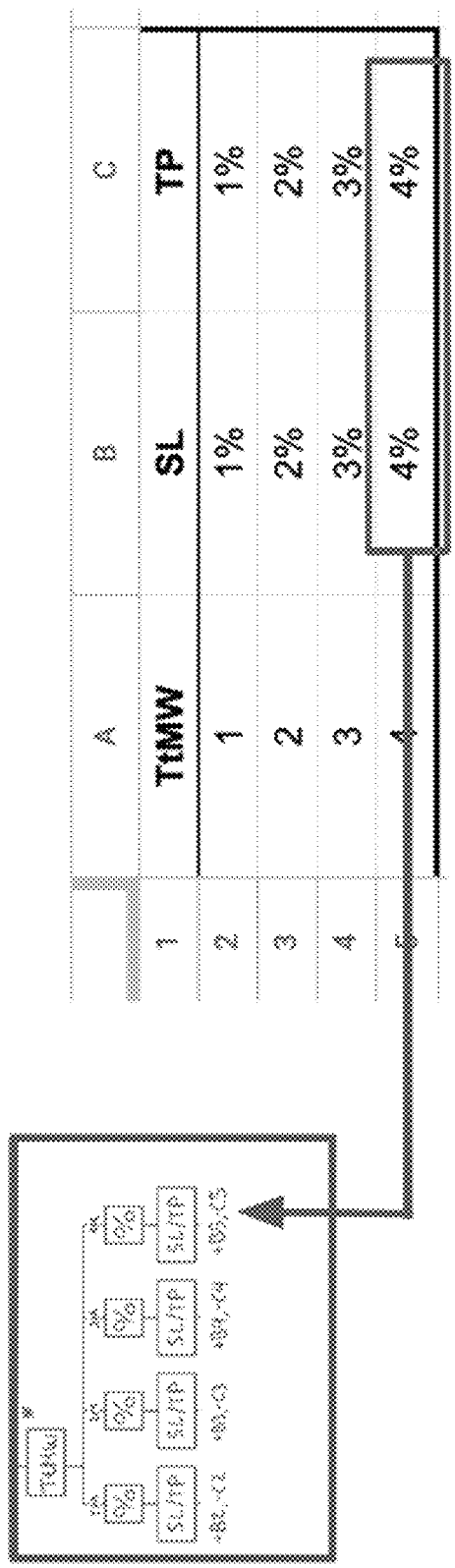
FIG. 22 shows an example of a parameterized program used as a program template, in accordance with certain exemplary embodiments.

In certain exemplary embodiments, each parameterized program can be used at least in part as a program template. FIG. 22 shows an example of a parameterized program used as a program template, in accordance with certain exemplary embodiments. Specifically, the SL and TP values are represented in tabular form, and the SL and TP values associated with a given MW can be determined formulaically from the tabular data, e.g., in the example shown in FIG. 22, the SL and TP values for MW(x−1) (where x=2 to N) are:

$$SL(x-1)=-Bx$$

$$TP(x-1)=+Cx$$

Among other things, such parameterized programming provides an easy way to add and manage hedging program instances in an efficient and scalable manner.

The following is exemplary pseudocode describing the general operation of a parameterized hedging engine 160, in accordance with certain exemplary embodiments:

```
For each parameterized program (client/currency pair/direction/type):
  For client exposure data:
    Retrieve client exposure data for a given value date;
    Compute WAER for non-executed client exposure data;
    Determine maturity window based on the value date;
    For each partition in the parameterized program:
      Determine hedge execution need based on partition parameters;
      If hedge need is conditional (e.g., based on SL/TP)
        Set up conditional order with MM system;
      Else
        Execute hedge directly;
      Endif
    Endfor;
  Endfor;
Endfor.
```

It should be noted that, in certain exemplary embodiments, the engine 160 sets up conditional orders (e.g., based on SL/TP) with the MINI system 30 rather than performing the monitoring and triggering of hedges directly. In certain exemplary embodiments, conditional orders are expressed in absolute terms, and therefore if SL/TP parameters are expressed as a percentage, the percentages are converted to absolute terms based on the WAER. The MINI system 30 tracks exchange rates and determines if/when a hedge needs to be executed based on the SL/TP values. In order to avoid triggering multiple hedge transactions when exchange rates are volatile, the MM 30 typically implements a "one cancels the other" approach in which the first triggered hedge transaction is executed and subsequent triggers are not executed.

It also should be noted that, in certain exemplary embodiments, program parameters can be changed dynamically. For example, parameters such as EUM, SL, TP, the number of partitions, and other parameters can be changed at virtually any time, and the engine 160 will execute the new parameters during its next iteration, including recomputing SL/TP values for already-scheduled conditional orders, setting up any new conditional orders, and executing any new direct hedges.

Combined Hedging Programs

It should be noted that, as mentioned above, programs can be combined such as to apply different hedging strategies to different portions of exposure (e.g., a first hedging strategy applied to 50% of exposure and a second hedging strategy applied to 50% of exposure).

Figure 39:
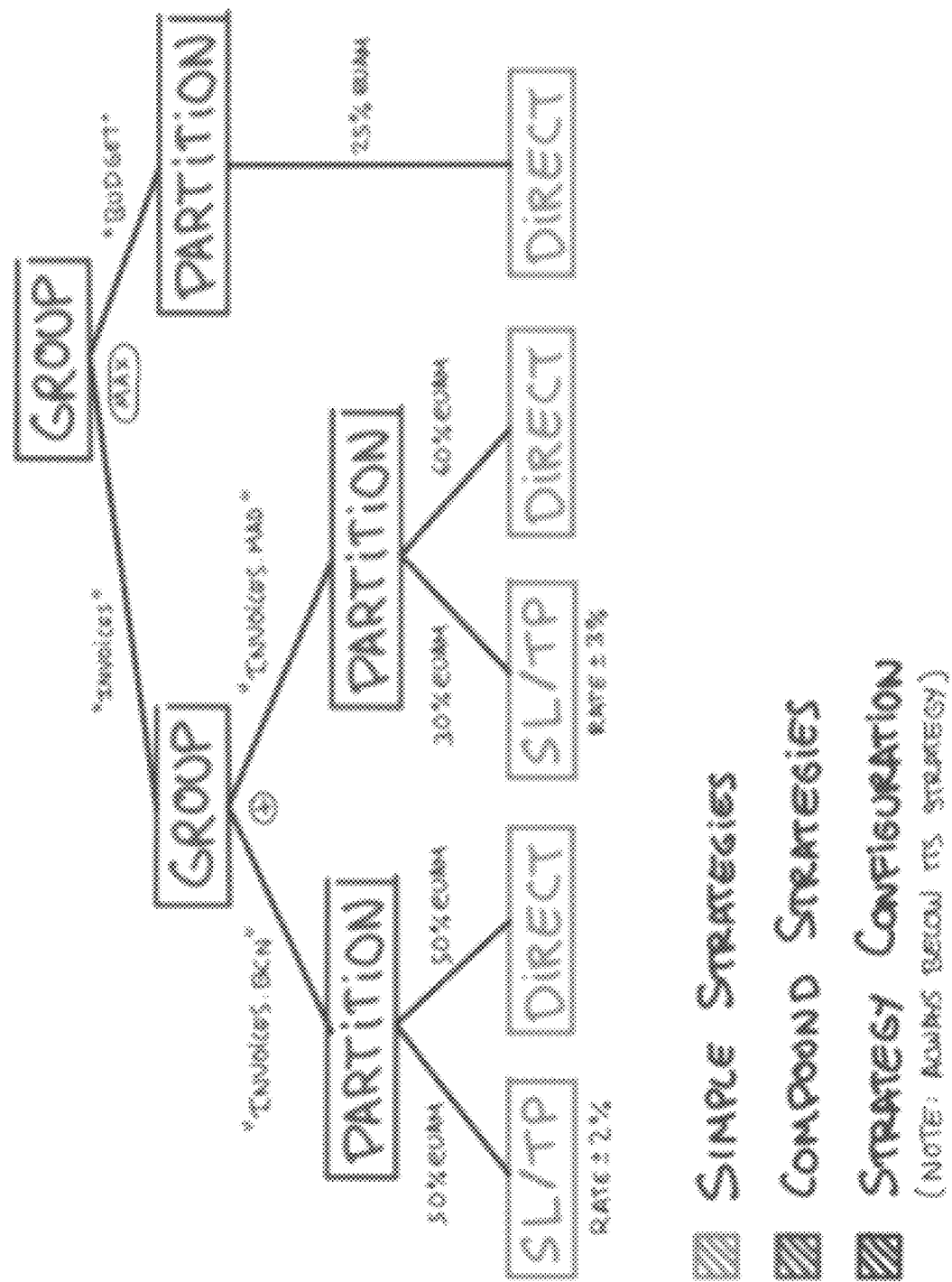
FIG. 39 is a schematic diagram showing concepts of combining hedging programs, in accordance with certain exemplary embodiments.
Figure 41:
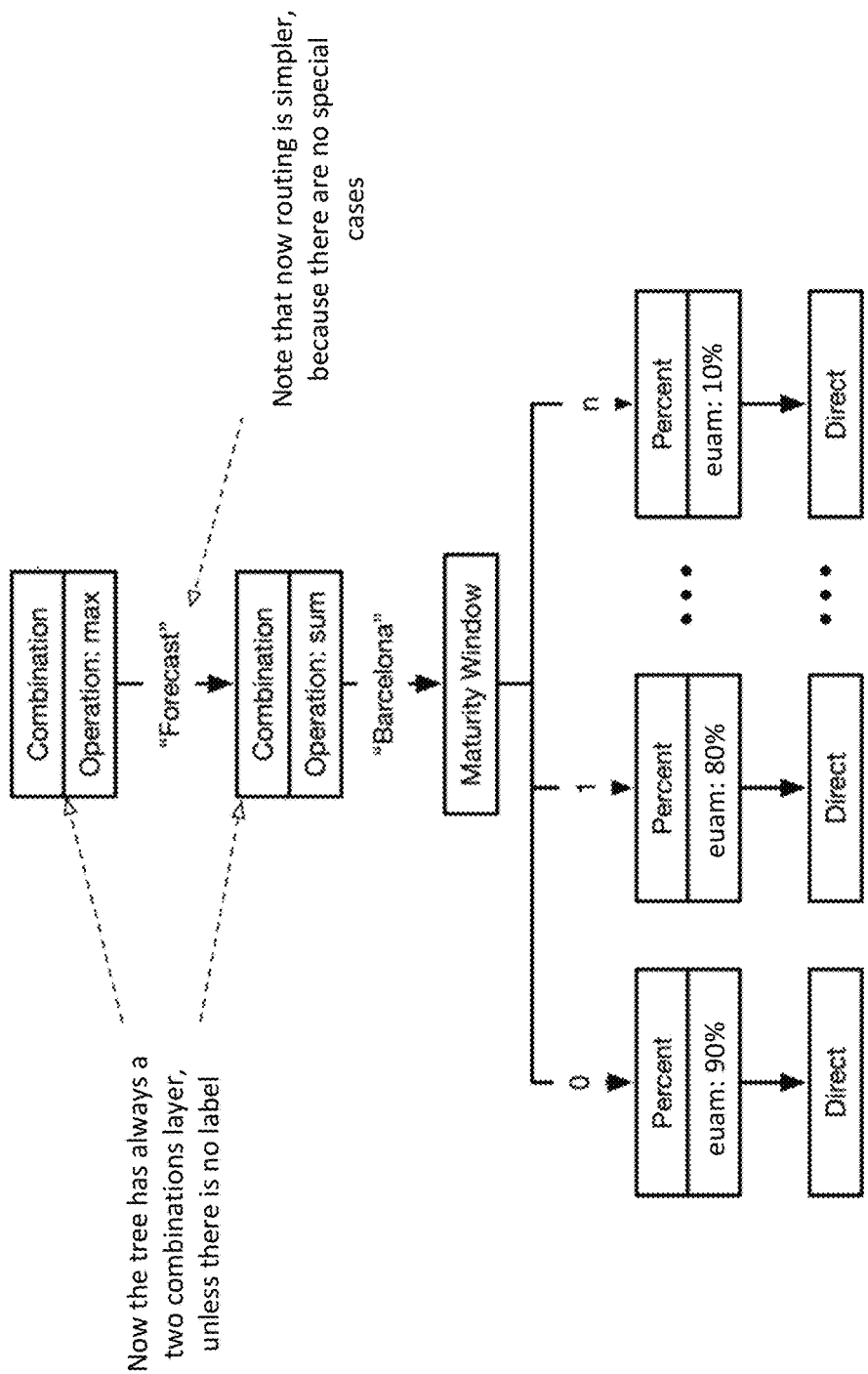
FIG. 41 shows a sample implementation of ID1 in FIG. 40, in accordance with certain exemplary embodiments.
Figure 42:
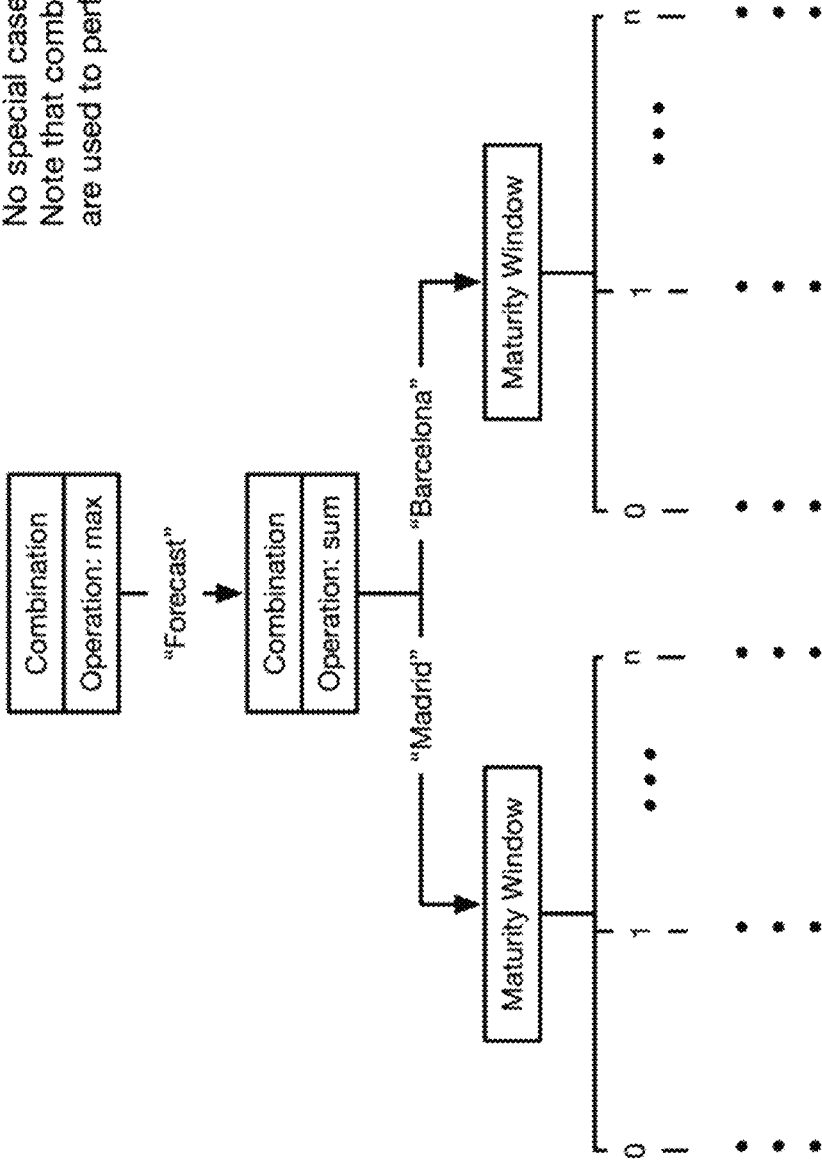
FIG. 42 shows a sample implementation of ID 3 in FIG. 40, in accordance with certain exemplary embodiments.
Figure 43:
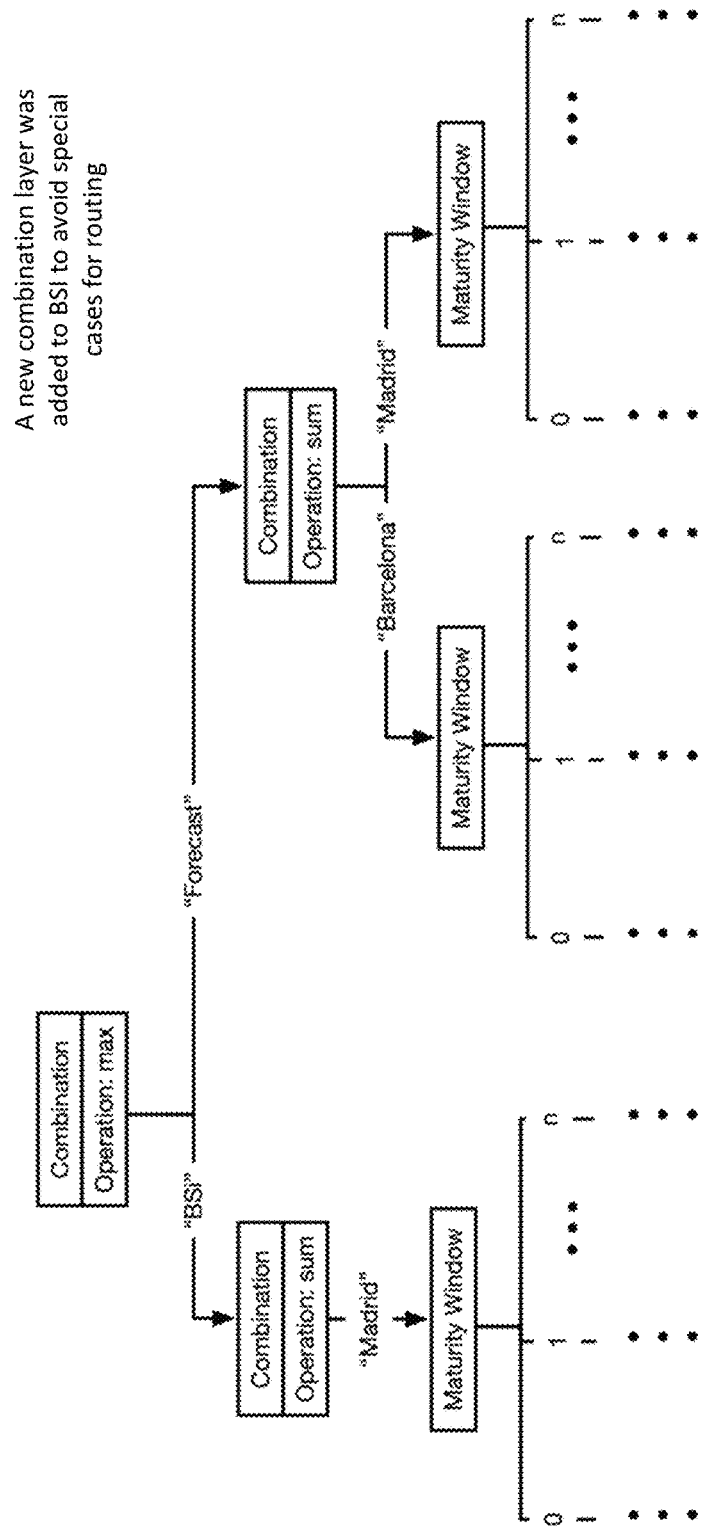
FIG. 43 shows a sample implementation of ID 4 in FIG. 40, in accordance with certain exemplary embodiments.
Figure 44:
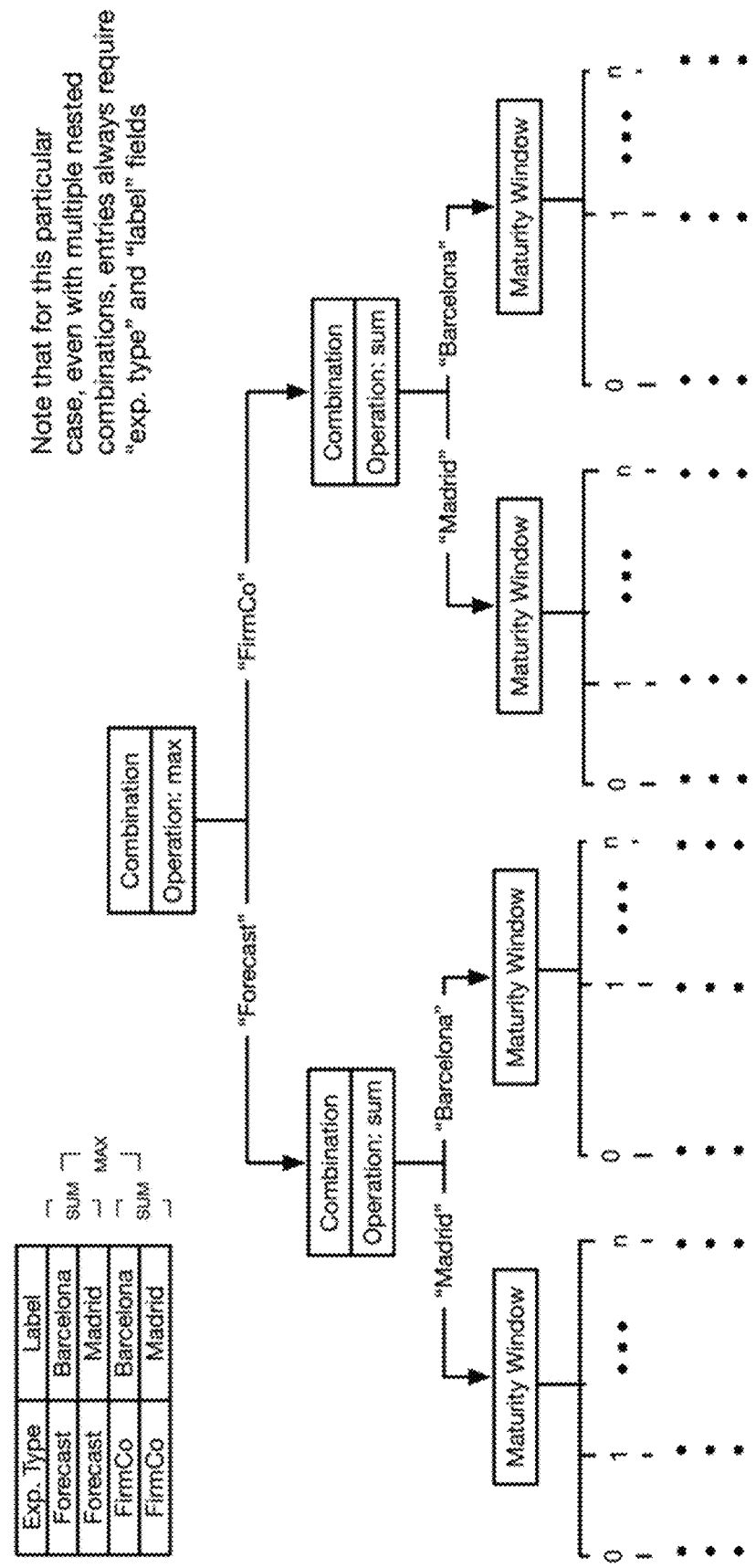
FIG. 44 shows a sample implementation of ID 5 in FIG. 40, in accordance with certain exemplary embodiments.

FIG. 39 is a schematic diagram showing concepts of combining hedging programs, in accordance with certain exemplary embodiments. For example, compound strategies can be built from simple strategies (e.g., a partition including both SL/TP and direct hedging parameters) and/or by combining compound strategies (represented in the figure by the "GROUP" blocks) in a conceptual tree structure. Generally speaking, when combining hedging strategies of different types (e.g., combining forecast, firm commitment, and/or balance sheet items), the "GROUP" block will represent the maximum hedge value from the combined branches, and when combining hedging strategies of the same type, the "GROUP" block will represent a sum (+) of the hedge values from the combined branches. In this example, the result is the maximum of (1) a combination that sums the hedge values of two "invoices" partitions and (2) the hedge value of a single "budget" partition.

FIG. 40 shows some examples of hedging program combinations, in accordance with certain exemplary embodiments. In these examples, a received forecast entry for a given value date overwrites any prior forecast entry for that value date (i.e., there is a single forecast for a given value date), received firm commitment entries relating to a given value date are summed with other firm commitment entries associated with the given value date, and received balance sheet item entries relating to a given value date are summed with other balance sheet item entries associated with the given value date. Also, as mentioned above, the hedging computation logic sums hedging values when combining entries of the same exposure type and takes the maximum hedging value when combining entries of different exposure types. Thus, for example, ID 1 in FIG. 40 shows a "combination" of a single exposure type, ID 2 in FIG. 40 shows a combination of entries of different exposure types in which case the hedging computation logic takes the maximum of the two hedging computations, ID 3 in FIG. 40 shows a combination of entries having the same exposure type with different labels in which case the hedging computation logic sums the values of the two hedging computations, ID 4 in FIG. 40 shows a two-level combination in which forecast entries associated with two different labels are summed as in ID 3 and then the hedging computation logic takes the maximum of that combination and the hedging computation for the BSI exposure type entries, and ID 5 in FIG. 40 shows a two-level combination in which hedging computations for the forecast entries are summed, hedging computations for the firm commitment entries are summed, and then the hedging computation takes the maximum of those two hedging computations.

It should be noted that combinations can include more than two branches, in which case the hedging computation logic preferably sums the branches if all of the branches are of the same exposure type and preferably takes the maximum if there is a mix of at least two different exposure types.

It also should be noted that, in certain exemplary embodiments, the hedging computation logic can be implemented in a generic manner such that a wide variety of combinations can be implemented using a single computer program. For example, as shown in FIGS. 41-44 which correspond respectively to ID 1, ID3, ID4, and ID5 in FIG. 40, the hedging computation logic can implement these combinations without any "special cases" that would require explicit programming.

The following are some examples of combined hedging program concepts in accordance with certain exemplary embodiments. Two sample combined hedging programs are presented, one having a forecast/layering type hedging program instance (referred to as Instance 1) and a microhedging type hedging program instance for firm commitments (referred to as Instance 2) for conversion of Euros to U.S. Dollars with market direction "sell" (referred to as EURUSD-SELL), the other having a forecast/layering type hedging program instance (referred to as Instance 1) and a microhedging type hedging program instance for firm commitments (referred to as Instance 2) for conversion of Euros to Chinese Yuan with market direction "sell" (referred to as EURCNY-SELL). The following tables represent dimensional configurations for the two EURUSD-SELL hedging program instances:

| | INSTANCE 1 FOR EURUSD-SELL (forecast/layering) | | | | | |
|---|---|---|---|---|---|---|
| | Partition 1 | | | Partition 2 | | |
| MW | EUM | SL | TP | EUM | SL | TP |
| M1 | 80 | 0 | 0 | 20 | 8% | 8% |
| M2 | 70 | 0 | 0 | 30 | 8% | 8% |
| M3 | 60 | 0 | 0 | 40 | 8% | 8% |
| M4 | 40 | 0 | 0 | 60 | 8% | 8% |
| M5 | 20 | 0 | 0 | 80 | 8% | 8% |
| M6 | 10 | 0 | 0 | 90 | 8% | 8% |

| | INSTANCE 2 FOR EURUSD-SELL (firmco/microhedging) | | |
|---|---|---|---|
| | Partition 1 | | |
| MW | EUM | SL | TP |
| M1 | 100 | 0 | 0 |
| M2 | 100 | 0 | 0 |
| M3 | 100 | 0 | 0 |
| M4 | 100 | 0 | 0 |
| M5 | 100 | 0 | 0 |
| M6 | 100 | 0 | 0 |

Figure 23:
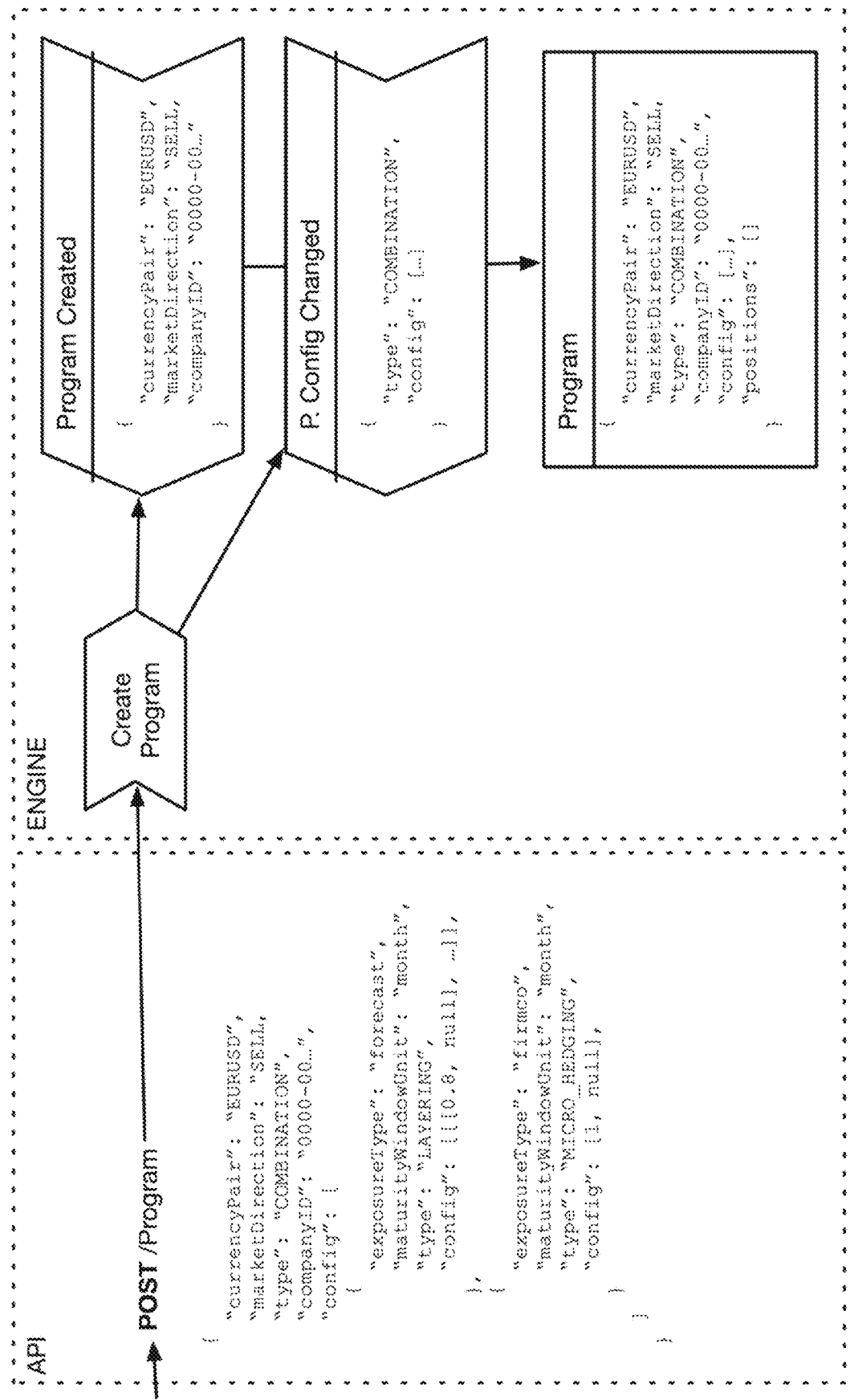
FIG. 23 shows a sample application program interface for establishing a hedging program in accordance with certain exemplary embodiments.

In various exemplary embodiments, such a combined hedging program can be established by the client through the API 12, for example, as shown schematically in FIG. 23. Among other things, the API call specifies a currency pair (e.g., "EURUSD"—Euros to U.S. Dollars in this example), a market direction (e.g., "sell" in this example, or alternatively "buy"), a program type ("combination" in this example, or alternatively "single" or by omitting a program type), a company identifier (ID) (e.g., "000-00" in this example), and then configurations for the hedging program instances to be combined. In this example, each hedging program instance is specified by an exposure type (e.g., "forecast" for the first instance and "firmco", i.e., firm commitments, for the second instance), a maturity window unit (e.g., "monthly" for both instances in this example), a hedging program type (e.g., "layering" for the first instance and "microhedging" for the second instance), and then configuration of all of the parameters (e.g., an EUM/SL/TP triplet for each MW in each partition). From such an API call, the manager 11 automatically generates the appropriate parameterized program(s) that in turn drive the parameterized hedging engine 160 to perform the hedging program instance(s).

The client can establish additional hedging programs for other currency pairs in a similar manner. The following tables represent dimensional configurations for the two EURCNY-SELL hedging program instances:

| INSTANCE 1 FOR EURCNY-SELL (forecast/layering) | | | |
|---|---|---|---|
| | Partition 1 | | |
| MW | EUM | SL | TP |
| M1 | 100 | 0 | 0 |
| M2 | 80 | 0 | 0 |
| M3 | 40 | 0 | 0 |

| INSTANCE 2 FOR EURCNY-SELL (firmco/microhedging) | | | |
|---|---|---|---|
| | Partition 1 | | |
| MW | EUM | SL | TP |
| M1 | 100 | 0 | 0 |
| M2 | 100 | 0 | 0 |
| M3 | 100 | 0 | 0 |

Figure 25:
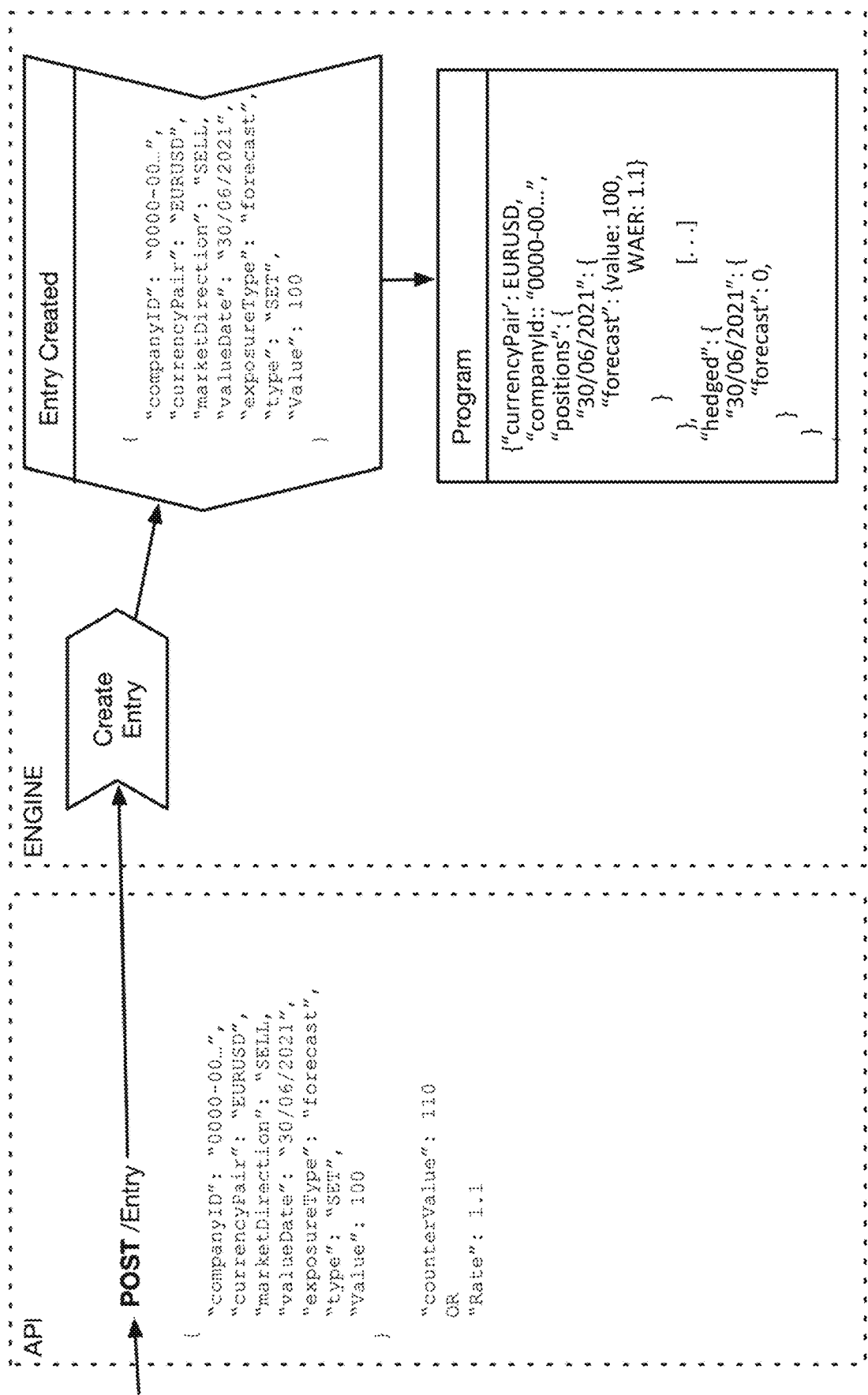
FIG. 25 shows an example of an API call by which the client sends an exposure entry to the engine, in accordance with certain exemplary embodiments.

After the manager 11 generates the EURUSD-SELL and EURCNY-SELL parameterized program instances, the client can send exposure entries to the manager 11 for processing. FIG. 24 shows representations of some forecast exposure entries as might be sent on Dec. 1, 2020 for the two hedging program instances. As shown, each entry specifies an amount, the currency pair, the buy/sell direction, a value date, an entry rate if applicable, and a type. FIG. 25 shows an example of an API call by which the client sends an exposure entry to the manager 11, in accordance with certain exemplary embodiments. Here, each entry specifies the company ID, the currency pair, the buy/sell direction, the value date, the entry rate if applicable (not shown here for convenience), a position type ("set" to set a new exposure for the given position, or "acc"—accumulate—to add the value to the given position, where, if the value is negative, will effectively subtract the value from the given position). For each program instance, the manager 11 updates the exposure (position) and amount hedged based on the exposure entries received (e.g., based on value date and exposure type). In certain exemplary embodiments, the manager 11 tracks only one aggregate per program instance (i.e., all positions grouped by program), which simplifies de-routing of entries to program instances and program configuration updates. However, it should be noted that alternative embodiments could be configured to track multiple aggregates per program instance. Thus, for example, with reference again to FIG. 5, the exposure entries would be routed by the strategies router 130 to the combinator 140, e.g., based on the client ID, and the combinator 140 would update the exposure (position) for the corresponding combined hedging program instances. It should be noted that, in certain exemplary embodiments, the strategies router 130 and the combinator 140 can be considered as logical components of the manager 11 and need not be implemented as separate components (e.g., the functions performed by the strategies router 130 and/or the combinator 140 can be implemented as part of the overall manager 11 or as part of a hedging engine 160).

Figure 26:
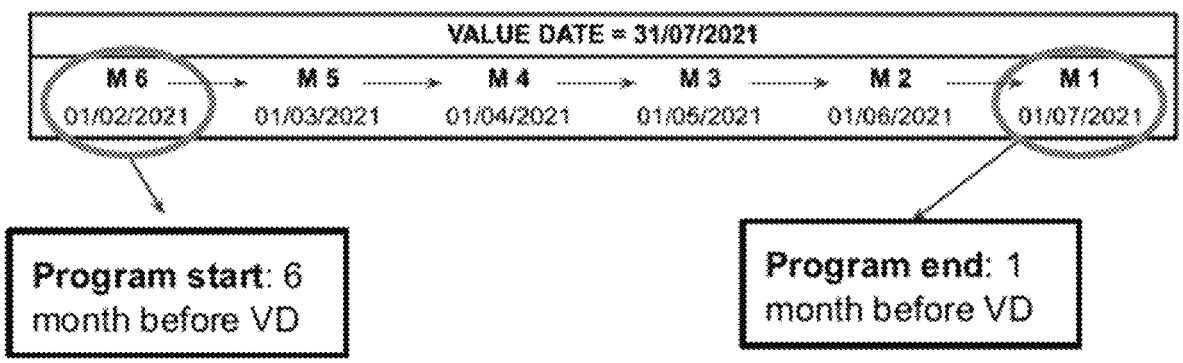
FIG. 26 shows the MW dates for each value date for EURUSD-SELL hedging program instances.

With reference again to the tables above, FIG. 26 shows the MW dates for each value date for the EURUSD-SELL hedging program instances, and FIG. 27 shows the MW dates for each value date (VD) for the EURCNY-SELL hedging program instances. EURUSD-SELL hedging program instances include six maturity windows from six months before the value date (M6) to one month before the value date (M1). EURCNY-SELL hedging program instances include three maturity windows from three months before the value date (M3) to one month before the value date (M1). Thus, each program essentially represents a time window relative to the value date (i.e., six months in the case of the EURUSD-SELL instances and three months in the case of the EURCNY-SELL instances). It should be noted that in these examples, the last change of maturity window happens one month before the value date but the program remains "active" until the value date (e.g., can continue monitoring rates, for example).

The following demonstrates how the entries from Dec. 1, 2021 would be handled on Mar. 1, 2021 by a parameterized hedging engine 160 executing the parameterized hedging program instances, in accordance with certain exemplary embodiments. As discussed above, the parameterized hedging engine 160 executes a set of procedures. Generally speaking, procedures that are common to multiple different types of hedging instances include such things as translating time events to MW units (e.g., 01/10/2021 might translate to month M6), entry routing (e.g., given the currency pair, marketing direction, and company ID, decide whether or not to use an entry), generic procedures such as "minToHedge" and "maxToHedge," and requesting hedges based on a position need. In some cases, generic procedures such as "minToHedge" and "maxToHedge" can be parameterized (i.e., made part of the parameterized programs) in order to add further dynamism to the system by allowing whether and how to use such procedures to be specified on a hedging program instance basis. Other procedures are specific to a particular type of hedging instance, e.g., computing a position need given the EUM, current program configuration (e.g., aggregated entries and past hedging actions), and current MW.

Figure 28:
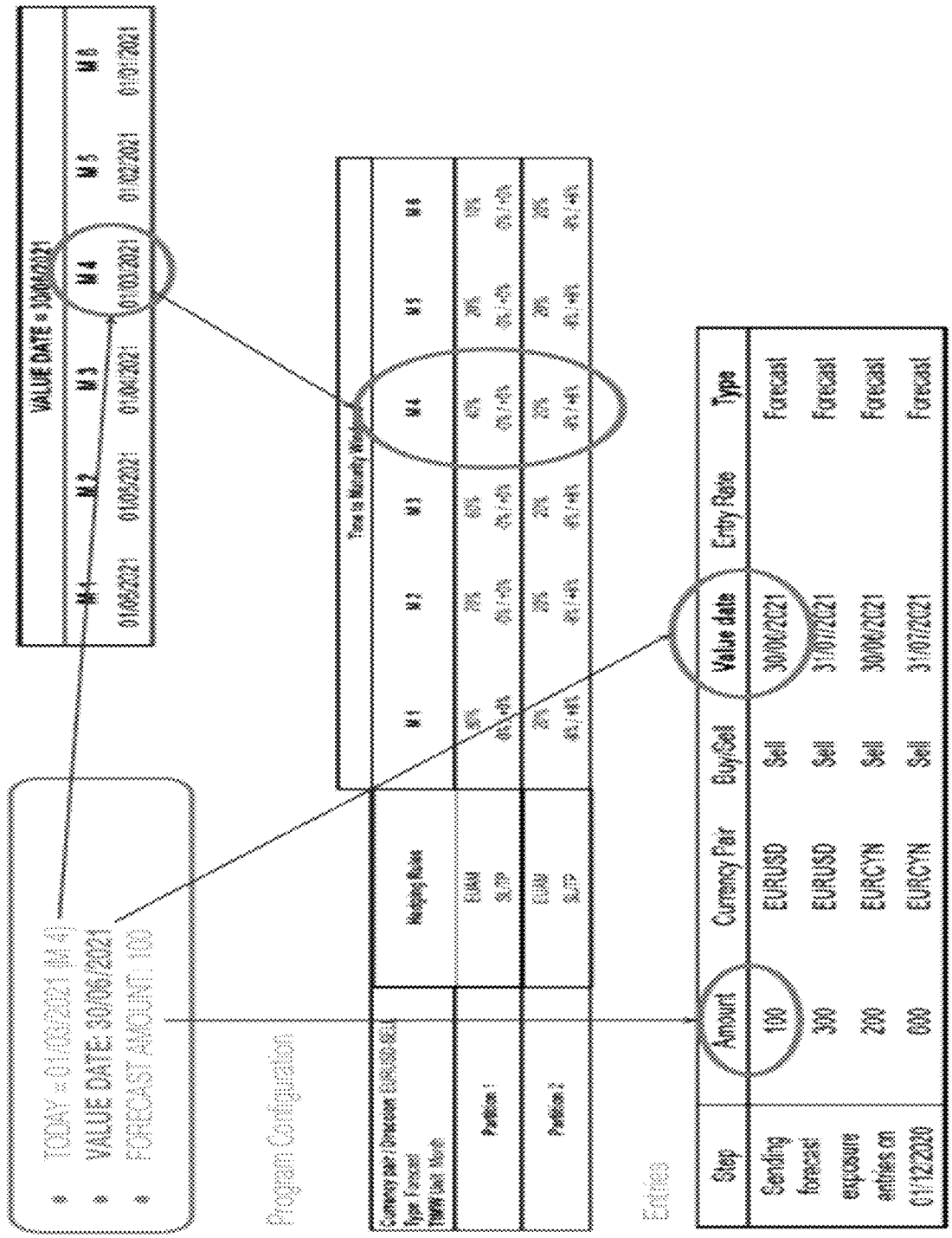
FIG. 28 demonstrates handling of the first forecast entry for the EURUSD-SELL instance having an amount of 100, a value date of 30 Jun. 2021, and a forecast type as might be handled by the parameterized program engine on Mar. 1, 2021, in accordance with certain exemplary embodiments.
Figure 29:
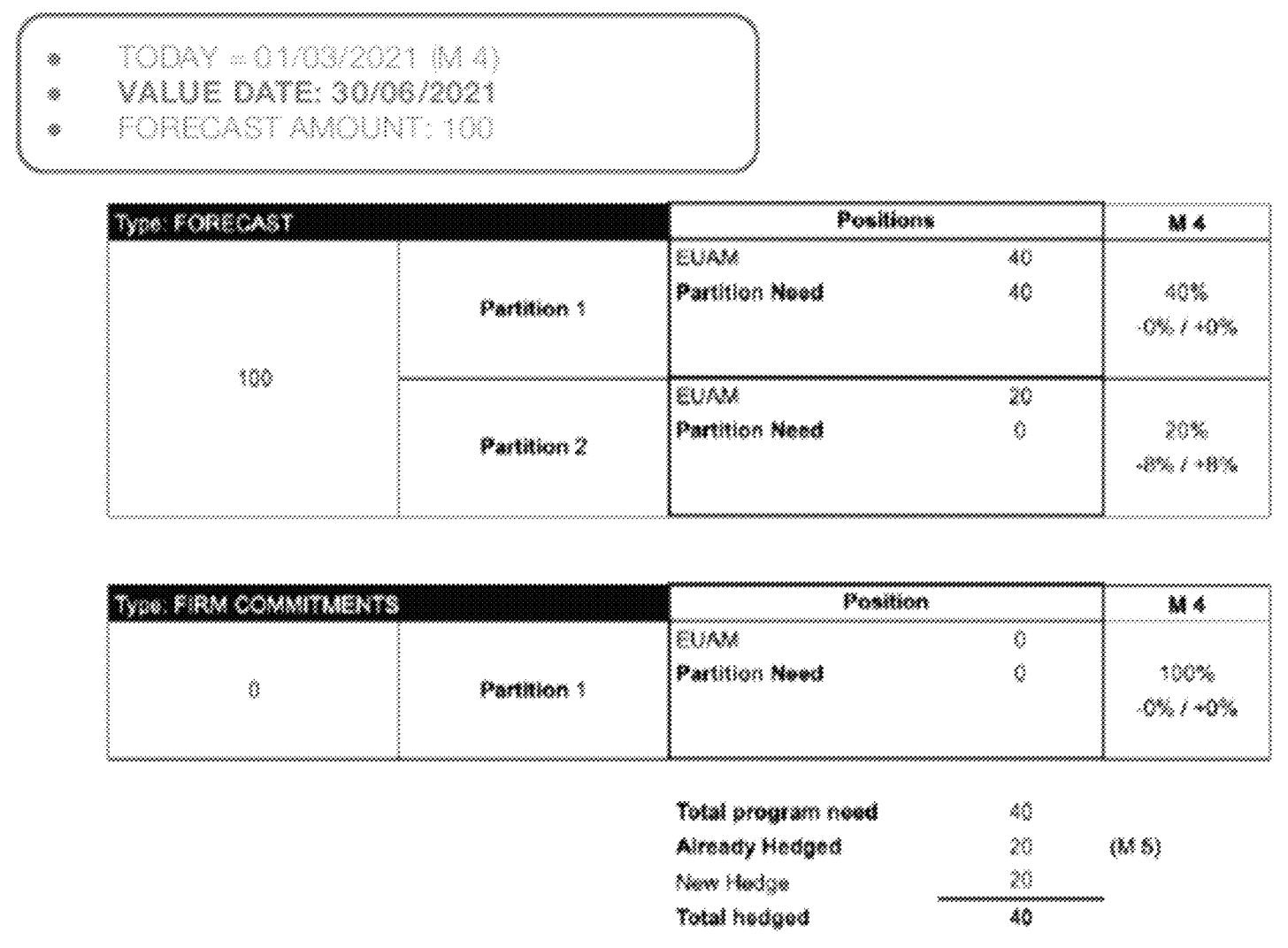

FIG. 28 demonstrates handling of the first forecast entry for the EURUSD-SELL instance having an amount of 100, a value date of 30 Jun. 2021, and a forecast type as might be handled by the parameterized program engine 160 on Mar. 1, 2021, in accordance with certain exemplary embodiments. For this entry, the MW corresponds to month M4 of Instance 1 in which 40% of the 100 would be hedged without SL/TP in accordance with Partition 1 and 20% of the 100 would be hedged using SL/TP of ±8% in accordance with Partition 2. Assume for this example that SL/TP is not triggered in this month. Thus, as shown in FIG. 29, the partition need of Instance 1 Partition 1 is 40 (i.e., 40% of 100), the partition need of Instance 1 Partition 2 is zero (i.e., SL/TP was not triggered so there is no hedge need), and the partition need for Instance 2 Partition 1 is zero, for a total program need of 40. Since 20 would have been hedged in the previous month (i.e., month M5), the new hedge need for month M4 is 20 for a total amount hedged of 40.

Figure 30:
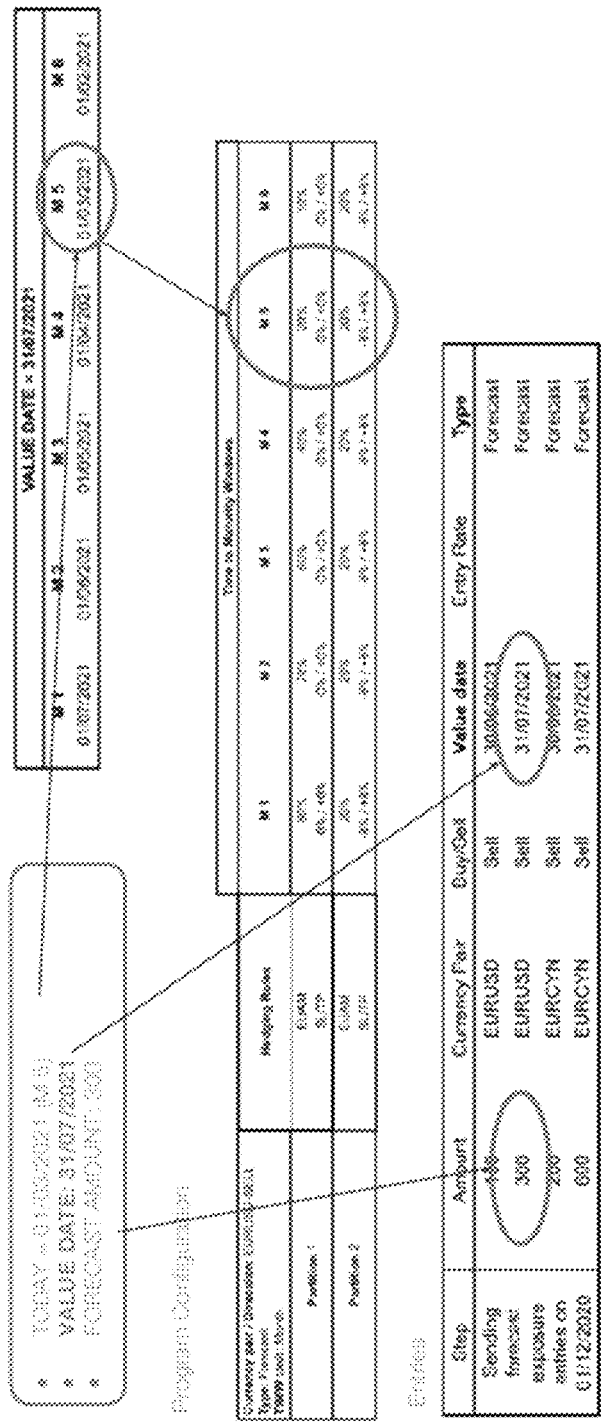
FIG. 30 demonstrates handling of the second forecast entry for the EURUSD-SELL instance having an amount of 300, a value date of 31 Jul. 2021, and a forecast type as might be handled by the parameterized program engine on Mar. 1, 2021, in accordance with certain exemplary embodiments.
Figure 31:
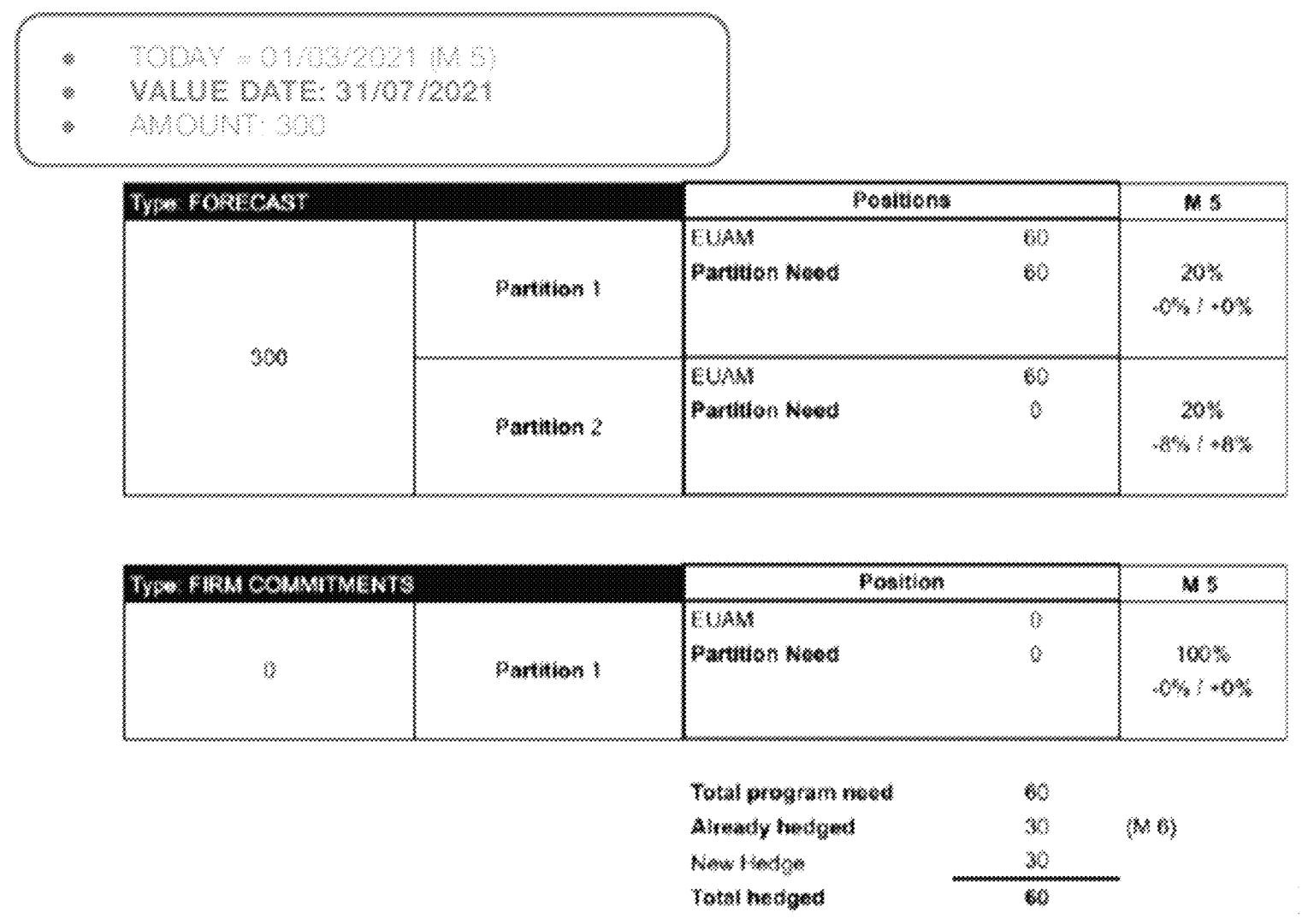

FIG. 30 demonstrates handling of the second forecast entry for the EURUSD-SELL instance having an amount of 300, a value date of 31 Jul. 2021, and a forecast type as might be handled by the parameterized program engine 160 on Mar. 1, 2021, in accordance with certain exemplary embodiments. For this entry, the MW corresponds to month M5 of Instance 1 in which 20% of the 300 would be hedged without SL/TP in accordance with Partition 1 and 20% of the 300 would be hedged using SL/TP of ±8% in accordance with Partition 2. Assume for this example that SL/TP is not triggered in this month. Thus, as shown in FIG. 31, the partition need of Instance 1 Partition 1 is 60 (i.e., 20% of 300), the partition need of Instance 1 Partition 2 is zero (i.e., SL/TP was not triggered so there is no hedge need), and the partition need of Instance 2 Partition 1 is zero, for a total program need of 60.

Figure 32:
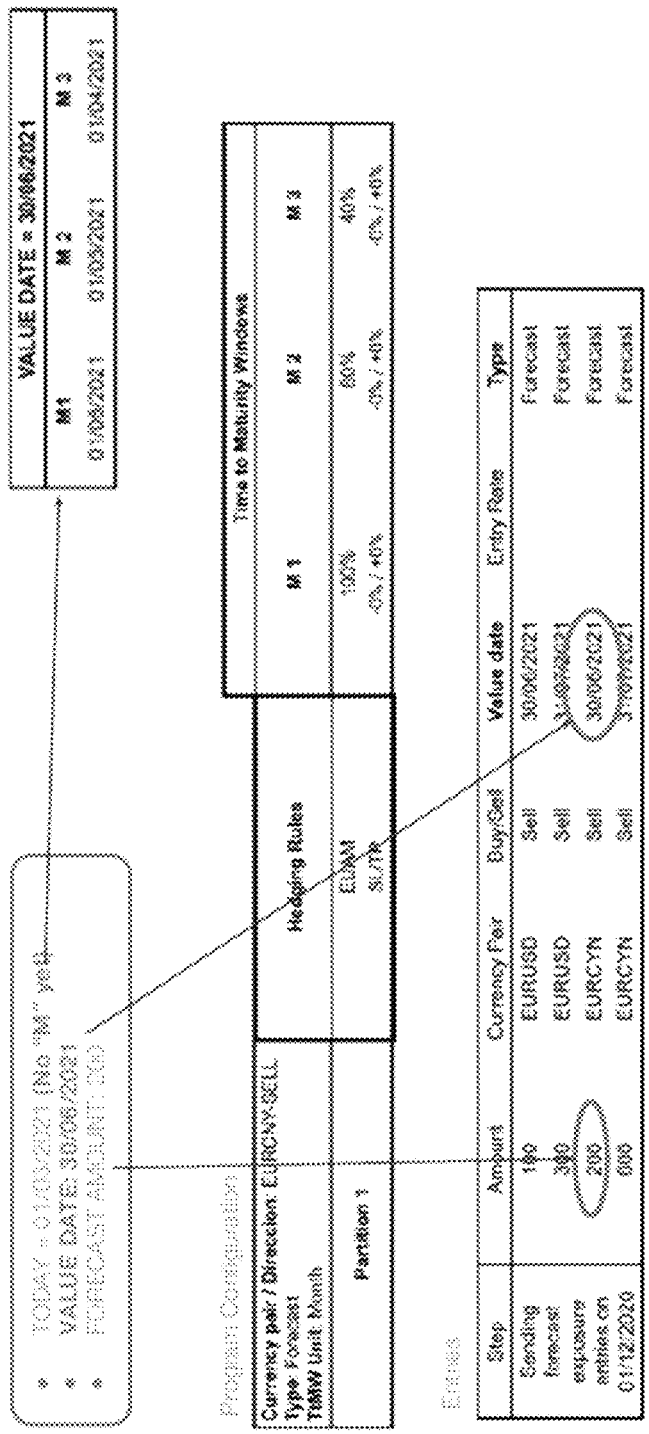
FIG. 32 demonstrates handling of the third entry from Dec. 1, 2020 relating to the EURCNY-SELL instance and having an amount of 200, a value date of 30 Jun. 2021, and a forecast type.

FIG. 32 demonstrates handling of the third entry from Dec. 1, 2020 relating to the EURCNY-SELL instance and having an amount of 200, a value date of 30 Jun. 2021, and a forecast type. In this example, Mar. 1, 2021 is not associated with any MW of the program instance, so no hedging action is made.

Figure 33:
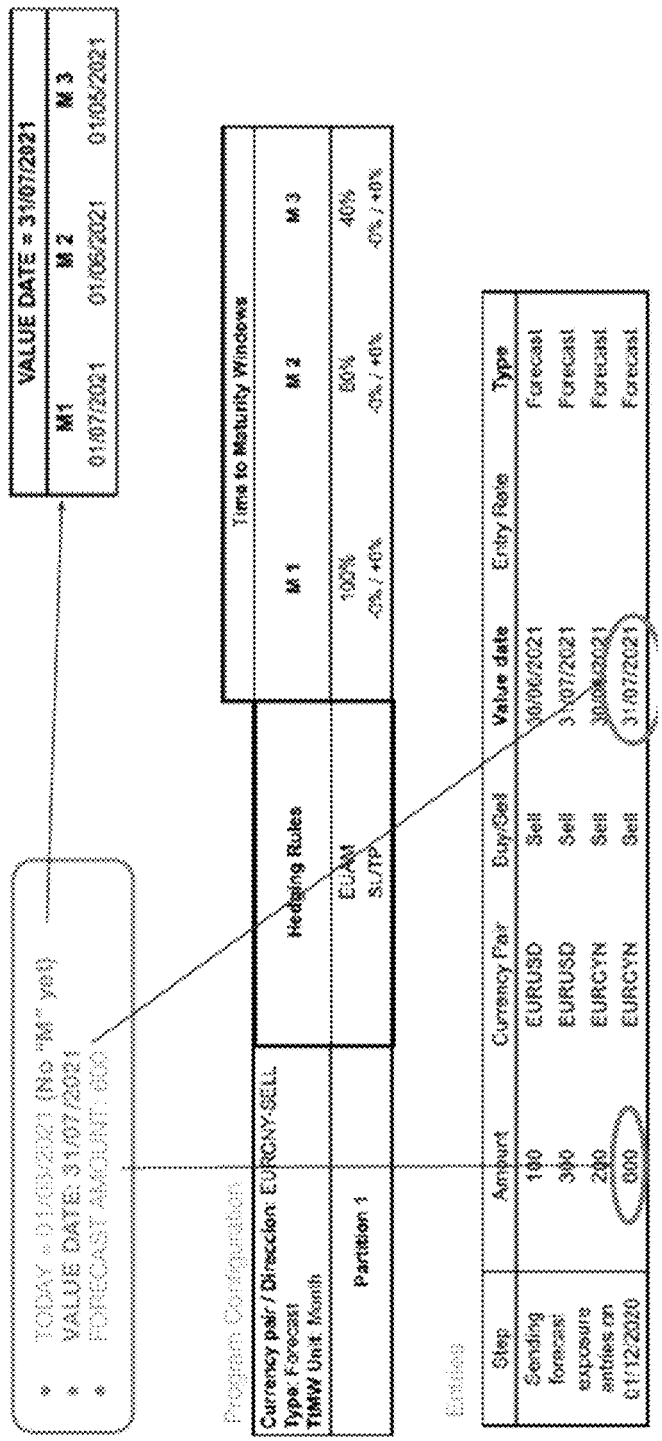
FIG. 33 demonstrates handling of the fourth entry from Dec. 1, 2020 relating to the EURCNY-SELL instance and having an amount of 600, a value date of 31 Jul. 2021, and a forecast type.

FIG. 33 demonstrates handling of the fourth entry from Dec. 1, 2020 relating to the EURCNY-SELL instance and having an amount of 600, a value date of 31 Jul. 2021, and a forecast type. In this example, Mar. 1, 2021 is not associated with any MW of the program instance, so no hedging action is made.

FIG. 34 shows representations of some sample firm commitment ("FirmCo") entries as might be made on May 20, 2021 individually and along with the forecast entries from Dec. 1, 2020 ordered by value date at May 20, 2021.

Figure 35:
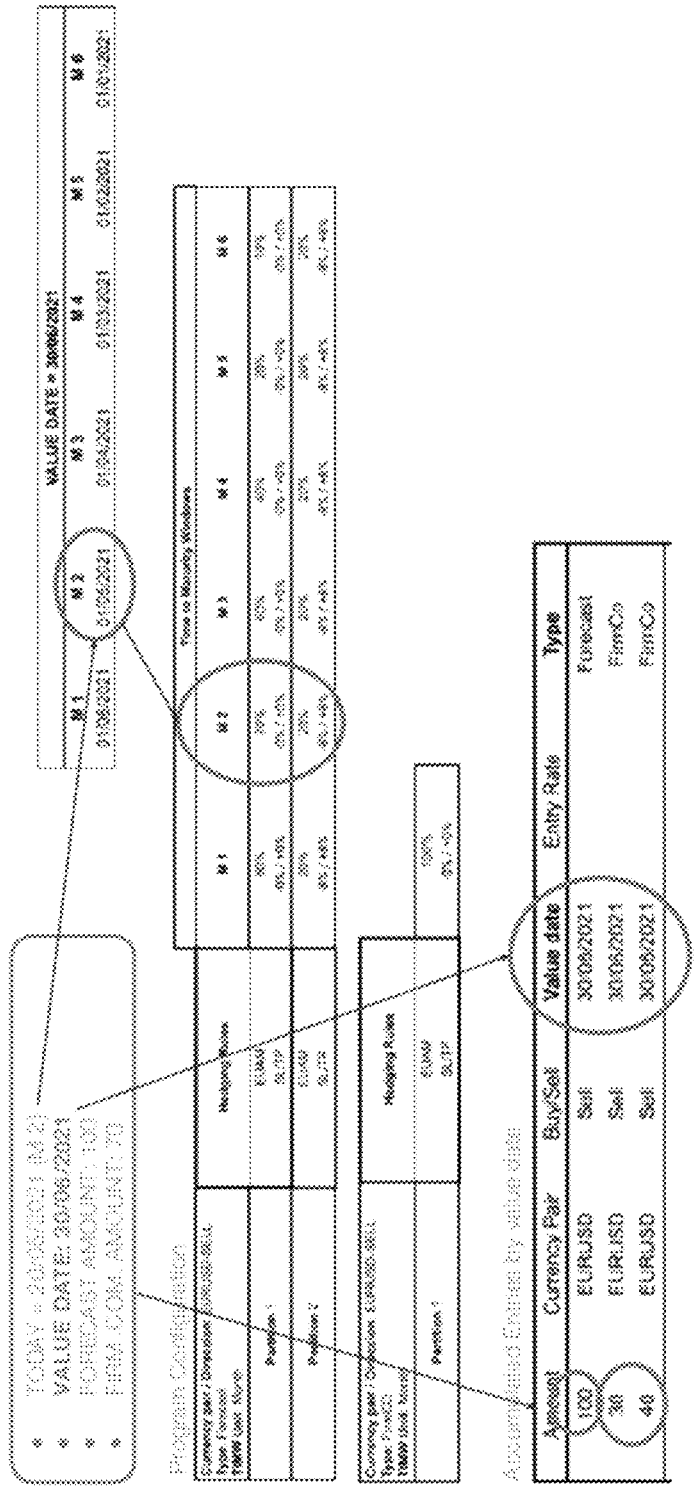
FIG. 35 demonstrates handling of the entries relating to the EURUSD-SELL instances having a value date of 30 Jun. 2021 as might be handled by the parameterized program engine on May 20, 2021, in accordance with certain exemplary embodiments.
Figure 36:
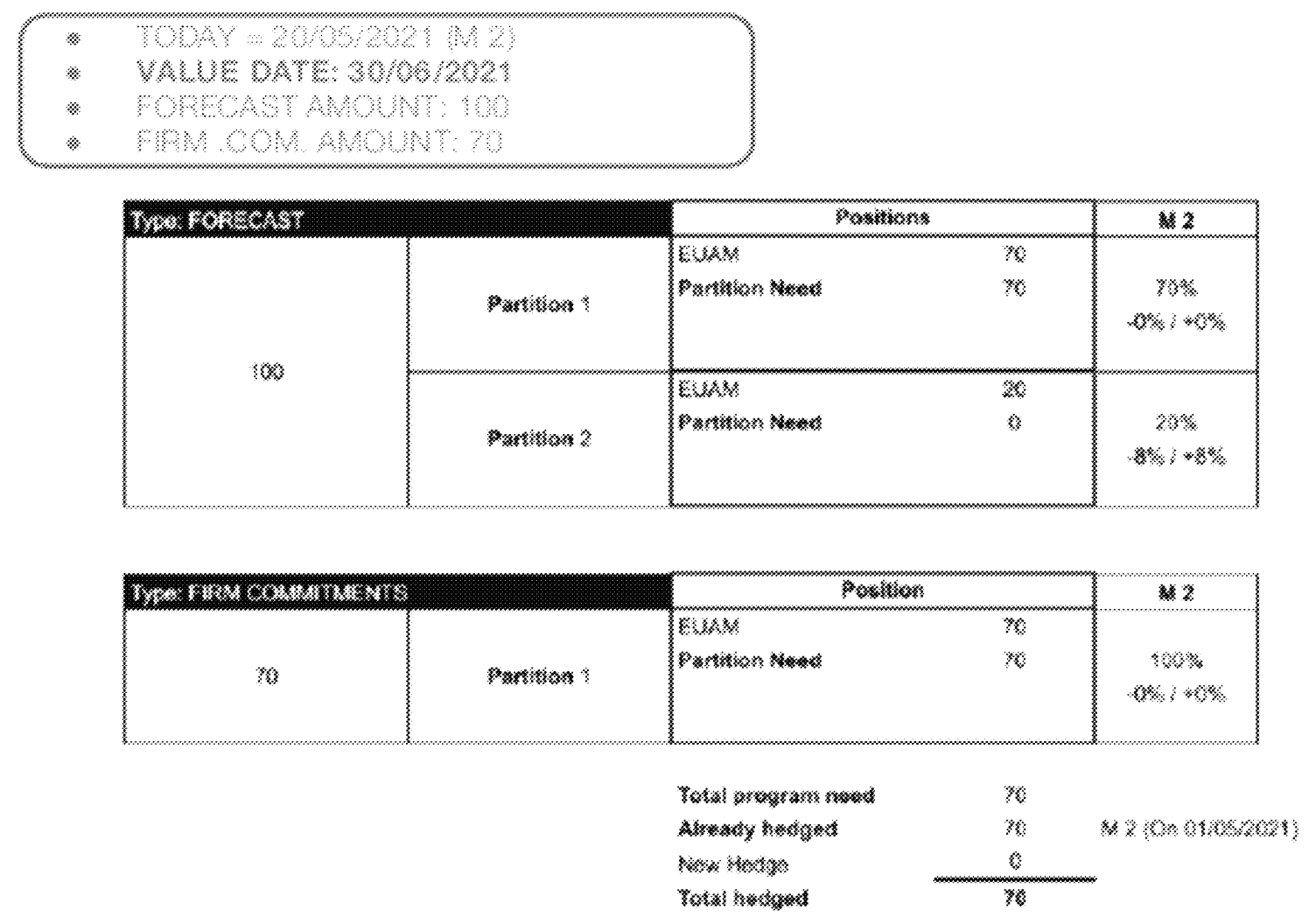

FIG. 35 demonstrates handling of the entries relating to the EURUSD-SELL instances having a value date of 30 Jun. 2021 as might be handled by the parameterized program engine 160 on May 20, 2021, in accordance with certain exemplary embodiments. For these entries, the forecast amount is 100, the firm commitment amount is 70 (i.e., 30+40), and the MW corresponds to month M2. Thus, as shown in FIG. 36, the partition need of Instance 1 Partition 1 is 70 (i.e., 70% of 100), the partition need of Instance 1 Partition 2 is zero (i.e., assuming SL/TP was not triggered), and the partition need of Instance 2 is 70 (i.e., 100% of 70) for a total program need of 70 (i.e., the larger of the amounts from the two combined hedging program instances). Since 70 would have been hedged when the program instances were run on May 1, 2021 (i.e., the beginning of month M2) based on the forecast amount, the new hedge need for month M2 is zero for a total amount hedged of 70.

Figure 37:
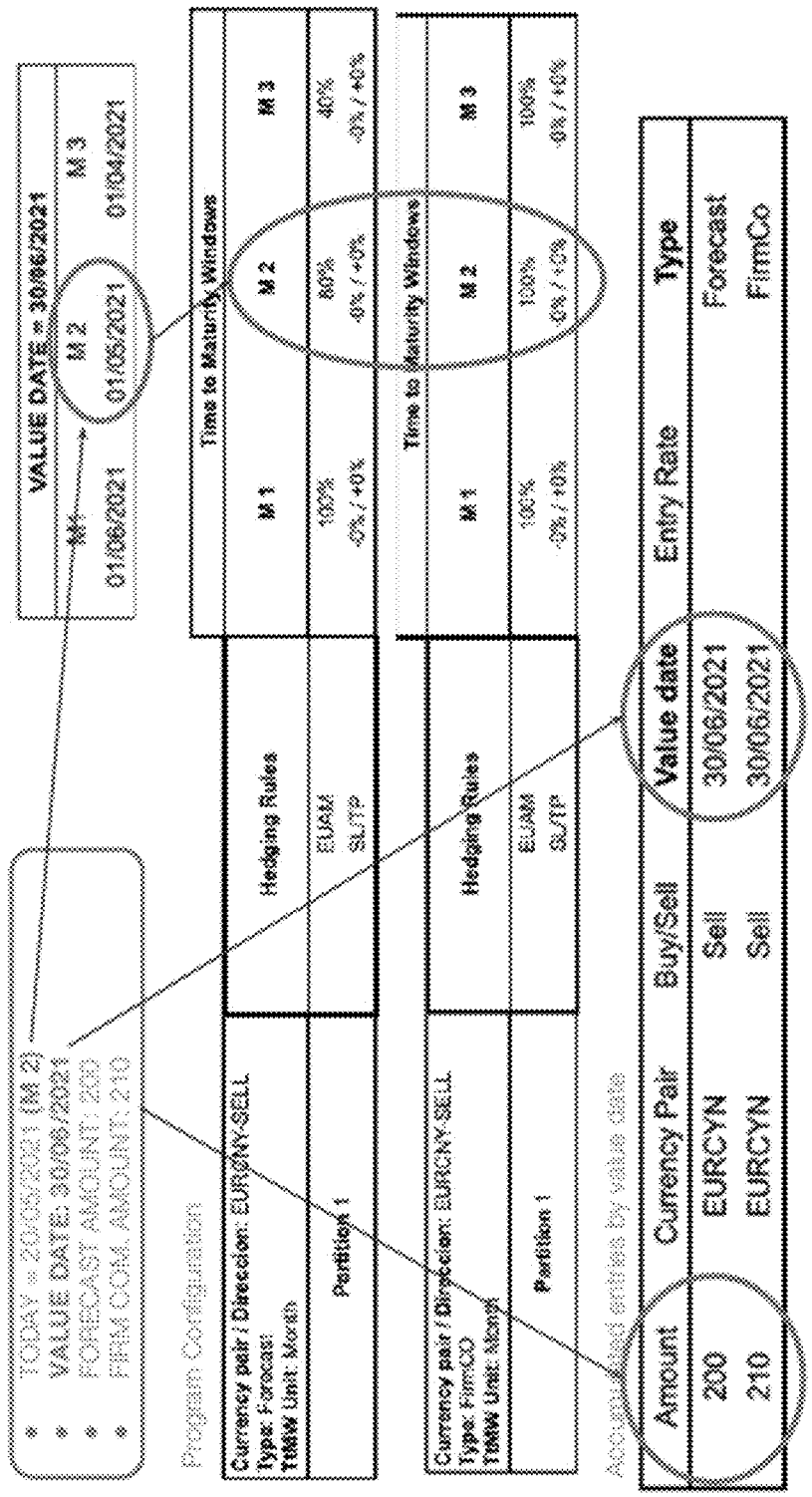
FIG. 37 demonstrates handling of the entries relating to the EURCNY-SELL instances having a value date of 30 Jun. 2021 as might be handled by the parameterized program engine on May 20, 2021, in accordance with certain exemplary embodiments.

FIG. 37 demonstrates handling of the entries relating to the EURCNY-SELL instances having a value date of 30 Jun. 2021 as might be handled by the parameterized program engine 160 on May 20, 2021, in accordance with certain exemplary embodiments. For these entries, the forecast amount is 200, the firm commitment amount is 210, and the MW corresponds to month M2. Thus, as shown in FIG. 38, the partition need of Instance 1 Partition 1 is 160 (i.e., 80% of 200) and the partition need of Instance 2 is 210 (i.e., 100% of 210) for a total program need of 210 (i.e., the larger of the amounts from the two combined hedging program instances). Since 160 would have been hedged when the parameterized hedging engine 160 ran the program instances on May 1, 2021 (i.e., the beginning of month M2) based on the forecast amount, the new hedge need for month M2 is 50 for a total amount hedged of 210.

As discussed above, the parameterized program module 160 would automatically generate hedging requests through the order management system(s) 20 such as to purchase a hedging product or extend the maturity date of a hedging product in accordance with the hedging position determined through execution of the parameterized hedging program instances.

Miscellaneous

It should be noted that headings are used above for convenience and are not to be construed as limiting the present invention in any way.

Various embodiments of the invention may be implemented at least in part in any conventional computer programming language. For example, some embodiments may be implemented in a procedural programming language (e.g., "C"), or in an object-oriented programming language (e.g., "C++"). Other embodiments of the invention may be implemented as a pre-configured, stand-alone hardware element and/or as preprogrammed hardware elements (e.g., application specific integrated circuits, FPGAs, and digital signal processors), or other related components.

In alternative embodiments, the disclosed apparatus and methods (e.g., as in any flow charts or logic flows described above) may be implemented as a computer program product for use with a computer system. Such implementation may include a series of computer instructions fixed on a tangible, non-transitory medium, such as a computer readable medium (e.g., a diskette, CD-ROM, ROM, or fixed disk). The series of computer instructions can embody all or part of the functionality previously described herein with respect to the system.

Those skilled in the art should appreciate that such computer instructions can be written in a number of programming languages for use with many computer architectures or operating systems. Furthermore, such instructions may be stored in any memory device, such as a tangible, non-transitory semiconductor, magnetic, optical or other memory device, and may be transmitted using any communications technology, such as optical, infrared, RF/microwave, or other transmission technologies over any appropriate medium, e.g., wired (e.g., wire, coaxial cable, fiber optic cable, etc.) or wireless (e.g., through air or space).

Among other ways, such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). In fact, some embodiments may be implemented in a software-as-a-service model ("SAAS") or cloud computing model. Of course, some embodiments of the invention may be implemented as a combination of both software (e.g., a computer program product) and hardware. Still other embodiments of the invention are implemented as entirely hardware, or entirely software.

Computer program logic implementing all or part of the functionality previously described herein may be executed at different times on a single processor (e.g., concurrently) or may be executed at the same or different times on multiple processors and may run under a single operating system process/thread or under different operating system processes/threads. Thus, the term "computer process" refers generally to the execution of a set of computer program instructions regardless of whether different computer processes are executed on the same or different processors and regardless of whether different computer processes run under the same operating system process/thread or different operating system processes/threads. Software systems may be implemented using various architectures such as a monolithic architecture or a microservices architecture.

Importantly, it should be noted that embodiments of the present invention may employ conventional components such as conventional computers (e.g., off-the-shelf PCs, mainframes, microprocessors), conventional programmable logic devices (e.g., off-the shelf FPGAs or PLDs), or conventional hardware components (e.g., off-the-shelf ASICs or discrete hardware components) which, when programmed or configured to perform the non-conventional methods described herein, produce non-conventional devices or systems. Thus, there is nothing conventional about the inventions described herein because even when embodiments are implemented using conventional components, the resulting devices and systems (e.g., the automated hedge management system 100, the service system 10, the manager 11, hedging engines 160 whether or not implemented using parameterized programs, etc.) are necessarily non-conventional because, absent special programming or configuration, the conventional components do not inherently perform the described non-conventional functions.

The activities described and claimed herein provide technological solutions to problems that arise squarely in the realm of technology. These solutions as a whole are not well-understood, routine, or conventional and in any case provide practical applications that transform and improve computers and computer routing systems.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Various inventive concepts may be embodied as one or more methods, of which examples have been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

Although the above discussion discloses various exemplary embodiments of the invention, it should be apparent that those skilled in the art can make various modifications that will achieve some of the advantages of the invention without departing from the true scope of the invention. Any references to the "invention" are intended to refer to exemplary embodiments of the invention and should not be construed to refer to all embodiments of the invention unless the context otherwise requires. The described embodiments are to be considered in all respects only as illustrative and not restrictive.

What is claimed is:

1. A scalable system for automated currency hedge management, the system comprising:
a database; and
at least one processor coupled to a tangible non-transitory memory containing instructions executable by the at least one processor to perform computer processes comprising:
at least one market monitor system configured to provide real-time market information from one or more market data providers;
at least one order management system configured to execute hedge requests; and
an automated hedge manager configured to implement a plurality of hedging programs, each hedging program associated with a given client, currency pair, and market direction and including a hedging program combination consisting of one or more hedging program instances, each hedging program instance associated with a distinct parameterized program characterized by a plurality of user-specified parameters defining at least six program dimensions including (1) an Exposure Type Trigger dimension defining a type of program instance from among fixed period forecast, continuous forecast, firm commitments, or balance sheet items, (2) an Exposure Under Management (EUM) dimension specifying an EUM value stored in the database for each of a number of maturity windows wherein the EUM values may be constant or variable across maturity windows, (3) a Partitions dimension defining a number of partitions for the program instance, (4) an SL/TP Setup dimension defining whether stop-loss (SL) and take-profit (TP) values are constant or variable, (5) an SL/TP Unit on Partition 1 dimension specifying SL and TP values stored in the database for each of a number of maturity windows for a first partition, and (6) an SL/TP Unit on Partition 2 dimension specifying SL and TP values stored in the database for each of a number of maturity windows for a second partition, each hedging program combination that has multiple hedging program instances further including a set of user-specified combination operators that define how outputs of the multiple hedging program instances for the hedging program combination are programmatically combined, each hedging program combination implementing a distinct client hedging strategy based on the user-specified parameters, the user-specified combination operators, and real-time market information from at least one market monitor system to produce a combined hedging position for the hedging program combination, the automated hedge manager comprising:
one or more client exposure data preprocessors including at least one of data aggregator preprocessors that transform client exposure data into a normalized format or blender preprocessors that enrich the normalized client exposure data by substituting or triangulating currencies;
a strategies router that directs client exposure data including client exposure data from the one or more preprocessors from each client to a corresponding client hedging program combination; and
a parameterized hedging engine that implements the parameterized programs for the one or more hedging program instances of each hedging program combination, the parameterized hedging engine comprising a combinator that aggregates client exposure data per value date in the database, implements the parameterized program for each hedging program instance of each hedging program combination including applying the at least six program dimensions associated with the hedging program instance to aggregated client exposure data and real-time market information associated with at least one maturity window of the hedging program instance to produce an output for the hedging program instance, manages interaction between the one or more hedging program instances of each hedging program combination to produce the combined hedge position for each hedging program combination based on the output of each hedging program instance associated with the hedging program combination and further based on any user-specified combination operators associated with the hedging program combination, updates an exposure position for each hedging program combination including for combined hedging program instances to determine a total amount to be hedged for the hedging program combination for a corresponding currency pair and market direction, triggers automated hedge requests to at least one order management system for each hedging program combination based on the combined hedge position and total amount to be hedged for the hedging program combination, and updates the client exposure data in the database based on the total amount hedged.

2. A system according to claim 1, wherein the one or more client exposure data preprocessors are pluggable via a preprocessor interface and are configurable so that an output of one client exposure data preprocessor is provided as an input to another client exposure data preprocessor.

3. A system according to claim 1, wherein the automated hedge manager generates the distinct parameterized programs based on the user-specified parameters.

4. A system according to claim 1, wherein the parameterized programs are implemented in an event-driven manner as exposure data and market information is received.

5. A system according to claim 1, wherein the set of combination operators is configurable to define a hierarchy of combined outputs.

6. A system according to claim 5, wherein the hierarchy of combined outputs is configurable to include (1) outputs from a first plurality of hedging program instances combined using a first specified combination operator to produce a first combined output and (2) the first combined output combined with at least one other output using a second specified combination operator.

7. A system according to claim 1, wherein the set of combination operators includes at least one of a max operator or a sum operator.

8. A system according to claim 1, wherein the automated hedge manager comprises:
a hedging engine interface allowing pluggable hedging engines to be added to and removed from the system.

9. A system according to claim 1, further comprising:
an electronic interface through which clients post programs and exposure entries to the automated hedge manager.

10. A system according to claim 1, further comprising:
an electronic interface through which clients program user-specified parameters defining program dimensions for distinct parameterized programs associated with hedging program instances.

11. A computerized method for scalable automated currency exchange hedging, the method comprising:
executing, by at least one processor, an automated hedge manager configured to implement a plurality of hedging programs, each hedging program associated with a given client, currency pair, and market direction and including a hedging program combination consisting of one or more hedging program instances, each hedging program instance associated with a distinct parameterized program characterized by a plurality of user-specified parameters defining at least six program dimensions including (1) an Exposure Type Trigger dimension defining a type of program instance from among fixed period forecast, continuous forecast, firm commitments, or balance sheet items, (2) an Exposure Under Management (EUM) dimension specifying an EUM value stored in a database for each of a number of maturity windows wherein the EUM values may be constant or variable across maturity windows, (3) a Partitions dimension defining a number of partitions for the program instance, (4) an SL/TP Setup dimension defining whether stop-loss (SL) and take-profit (TP) values are constant or variable, (5) an SL/TP Unit on Partition 1 dimension specifying SL and TP values stored in the database for each of a number of maturity windows for a first partition, and (6) an SL/TP Unit on Partition 2 dimension specifying SL and TP values stored in the database for each of a number of maturity windows for a second partition, each hedging program combination that has multiple hedging program instances further including a set of user-specified combination operators that define how outputs of the multiple hedging program instances for the hedging program combination are programmatically combined, each hedging program combination implementing a distinct client hedging strategy based on the user-specified parameters, the user-specified combination operators, and real-time market information from at least one market monitor system to produce a combined hedging position for the hedging program combination;
executing, by the automated hedge manager, one or more client exposure data preprocessors including at least one of data aggregator preprocessors that transform client exposure data into a normalized format or blender preprocessors that enrich the normalized client exposure data by substituting or triangulating currencies;
directing, by a strategies router, client exposure data including client exposure data from the one or more preprocessors from each client to a corresponding client hedging program combination; and
operating a parameterized hedging engine that implements the parameterized programs for the one or more hedging program instances of each hedging program combination including aggregating, by a combinator of the parameterized hedging engine, client exposure data by value date in a database;
implementing, by the combinator, the parameterized program for each hedging program instance of each hedging program combination including applying the at least six program dimensions associated with the hedging program instance to aggregated client exposure data and real-time market information associated with at least one maturity window of the hedging program instance to produce an output for the hedging program instance;
managing, by the combinator, interaction between the one or more hedging program instances of each hedging program combination to produce the combined hedge position for each hedging program combination based on the output of each hedging program instance associated with the hedging program combination and further based on any user-specified combination operators associated with the hedging program combination;
updating, by the combinator, an exposure position for each hedging program combination including for combined hedging program instances to determine a total amount to be hedged for the hedging program combination for a corresponding currency pair and market direction;
triggering, by the combinator, automated hedge requests to at least one order management system for each hedging program combination based on the combined hedge position and total amount to be hedged for the hedging program combination; and
updating, by the combinator, the client exposure data in the database based on the total amount hedged.

12. A method according to claim 11, wherein the one or more client exposure data preprocessors are pluggable via a preprocessor interface and are configurable so that an output of one client exposure data preprocessor is provided as an input to another client exposure data preprocessor.

13. A method according to claim 11, wherein the automated hedge manager generates the distinct parameterized programs based on the user-specified parameters.

14. A method according to claim 11, wherein the parameterized programs are implemented in an event-driven manner as exposure data and market information is received.

15. A method according to claim 11, wherein the set of combination operators is configurable to define a hierarchy of combined outputs.

16. A method according to claim 15, wherein the hierarchy of combined outputs is configurable to include (1) outputs from a first plurality of hedging program instances combined using a first specified combination operator to produce a first combined output and (2) the first combined output combined with at least one other output using a second specified combination operator.

17. A method according to claim 11, wherein the set of combination operators includes at least one of a max operator or a sum operator.

18. A method according to claim 11, further comprising:
implementing, by the automated hedge manager, a hedging engine interface allowing pluggable hedging engines to be added to and removed from the system.

19. A method according to claim 11, further comprising:
implementing, by the automated hedge manager, an electronic interface through which clients post programs and exposure entries to the automated hedge manager.

20. A method according to claim 11, further comprising:
implementing, by the automated hedge manager, an electronic interface through which clients program user-specified parameters defining program dimensions for distinct parameterized programs associated with hedging program instances.

* * * * *